(12) United States Patent
Ren et al.

(10) Patent No.: US 8,981,023 B2
(45) Date of Patent: *Mar. 17, 2015

(54) SUPPORTED NONMETALLOCENE CATALYST, PREPARATION AND USE THEREOF

(75) Inventors: Hongping Ren, Nanjing (CN); Chuanfeng Li, Nanjing (CN); Xiaoli Yao, Nanjing (CN); Feng Guo, Nanjing (CN); Zhonglin Ma, Nanjing (CN); Haibin Chen, Nanjing (CN); Kaixiu Wang, Nanjing (CN); Jingwei Liu, Nanjing (CN); Yaming Wang, Nanjing (CN)

(73) Assignees: China Petroleum & Chemical Corp., Beijing (CN); Sinopec Yangzi Petrochemical Co. Ltd., Nanjing (CN)

( * ) Notice: Subject to any disclaimer, the term of this patent is extended or adjusted under 35 U.S.C. 154(b) by 64 days.

This patent is subject to a terminal disclaimer.

(21) Appl. No.: 13/504,098

(22) PCT Filed: Oct. 13, 2010

(86) PCT No.: PCT/CN2010/001605
§ 371 (c)(1),
(2), (4) Date: Apr. 25, 2012

(87) PCT Pub. No.: WO2011/050566
PCT Pub. Date: May 5, 2011

(65) Prior Publication Data
US 2012/0214955 A1      Aug. 23, 2012

(30) Foreign Application Priority Data

| Oct. 26, 2009 | (CN) | 2009 1 0180602 |
| Oct. 26, 2009 | (CN) | 2009 1 0180603 |
| Oct. 26, 2009 | (CN) | 2009 1 0180604 |
| Oct. 26, 2009 | (CN) | 2009 1 0180605 |

(51) Int. Cl.
| C08F 4/50 | (2006.01) |
| C08F 4/52 | (2006.01) |
| C08F 4/64 | (2006.01) |
| C08F 4/76 | (2006.01) |
| B01J 31/38 | (2006.01) |
| C08F 4/02 | (2006.01) |
| C08F 10/00 | (2006.01) |

(52) U.S. Cl.
CPC . *C08F 10/00* (2013.01); *C08F 4/02* (2013.01); *C08F 4/6411* (2013.01); *C08F 4/64127* (2013.01); *C08F 4/64131* (2013.01); *C08F 4/64137* (2013.01)
USPC ........... 526/161; 526/160; 526/172; 526/129; 526/127; 526/130; 526/123.1; 526/124.2; 526/124.5; 526/348; 502/103; 502/104; 502/118; 502/133; 502/134

(58) Field of Classification Search
USPC .......... 502/103, 104, 113, 118; 526/172, 161, 526/160, 170
See application file for complete search history.

(56) References Cited

U.S. PATENT DOCUMENTS

| 3,642,667 | A |   | 2/1972 | Steller |         |
| 4,391,736 | A |   | 7/1983 | Capshew |         |
| 4,440,869 | A | * | 4/1984 | Shannon et al. | 502/104 |
| 4,511,669 | A | * | 4/1985 | Gessell | 502/110 |
| 5,719,095 | A |   | 2/1998 | Brekner et al. | |
| 5,849,852 | A |   | 12/1998 | Koch et al. | |
| 5,936,046 | A | * | 8/1999 | Ghosh | 525/449 |
| 5,936,049 | A |   | 8/1999 | Kojoh et al. | |
| 6,069,108 | A |   | 5/2000 | Ernst et al. | |
| 6,410,474 | B1 | * | 6/2002 | Nowlin et al. | 502/113 |
| 6,423,660 | B1 |   | 7/2002 | Albizzati et al. | |
| 6,486,274 | B1 | * | 11/2002 | Gray et al. | 526/119 |
| 6,590,046 | B2 | * | 7/2003 | Kong et al. | 526/151 |
| 6,800,580 | B1 | * | 10/2004 | Yang et al. | 502/103 |
| 7,253,133 | B2 |   | 8/2007 | Sun et al. | |
| 7,875,568 | B2 | * | 1/2011 | Dai et al. | 502/167 |
| 8,193,288 | B2 | * | 6/2012 | Gu et al. | 526/90 |
| 2002/0019309 | A1 |   | 2/2002 | Lapidus et al. | |
| 2005/0004331 | A1 |   | 1/2005 | Sun et al. | |
| 2009/0137383 | A1 |   | 5/2009 | Tang et al. | |
| 2011/0237764 | A1 |   | 9/2011 | Gu et al. | |

FOREIGN PATENT DOCUMENTS

| CN | 1096517 | 12/1994 |
| CN | 1103069 | 5/1995 |
| CN | 1126480 | 7/1996 |
| CN | 1307594 | 8/2001 |
| CN | 1332182 | 1/2002 |

(Continued)

OTHER PUBLICATIONS

English language abstract of CN 1344749, Apr. 17, 2002.

(Continued)

*Primary Examiner* — Rip A. Lee
(74) *Attorney, Agent, or Firm* — Finnegan, Henderson, Farabow, Garrett & Dunner LLP

(57) ABSTRACT

This invention relates to a supported nonmetallocene catalyst and preparation thereof. The supported nonmetallocene catalyst can be produced with a simple and feasible process and is characterized by an easily controllable polymerization activity. This invention further relates to use of the supported nonmetallocene catalyst in olefin homopolymerization/copolymerization, which is characterized by a lowered assumption of the co-catalyst as compared with the prior art.

21 Claims, No Drawings

(56) References Cited

FOREIGN PATENT DOCUMENTS

| | | |
|---|---|---|
| CN | 1344749 | 4/2002 |
| CN | 1363537 | 8/2002 |
| CN | 1364818 | 8/2002 |
| CN | 1422874 | 6/2003 |
| CN | 1461756 | 12/2003 |
| CN | 1539855 | 10/2004 |
| CN | 1539856 | 10/2004 |
| CN | 1727062 A | 2/2006 |
| CN | 1789290 | 6/2006 |
| CN | 1789291 | 6/2006 |
| CN | 1789292 | 6/2006 |
| CN | 1884253 | 12/2006 |
| CN | 1884311 | 12/2006 |
| CN | 1887919 | 1/2007 |
| CN | 1962702 | 5/2007 |
| CN | 100460423 C | 2/2009 |
| CN | 101412764 A | 4/2009 |
| CN | 101412765 A | 4/2009 |
| CN | 101412766 | 4/2009 |
| CN | 101412766 A | 4/2009 |
| CN | 101412767 A | 4/2009 |
| CN | 101412768 | 4/2009 |
| EP | 0 206 794 | 6/1986 |
| EP | 0 685 494 | 5/1995 |
| EP | 1426385 A1 | 6/2004 |
| EP | 1829897 A1 | 9/2007 |
| EP | 2202246 A1 | 6/2010 |
| JP | 2008524344 | 7/2008 |
| WO | WO 99/61489 | 12/1999 | |
| WO | WO 03/010207 | 2/2003 | |
| WO | WO 2006/063501 | 6/2006 | |
| WO | WO 2006/063501 A1 * | 6/2006 | ............... C08F 4/02 |
| WO | WO 2007/134537 | 11/2007 | |
| WO | WO 2009/052700 | 4/2009 | |
| WO | WO 2009/052700 A1 * | 4/2009 | ............. C08F 4/645 |
| WO | WO 2009/052701 | 4/2009 | |

OTHER PUBLICATIONS

English language abstract of CN 1363537, Aug. 14, 2002.
English language abstract of CN 1422874, Jun. 11, 2003.
English language abstract of CN 1461756, Dec. 17, 2003.
English language abstract of CN 1539855, Oct. 27, 2004.
English language abstract of CN 1539856, Oct. 27, 2004.
English language abstract of CN 1884311, Dec. 27, 2006.
English language abstract of CN 1887919, Jan. 3, 2007.
English language abstract of CN 1962702, May 16, 2007.
V. C. Gibson et al., "Advances in Non-Metallocene Olefin Polymerization Catalysis," Chem. Rev. (2003) 103, pp. 283-315.
G. J. P. Britovsek, "The Search for New-Generation Olefin Polymerization Catalysts: Life beyond Metallocenes," Angew. Chem., Int. Ed. (1999) 38, pp. 429-447.
Pages from the textbook of "Olefin Coordination Polymerization Catalyst and Polyolefin," edited by S. Xiao et al., Beijing Industry University Press, Dec. 2002 (9 pages).
Q. Huang et al., "Development in Olefin Polymerization Catalyst and Our Strategy in This Regard," Petrochemical Technology (2001). vol. 30 supplement, pp. 454-459.

* cited by examiner

U.S. 8,981,023 B2

1

SUPPORTED NONMETALLOCENE CATALYST, PREPARATION AND USE THEREOF

CROSS REFERENCE TO RELATED APPLICATIONS

This application is a U.S. national phase application based on PCT/CN2010/001605, filed Oct. 13, 2010, which claims the priority of Chinese Application Nos. 200910180602.9, filed Oct. 26, 2009; 200910180605.2, filed Oct. 26, 2009; 200910180603.3, filed Oct. 26, 2009; and 200910180604.8, filed Oct. 26, 2009, the contents of all of which are incorporated by reference herein in their entirety.

TECHNICAL FIELD

The present invention relates to a nonmetallocene catalyst. Specifically, this invention relates to a supported nonmetallocene catalyst, preparation thereof and use thereof in olefin homopolymerization/copolymerization.

BACKGROUND ART

The nonmetallocene catalyst, also called as the post-metallocene catalyst, was discovered in middle and late 1990's, whose central atom involves nearly all of the transition metal elements. The nonmetallocene catalyst is comparative to, or exceeds, the metallocene catalyst in some aspects of the performance, and has been classified as the fourth generation catalyst for olefin polymerization, following the Ziegler catalyst, the Ziegler-Natta catalyst and the metallocene catalyst. Polyolefin products produced with such catalysts exhibit favorable properties and boast low production cost. The coordination atom of the nonmetallocene catalyst comprises oxygen, nitrogen, sulfur and phosphor, without containing a cyclopentadiene group or a derivative thereof (for example, an indene group or a fluorene group). The nonmetallocene catalyst is characterized in that its central atom shows comparatively strong electrophilicity and has a cis alkyl metal type or a metal halide type central structure, which facilitates olefin insertion and σ-bond transfer. Therefore, the central atom is easily subject to alkylation, and therefore facilitates formation of a cationic active center. The thus formed complex has a restricted geometrical configuration, and is stereoselective, electronegative and chiral adjustable. Further, the formed metal-carbon bond is easy to be polarized, which further facilitates homopolymerization and copolymerization of an olefin. For these reasons, it is possible to obtain an olefin polymer having a comparatively high molecular weight, even under a comparatively high polymerization temperature.

However, it is known that in the olefin polymerization, the homogeneous phase catalyst suffers from such problems as short service life, fouling, high consumption of methyl aluminoxane, and undesirably low or high molecular weight in the polymer product, and thus only finds limited use in the solution polymerization process or the high-pressure polymerization process, which hinders its wider application in industry.

Chinese patent Nos. 01126323.7, 02151294.9 and 02110844.7, and WO03/010207 disclose a catalyst or catalyst system finding a broad application in olefin polymerization. However, the catalyst or catalyst system should be accompanied by a comparatively high amount of co-catalysts, to achieve an acceptable olefin polymerization activity. Further, the catalyst or catalyst system suffers from such problems as short service life and fouling.

It is normal to support the nonmetallocene catalyst by a certain process, so as to improve the performance of the catalyst in the polymerization and the particle morphology of the polymer products. This is reflected by, moderate reduction of the initial activity of the catalyst, elongation of the serve life of the catalyst, alleviation or elimination of caking or flash reaction during the polymerization, improvement of the polymer morphology, and increase of the apparent density of the polymer, thus extending its use to other polymerization processes, for example, the gas phase polymerization or the slurry polymerization.

Aiming at the catalysts of the Chinese patent Nos. 01126323.7, 02151294.9 and 02110844.7, and WO03/010207, Chinese patent application Laid-Open Nos. CN1539855A, CN1539856A, CN1789291A, CN1789292A and CN1789290A, and WO2006/063501, and Chinese application patent No. 200510119401.x provide several ways to support same catalyst on a carrier so as to obtain a supported nonmetallocene catalyst. However, each of these applications relates to the technology of supporting a transition metal-containing nonmetallocene organic metallic compound on a treated carrier, which necessarily involves complicate preparation steps.

Most of the prior art olefin polymerization catalysts are metallocene catalyst-based, for example, those according to U.S. Pat. No. 4,808,561 and U.S. Pat. No. 5,240,894, Chinese patent application Laid-Open Nos. CN1344749A, CN1126480A, CN1307594A, CN1103069A, and CN1363537A, and U.S. Pat. No. 6,444,604, EP 0685494, U.S. Pat. No. 4,871,705 and EP0206794, and Chinese patent No. 94101358.8. Again, all of these applications relate to the technology of supporting a transition metal-containing metallocene catalyst on a treated carrier.

Chinese patent No. 200610026765.8 discloses a single site Zeigler-Natta catalyst for olefin polymerization. In this catalyst, a coordination group-containing salicylaldehyde or substituted salicylaldehyde derivative is used as the electron donor. The catalyst is produced by introducing a pre-treated carrier (for example, silica), a metallic compound (for example, TiCl4) and the electron donor into a magnesium compound (for example, MgCl2)/tetrahydrofuran solution and then post-treating the resultant.

Chinese patent No. 200610026766.2 is similar to this patent, and relates to an organic compound containing a hetero atom and use thereof for producing a Zeigler-Natta catalyst.

However, the prior art supported nonmetallocene catalyst generally suffers from the problem that if silica or a composite containing silica is used as the carrier for a nonmetallocene catalyst, this will be beneficial to the particle morphology of the resultant polymer, but silica suitable for this supporting purpose is rather expensive in cost, and has to be thermally activated or chemically activated before use, which necessitates complicate processing.

The magnesium compound is characterized by a low cost if used as the carrier for a catalyst. Further, there is strong inter-reaction between the magnesium compound and the active metals in a nonmetallocene complex and may easily lead to a supported nonmetallocene catalyst having a higher activity.

Chinese patent Nos. 200710162667.1 and CN200710162676.0 and PCT/CN2008/001739 disclose a supported nonmetallocene catalyst and preparation thereof, wherein a magnesium compound (for example magnesium halide, alkyl magnesium, alkoxyl magnesium, alkyl alkoxyl magnesium), a modified magnesium compound by chemically treating (by for example alkyl aluminum, alkoxy aluminum) the magnesium compound, or a modified magnesium compound by precipitating a magnesium compound-tetrahydrofuran-alcohol system is used as the carrier, and contacts with a nonmetallocene ligand and an active metal compound in different orders one after another to perform an in-situ supporting process. The nonmetallocene ligand is an organic compound, which has no metal active center in it and shows no activity for olefin polymerization, however will be given said activity after forming an organic metallic compound with a chemical treating agent by an in-situ reaction and given the ability to affect the polymerization performance of the catalyst and the properties of the resultant polymer product. Further, the composition of the resultant catalyst does not necessarily correspond to that fed to the reaction, and deviation between different batches in product quality occurs. Further, the in-situ process goes much more violent than a direct-supporting process, and this may lead to destruction of the already-formed structure of the carrier during the reaction there between, and lead to poor particle morphology of the resultant polymer.

Therefore, there still exists a need for a supported nonmetallocene catalyst, which can be produced in a simple way and in an industrial scale, free of the problems associated with the prior art supported nonmetallocene catalyst.

SUMMARY OF THE INVENTION

Upon in-depth study of the prior art, the present inventors found that a supported nonmetallocene catalyst produced by using a specific process can solve the problems identified as aforesaid, whereby achieving this invention.

According to this invention, the present process for producing a supported nonmetallocene catalyst can be conducted in the absence of any proton donor or any electron donor (for example, di-ether compounds conventionally used in this field for this purpose), without the need of severe reaction requirements and reaction conditions. For these reasons, the present process is simple and suitable for industrial application.

Specifically, this invention generally relates to the first to fourth embodiments as follows.

The first embodiment relates to a process for producing a supported nonmetallocene catalyst, which comprises the steps of: dissolving a magnesium compound and a nonmetallocene complex in a solvent, to obtain a magnesium compound solution; and drying the magnesium compound solution to obtain the supported nonmetallocene catalyst.

The second embodiment relates to a process for producing a supported nonmetallocene catalyst, which comprises the steps of: dissolving a magnesium compound and a nonmetallocene complex in a solvent, to obtain a magnesium compound solution; and introducing into the magnesium compound solution a precipitating agent to obtain the supported nonmetallocene catalyst.

The third embodiment relates to a process for producing a supported nonmetallocene catalyst, which comprises the steps of: dissolving a magnesium compound and a nonmetallocene complex in a solvent, to obtain a magnesium compound solution; drying the magnesium compound solution to obtain a modified carrier; and treating the modified carrier with a chemical treating agent selected from the group consisting of Group IVB metal compounds to obtain the supported nonmetallocene catalyst.

The fourth embodiment relates to a process for producing a supported nonmetallocene catalyst, which comprises the steps of: dissolving a magnesium compound and a nonmetallocene complex in a solvent, to obtain a magnesium compound solution; introducing into the magnesium compound solution a precipitating agent to obtain a modified carrier; and treating the modified carrier with a chemical treating agent selected from the group consisting of Group IVB metal compounds to obtain the supported nonmetallocene catalyst.

More specifically, this invention relates to the following aspects.

1. A process for producing a supported nonmetallocene catalyst, comprising the steps of: dissolving a magnesium compound and a nonmetallocene complex in a solvent, to obtain a magnesium compound solution; and drying the magnesium compound solution, or introducing into the magnesium compound solution a precipitating agent, to obtain the supported nonmetallocene catalyst.

2. A process for producing a supported nonmetallocene catalyst, comprising the steps of: dissolving a magnesium compound and a nonmetallocene complex in a solvent, to obtain a magnesium compound solution; drying the magnesium compound solution, or introducing into the magnesium compound solution a precipitating agent, to obtain a modified carrier; and treating the modified carrier with a chemical treating agent selected from the group consisting of a Group IVB metal compound to obtain the supported nonmetallocene catalyst.

3. The process according to any of the aforesaid aspects, further comprising the step of pre-treating the modified carrier with an assistant chemical treating agent selected from the group consisting of an aluminoxane, an alkylaluminum and any combination thereof before treating the modified carrier with the chemical treating agent.

4. The process according to any of the aforesaid aspects, wherein the magnesium compound is one or more selected from the group consisting of a magnesium halide, an alkoxy magnesium halide, an alkoxy magnesium, an alkyl magnesium, an alkyl magnesium halide and an alkyl alkoxy magnesium, preferably one or more selected from the group consisting of a magnesium halide, more preferably magnesium chloride.

5. The process according to any of the aforesaid aspects, wherein the solvent is one or more selected from the group consisting of a $C_{6-12}$ aromatic hydrocarbon, a halogenated $C_{6-12}$ aromatic hydrocarbon, an ester and an ether, preferably one or more selected from the group consisting of a $C_{6-12}$ aromatic hydrocarbon and tetrahydrofuran, more preferably tetrahydrofuran.

6. The process according to any of the aforesaid aspects, wherein the nonmetallocene complex is one or more selected from the group consisting of the compounds having the following structure,

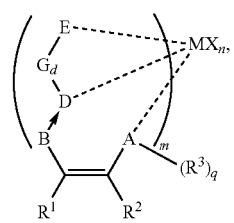

preferably one or more selected from the group consisting of the following compound (A) and the following compound (B),

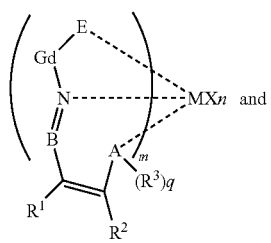
(A)
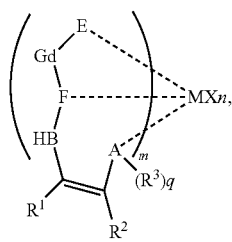
(B)
more preferably one or more selected from the group consisting of the following compound (A-1), the following compound (A-2), the following compound (A-3), the following compound (A-4), the following compound (B-1), the following compound (B-2), the following compound (B-3), and the following compound (B-4),
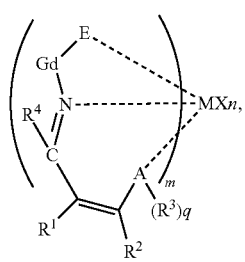
(A-1)
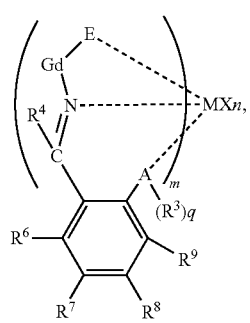
(A-2)
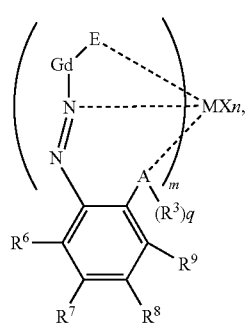
(A-3)
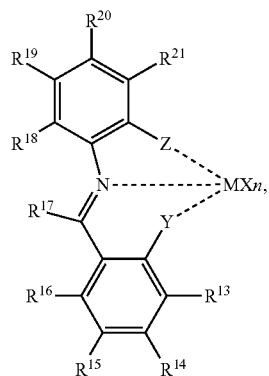
(A-4)
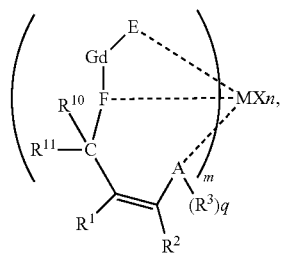
(B-1)
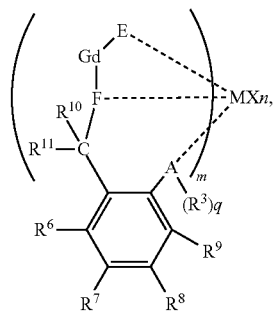
(B-2)
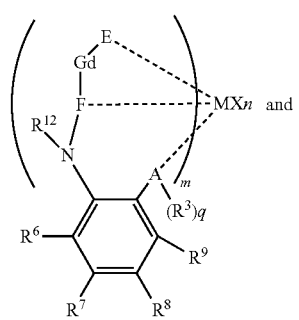
(B-3)

-continued (B-4)

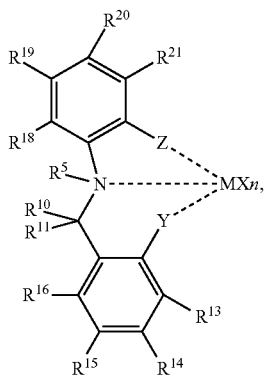

in all of the aforesaid formulae, q is 0 or 1;

d is 0 or 1;

m is 1, 2 or 3;

M is selected from the group consisting of a Group III to XI metal atom in the Periodic Table of Elements, preferably from the group consisting of a Group IVB metal atom, more preferably from the group consisting of Ti(IV) and Zr(IV);

n is 1, 2, 3 or 4, depending on the valence of the central metal atom M;

X is selected from the group consisting of a halogen atom, a hydrogen atom, a $C_1$-$C_{30}$ hydrocarbyl, a substituted $C_1$-$C_{30}$ hydrocarbyl, an oxygen-containing group, a nitrogen-containing group, a sulfur-containing group, a boron-containing group, an aluminium-containing group, a phosphor-containing group, a silicon-containing group, a germanium-containing group, and a tin-containing group, when multiple Xs exist, the Xs may be the same as or different from one another, and may form a bond or a ring with one another;

A is selected from the group consisting of an oxygen atom, a sulfur atom, a selenium atom,

—$NR^{23}R^{24}$, —$N(O)R^{25}R^{26}$,

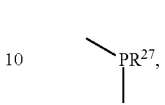

—$PR^{28}R^{29}$, —$P(O)R^{30}OR^{31}$, a sulfone group, a sulfoxide group and —$Se(O)R^{39}$, wherein N, O, S, Se and P each represents a coordination atom;

B is selected from the group consisting of a nitrogen atom, a nitrogen-containing group, a phosphor-containing group and a $C_1$-$C_{30}$ hydrocarbyl;

D is selected from the group consisting of a nitrogen atom, an oxygen atom, a sulfur atom, a selenium atom, a phosphor atom, a nitrogen-containing group, a phosphor-containing group, a $C_1$-$C_{30}$ hydrocarbyl, a sulfone group, a sulfoxide group,

and —$P(O)R^{32}(OR^{33})$, wherein N, O, S, Se and P each represents a coordination atom;

E is selected from the group consisting of a nitrogen-containing group, an oxygen-containing group, a sulfur-containing group, a selenium-containing group, a phosphor-containing group and a cyano group, wherein N, O, S, Se and P each represents a coordination atom;

F is selected from the group consisting of a nitrogen atom, a nitrogen-containing group, an oxygen-containing group, a sulfur-containing group, a selenium-containing group and a phosphor-containing group, wherein N, O, S, Se and P each represents a coordination atom;

G is selected from the group consisting of a $C_1$-$C_{30}$ hydrocarbyl, a substituted $C_1$-$C_{30}$ hydrocarbyl and an inert functional group;

Y is selected from the group consisting of an oxygen atom, a nitrogen-containing group, an oxygen-containing group, a sulfur-containing group, a selenium-containing group and a phosphor-containing group, wherein N, O, S, Se and P each represents a coordination atom;

Z is selected from the group consisting of a nitrogen-containing group, an oxygen-containing group, a sulfur-containing group, a selenium-containing group, a phosphor-containing group and a cyano group, wherein N, O, S, Se and P each represents a coordination atom;

→ represents a single bond or a double bond;

— represents a covalent bond or an ionic bond;

- - - represents a coordination bond, a covalent bond or an ionic bond;

$R^1$ to $R^4$, $R^6$ to $R^{36}$, $R^{38}$ and $R^{39}$ are each independently selected from the group consisting of a hydrogen atom, a $C_1$-$C_{30}$ hydrocarbyl, a substituted $C_1$-$C_{30}$ hydrocarbyl and an inert functional group, wherein these groups may be identical to or different from one another, and any adjacent groups may form a bond or a ring (preferably an aromatic ring) with one another; and $R^5$ is selected from the group consisting of the lone pair electron on the nitrogen atom, a hydrogen atom, a $C_1$-$C_{30}$ hydrocarbyl, a substituted $C_1$-$C_{30}$ hydrocarbyl, an oxygen-containing group, a sulfur-containing group, a nitrogen-containing group, a selenium-containing group, and a phosphor-containing group, with the proviso that when $R^5$ is the oxygen-containing group, the sulfur-containing group, the nitrogen-containing group, the selenium-containing group or the phosphor-containing group, N, O, S, P and Se in the group $R^5$ each can act as a coordination atom to coordinate with the central metal atom (the Group IVB metal atom), more preferably one or more selected from the group consisting of the following compounds,

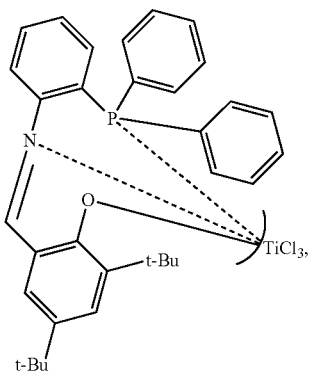

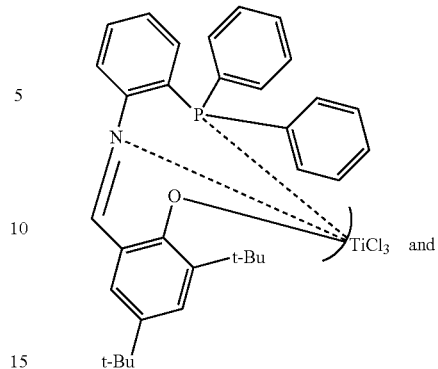

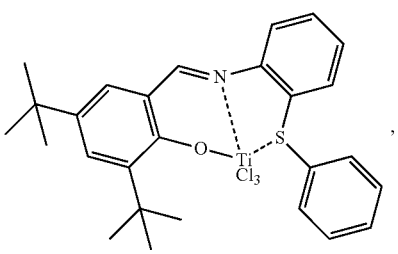

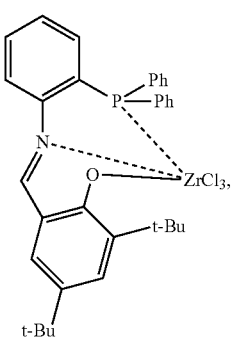

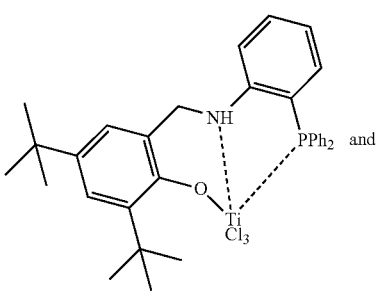

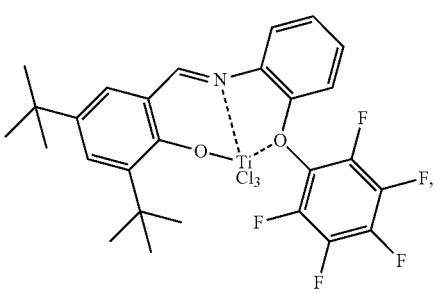

more preferably one or more selected from the group consisting of the following compounds, 7. The process according to any of the aforesaid aspects, wherein, the halogen atom is selected from the group consisting of F, Cl, Br and I, the nitrogen-containing group is selected from the group consisting of $$\diagdown N R^{22},$$

$-NR^{23}R^{24}$, $-T-NR^{23}R^{24}$ and $-N(O)R^{25}R^{26}$, the phosphor-containing group is selected from the group consisting of $$\diagdown P R^{27},$$

$-PR^{28}R^{29}$, $-P(O)R^{30}R^{31}$ and $-P(O)R^{32}(OR^{33})$, the oxygen-containing group is selected from the group consisting of hydroxy, $-OR^4$ and $-T-OR^{34}$, the sulfur-containing group is selected from the group consisting of $-SR^{35}$, $-T-SR^{35}$, $-S(O)R^{36}$ and $-T-SO_2R^{37}$, the selenium-containing group is selected from the group consisting of $-SeR^{38}$, $-T-SeR^{38}$, $-Se(O)R^{39}$ and $-T-Se(O)R^{39}$, the group T is selected from the group consisting of a $C_1$-$C_{30}$ hydrocarbyl, a substituted $C_1$-$C_{30}$ hydrocarbyl and an inert functional group, $R^{37}$ is selected from the group consisting of a hydrogen atom, a $C_1$-$C_{30}$ hydrocarbyl, a substituted $C_1$-$C_{30}$ hydrocarbyl and an inert functional group, the $C_1$-$C_{30}$ hydrocarbyl is selected from the group consisting of a $C_1$-$C_{30}$ alkyl group, a $C_7$-$C_{50}$ alkylaryl group, a $C_7$-$C_{50}$ aralkyl group, a $C_3$-$C_{30}$ cyclic alkyl group, a $C_2$-$C_{30}$ alkenyl group, a $C_2$-$C_{30}$ alkynyl group, a $C_5$-$C_{30}$ aryl group, a $C_8$-$C_{30}$ fused-ring group and a $C_4$-$C_{30}$ heterocycle group, wherein the heterocycle group contains 1 to 3 hetero atom(s) selected from the group consisting of a nitrogen atom, an oxygen atom and a sulfur atom, the substituted $C_1$-$C_{30}$ hydrocarbyl is selected from the group consisting of the $C_1$-$C_{30}$ hydrocarbyl having one or more substituent(s) selected from the halogen atom and the $C_1$-$C_{30}$ alkyl group, the inert functional group is selected from the group consisting of the halogen atom, the oxygen-containing group, the nitrogen-containing group, a silicon-containing group, a germanium-containing group, the sulfur-containing group, a tin-containing group, a $C_1$-$C_{10}$ ester group and a nitro group, the boron-containing group is selected from the group consisting of $BF_4^-$, $(C_6F_5)_4B^-$ and $(R^{40}BAr_3)^-$, the aluminium-containing group is selected from the group consisting of an alkyl aluminium, $AlPh_4^-$, $AlF_4^-$, $AlCl_4^-$, $AlBr_4^-$, $AlI_4^-$ and $R^4AlAr_3^-$, the silicon-containing group is selected from the group consisting of —$SiR^{42}R^{43}R^{44}$, and -T-$SiR^{45}$, the germanium-containing group is selected from the group consisting of —$GeR^{46}R^{47}R^{48}$, and -T-$GeR^{49}$, the tin-containing group is selected from the group consisting of —$SnR^{50}R^{51}R^{52}$-T-$SnR^{53}$ and -T-$Sn(O)R^{54}$, the Ar group represents a $C_6$-$C_{30}$ aryl group, $R^{40}$ to $R^{54}$ are each independently selected from the group consisting of a hydrogen atom, the $C_1$-$C_{30}$ hydrocarbyl, the substituted $C_1$-$C_{30}$ hydrocarbyl and the inert functional group, wherein these groups may be identical to or different from one another, and any adjacent groups may form a bond or a ring with one another, and the group T is defined as aforesaid.

8. The process according to any of the aforesaid aspects, wherein ratio by molar of the magnesium compound (based on Mg) to the nonmetallocene complex is 1:0.01-1, preferably 1:0.04-0.4, more preferably 1:0.08-0.2, ratio of the magnesium compound to the solvent is 1 mol:75~400 ml, preferably 1 mol:150~300 ml, more preferably 1 mol:200~250 ml, and ratio by volume of the precipitating agent to the solvent is 1:0.2~5, preferably 1:0.5~2, more preferably 1:0.8~1.5.

9. The process according to any of the aforesaid aspects, wherein the precipitating agent is one or more selected from the group consisting of an alkane, a cyclic alkane, a halogenated alkane and a halogenated cyclic alkane, preferably one or more selected from the group consisting of pentane, hexane, heptane, octane, nonane, decane, cyclohexane, cyclopentane, cycloheptane, cyclodecane, cyclononane, dichloromethane, dichloro hexane, dichloro heptane, trichloro methane, trichloro ethane, trichloro butane, dibromo methane, dibromo ethane, dibromo heptane, tribromo methane, tribromo ethane, tribromo butane, chlorinated cyclopentane, chlorinated cyclohexane, chlorinated cycloheptane, chlorinated cyclooctane, chlorinated cyclononane, chlorinated cyclodecane, brominated cyclopentane, brominated cyclohexane, brominated cycloheptane, brominated cyclooctane, brominated cyclononane and brominated cyclodecane, more preferably one or more selected from the group consisting of hexane, heptane, decane and cyclohexane, most preferably hexane.

10. The process according to any of the aforesaid aspects, wherein ratio by molar of the magnesium compound (based on Mg) to the nonmetallocene complex is 1:0.01-1, preferably 1:0.04-0.4, more preferably 1:0.08-0.2, ratio of the magnesium compound to the solvent is 1 mol:75~400 ml, preferably 1 mol:150~300 ml, more preferably 1 mol:200~250 ml, ratio by volume of the precipitating agent to the solvent is 1:0.2~5, preferably 1:0.5~2, more preferably 1:0.8~1.5, and ratio by molar of the magnesium compound (based on Mg) to the chemical treating agent (based on the Group IVB metal) is 1:0.01-1, preferably 1:0.01-0.50, more preferably 1:0.10-0.30.

11. The process according to any of the aforesaid aspects, wherein the Group IVB metal compound is one or more selected from the group consisting of a Group IVB metal halide, a Group IVB metal alkylate, a Group IVB metal alkoxylate, a Group IVB metal alkyl halide, and a Group IVB metal alkoxy halide, preferably one or more selected from the group consisting of a Group IVB metal halide, more preferably one or more selected from the group consisting of $TiCl_4$, $TiBr_4$, $ZrCl_4$, $ZrBr_4$, $HfCl_4$ and $HfBr_4$, more preferably one or more selected from the group consisting of $TiCl_4$ and $ZrCl_4$.

12. The process according to any of the aforesaid aspects, wherein the aluminoxane is one or more selected from the group consisting of methyl aluminoxane, ethyl aluminoxane, isobutyl aluminoxane and n-butyl aluminoxane, preferably one or more selected from the group consisting of methyl aluminoxane and isobutyl aluminoxane, and the alkylaluminum is one or more selected from the group consisting of trimethyl aluminum, triethyl aluminum, tripropyl aluminum, triisobutyl aluminum, tri-n-butyl aluminum, triisoamyl aluminum, tri-n-amyl aluminum, trihexyl aluminum, tri-isohexyl aluminum, diethyl methyl aluminum and ethyl dimethyl aluminum, more preferably one or more selected from the group consisting of trimethyl aluminum, triethyl aluminum, tripropyl aluminum and triisobutyl aluminum, most preferably one or more selected from the group consisting of triethyl aluminum and triisobutyl aluminum.

13. The process according to any of the aforesaid aspects, wherein ratio by molar of the magnesium compound (based on Mg) to the assistant chemical treating agent (based on Al) is 1:0-1.0, preferably 1:0-0.5, more preferably 1:0.1-0.5.

14. A supported nonmetallocene catalyst, produced in line with the process according to any of the aspects 1 to 13.

15. An olefin homopolymerization/copolymerization process, wherein the supported nonmetallocene catalyst according to the aspect 14 is used as the main catalyst, in combination of one or more selected from the group consisting of an aluminoxane, an alkylaluminum, a halogenated alkyl aluminum, a fluoroborane, an alkylboron and an alkylboron ammonium salt as the co-catalyst, for homopolymerization or copolymerization of the olefin.

16. An olefin homopolymerization/copolymerization process, comprising the steps of: producing a supported nonmetallocene catalyst in line with the process according to any of the aspects 1 to 13; and using the supported nonmetallocene catalyst as the main catalyst, in combination of one or more selected from the group consisting of an aluminoxane, an alkylaluminum, a halogenated alkyl aluminum, a fluoroborane, an alkylboron and an alkylboron ammonium salt as the co-catalyst, for homopolymerization or copolymerization of the olefin.

EFFECT OF THE INVENTION

According to the first and second embodiments of this invention, the following effects can be obtained.

The process for producing the supported nonmetallocene catalyst according to this invention is simple and feasible. It is easy to adjust the load of the nonmetallocene complex, and it is possible for it to perform sufficiently in catalyzing olefin polymerization to obtain an olefin polymer product.

According to the process of this invention (concerning the first embodiment), the catalyst has been produced by directly drying the magnesium compound solution, and therefore it is easy to adjust the composition and amount of the essential materials in the catalyst. And the activity of the resultant catalyst is higher than that obtained by filtering, washing and drying the magnesium compound solution.

According to the process of this invention (concerning the second embodiment), the catalyst has been produced by sufficiently precipitating the magnesium compound solution in the presence of a precipitating agent and then filtering, washing and drying the resultant, and therefore the bonding between the essential materials in the catalyst is relatively strong.

When a catalyst system is constituted by using the supported single site nonmetallocene catalyst produced by the present process in combination with a co-catalyst, the polymer resulted from olefin polymerization exhibits a narrowed molecular weight distribution, when used for copolymerization, the catalyst system shows a significant co-monomer effect, i.e. under relatively the same conditions, the activity in copolymerization is higher than that in homopolymerization.

According to the third and fourth embodiments of this invention, the following effects can be obtained.

The process for producing the supported nonmetallocene catalyst according to this invention is simple and feasible, and it is easy to control the composition and amount of the essential materials in the catalyst. Further, it is easy to adjust the load of the nonmetallocene complex, and it is possible for it to perform sufficiently in catalyzing olefin polymerization to obtain an olefin polymer product. Still further, it is possible to adjust the molecular weight distribution of the polymer and the viscosity averaged molecular weight of the ultra high molecular weight polyethylene by altering the amount of the nonmetallocene complex to be introduced.

Further, by altering the amount of the assistant chemical treating agent and that of the chemical treating agent to be introduced, it is possible to obtain a supported nonmetallocene catalyst showing a easily controllable polymerization activity, from low to high, whereby responding to different olefin polymerization requirements, and it is possible to adjust the performances of the catalyst and the properties of the polymer in combination of the step of altering the amount of the nonmetallocene complex to be introduced.

The active components (i.e. the nonmetallocene complex and the chemical treating agent) in the supported nonmetallocene catalyst produced in line with the process according to this invention show a synergic effect, i.e. the activity obtained with the case when both components exist is higher than that when only either component exists.

According to the process of this invention (concerning the third embodiment), the modified carrier has been produced by directly drying the magnesium compound solution, and therefore it is easy to adjust the composition and amount of the essential materials in the catalyst. And the activity of the resultant catalyst is higher than that obtained by filtering, washing and drying the magnesium compound solution.

Further discovered is that, when a catalyst system is constituted by using the catalyst according to this invention in combination with a co-catalyst, only a comparatively small amount of the co-catalyst (for example, methyl aluminoxane or triethyl aluminium) is needed to achieve a comparatively high polymerization activity, and when used for copolymerization, the catalyst system shows a significant co-monomer effect, i.e. under relatively the same conditions, the activity in copolymerization is higher than that in homopolymerization. Further, the polymer (for example polyethylene) resulted from olefin homopolymerization or copolymerization has a desirable polymer morphology and a high polymer bulk density.

DETAILED DESCRIPTION OF THE INVENTION

This invention will be described in details hereinafter with reference to the following specific embodiments. However, it is known that the protection scope of this invention should not be construed as limited to these specific embodiments, but rather determined by the attached claims.

According to this invention, generally disclosed are the following first to fourth embodiments.

The first embodiment relates to a process for producing a supported nonmetallocene catalyst, which comprises the steps of: dissolving a magnesium compound and a nonmetallocene complex in a solvent, to obtain a magnesium compound solution; and drying the magnesium compound solution to obtain the supported nonmetallocene catalyst.

The second embodiment relates to a process for producing a supported nonmetallocene catalyst, which comprises the steps of: dissolving a magnesium compound and a nonmetallocene complex in a solvent, to obtain a magnesium compound solution; and introducing into the magnesium compound solution a precipitating agent to obtain the supported nonmetallocene catalyst.

The third embodiment relates to a process for producing a supported nonmetallocene catalyst, which comprises the steps of: dissolving a magnesium compound and a nonmetallocene complex in a solvent, to obtain a magnesium compound solution; drying the magnesium compound solution to obtain a modified carrier; and treating the modified carrier with a chemical treating agent selected from the group consisting of Group IVB metal compounds to obtain the supported nonmetallocene catalyst.

The fourth embodiment relates to a process for producing a supported nonmetallocene catalyst, which comprises the steps of: dissolving a magnesium compound and a nonmetallocene complex in a solvent, to obtain a magnesium compound solution; introducing into the magnesium compound solution a precipitating agent to obtain a modified carrier; and treating the modified carrier with a chemical treating agent selected from the group consisting of Group IVB metal compounds to obtain the supported nonmetallocene catalyst.

First of all, the step of obtaining the magnesium compound solution according to the first to fourth embodiments of this invention is detailedly described as follows.

Specifically, the magnesium compound (solid) and the nonmetallocene complex are dissolved in a suitable solvent (hereinafter referred to as a solvent for dissolving the magnesium compound) to obtain the magnesium compound solution.

As the solvent, a $C_{6-12}$ aromatic hydrocarbon, a halogenated $C_{6-12}$ aromatic hydrocarbon, an ester and an ether can be exemplified. Specifically, toluene, xylene, trimethyl benzene, ethyl benzene, diethyl benzene, chlorinated toluene, chlorinated ethyl benzene, brominated toluene, brominated ethyl benzene, ethyl acetate and tetrahydrofuran can be exemplified. Preference is given to the $C_{6-12}$ aromatic hydrocarbon or tetrahydrofuran, more preferably tetrahydrofuran.

The solvents could be used with one kind or as a mixture of two or more kinds at any ratio therebetween.

For preparation of the magnesium compound solution, the magnesium compound and the nonmetallocene complex are metered into and dissolved in said solvent.

During preparation of the magnesium compound solution, it is desirable that the ratio of the magnesium compound (based on Mg and on a solid basis) to the solvent for dissolving the magnesium compound is generally 1 mol:75~400 ml, preferably 1 mol:150~300 ml, more preferably 1 mol:200~250 ml.

According to this invention, as the amount of the nonmetallocene complex to be used, it is desirable that the ratio by molar of the magnesium compound (based on Mg and on a solid basis) to the nonmetallocene complex is 1:0.01-1, preferably 1:0.04-0.4, more preferably 1:0.08-0.2.

The duration for preparing the magnesium compound solution (i.e. the duration for dissolving the magnesium compound and the nonmetallocene complex) is not specifically limited, usually 0.5 to 24 hours, preferably 4 to 24 hours. During preparation of the magnesium compound solution, any stirring means for example, a stirring paddle (whose rotational speed could be 10 to 1000 r/min), could be used to facilitate dissolution of the magnesium compound and the nonmetallocene complex. If needed, heat can be suitably applied to facilitate the dissolution.

The magnesium compound is further described as follows.

According to this invention, the term "magnesium compound" is explained in a normal sense as known in this field, and refers to an organic or inorganic solid anhydrous Mg-containing compound conventionally used as a carrier for a supported catalyst for olefin polymerization.

According to this invention, as the magnesium compound, a magnesium halide, an alkoxy magnesium halide, an alkoxy magnesium, an alkyl magnesium, an alkyl magnesium halide and an alkyl alkoxy magnesium can be exemplified.

Specifically, the magnesium halide for example, could be selected from the group consisting of magnesium chloride ($MgCl_2$), magnesium bromide ($MgBr_2$), magnesium iodide ($MgI_2$) and magnesium fluoride ($MgF_2$), etc., such as magnesium chloride.

The alkoxy magnesium halide for example, could be selected from the group consisting of methoxy magnesium chloride ($Mg(OCH_3)Cl$), ethoxy magnesium chloride ($Mg(OC_2H_5)Cl$), propoxy magnesium chloride ($Mg(OC_3H_7)Cl$), n-butoxy magnesium chloride ($Mg(OC_4H_9)Cl$), isobutoxy magnesium chloride ($Mg(i-OC_4H_9)Cl$), methoxy magnesium bromide ($Mg(OCH_3)Br$), ethoxy magnesium bromide ($Mg(OC_2H_5)Br$), propoxy magnesium bromide ($Mg(OC_3H_7)Br$), n-butoxy magnesium bromide ($Mg(OC_4H_9)Br$), isobutoxy magnesium bromide ($Mg(i-OC_4H_9)Br$), methoxy magnesium iodide ($Mg(OCH_3)I$), ethoxy magnesium iodide ($Mg(OC_2H_5)I$), propoxy magnesium iodide ($Mg(OC_3H_7)I$), n-butoxy magnesium iodide ($Mg(OC_4H_9)I$) and isobutoxy magnesium iodide ($Mg(i-OC_4H_9)I$), etc., such as methoxy magnesium chloride, ethoxy magnesium chloride and isobutoxy magnesium chloride.

The alkoxy magnesium for example, could be selected from the group consisting of methoxy magnesium ($Mg(OCH_3)_2$), ethoxy magnesium ($Mg(OC_2H_5)_2$), propoxy magnesium ($Mg(OC_3H_7)_2$), butoxy magnesium ($Mg(OC_4H_9)_2$), isobutoxy magnesium ($Mg(i-OC_4H_9)_2$) and 2-ethyl hexyloxy magnesium ($Mg(OCH_2CH(C_2H_5)C_4H)_2$), etc., such as ethoxy magnesium and isobutoxy magnesium.

The alkyl magnesium for example, could be selected from the group consisting of methyl magnesium ($Mg(CH_3)_2$), ethyl magnesium ($Mg(C_2H_5)_2$), propyl magnesium ($Mg(C_3H_7)_2$), n-butyl magnesium ($Mg(C_4H_9)_2$) and isobutyl magnesium ($Mg(i-C_4H_9)_2$), etc., such as ethyl magnesium and n-butyl magnesium.

The alkyl magnesium halide for example, could be selected from the group consisting of methyl magnesium chloride ($Mg(CH_3)Cl$), ethyl magnesium chloride ($Mg(C_2H_5)Cl$), propyl magnesium chloride ($Mg(C_3H_7)Cl$), n-butyl magnesium chloride ($Mg(C_4H_9)Cl$), isobutyl magnesium chloride ($Mg(i-C_4H_9)Cl$), methyl magnesium bromide ($Mg(CH_3)Br$), ethyl magnesium bromide ($Mg(C_2H_5)Br$), propyl magnesium bromide ($Mg(C_3H_7)Br$), n-butyl magnesium bromide ($Mg(C_4H_9)Br$), isobutyl magnesium bromide ($Mg(i-C_4H_9)Br$), methyl magnesium iodide ($Mg(CH_3)I$), ethyl magnesium iodide ($Mg(C_2H_5)I$), propyl magnesium iodide ($Mg(C_3H_7)I$), n-butyl magnesium iodide ($Mg(C_4H_9)I$) and isobutyl magnesium iodide ($Mg(i-C_4H_9)I$), etc., such as methyl magnesium chloride, ethyl magnesium chloride and isobutyl magnesium chloride.

The alkyl alkoxy magnesium for example, could be selected from the group consisting of methyl methoxy magnesium ($Mg(OCH_3)(CH_3)$), methyl ethoxy magnesium ($Mg(OC_2H_5)(CH_3)$), methyl propoxy magnesium ($Mg(OC_3H_7)(CH_3)$), methyl n-butoxy magnesium ($Mg(OC_4H_9)(CH_3)$), methyl isobutoxy magnesium ($Mg(i-OC_4H_9)(CH_3)$), ethyl methoxy magnesium ($Mg(OCH_3)(C_2H_5)$), ethyl ethoxy magnesium ($Mg(OC_2H_5)(C_2H_5)$), ethyl propoxy magnesium ($Mg(OC_3H_7)(C_2H_5)$), ethyl n-butoxy magnesium ($Mg(OC_4H_9)(C_2H_5)$), ethyl isobutoxy magnesium ($Mg(i-OC_4H_9)(C_2H_5)$), propyl methoxy magnesium ($Mg(OCH_3)(C_3H_7)$), propyl ethoxy magnesium ($Mg(OC_2H_5)(C_3H_7)$), propyl propoxy magnesium ($Mg(OC_3H_7)(C_3H_7)$), propyl n-butoxy magnesium ($Mg(OC_4H_9)(C_3H_7)$), propyl isobutoxy magnesium ($Mg(i-OC_4H_9)(C_3H_7)$), n-butyl methoxy magnesium ($Mg(OCH_3)(C_4H_9)$), n-butyl ethoxy magnesium ($Mg(OC_2H_5)(C_4H_9)$), n-butyl propoxy magnesium ($Mg(OC_3H_7)(C_4H_9)$), n-butyl n-butoxy magnesium ($Mg(OC_4H_9)(C_4H_9)$), n-butyl isobutoxy magnesium ($Mg(i-OC_4H_9)(C_4H_9)$), isobutyl methoxy magnesium ($Mg(OCH_3)(i-C_4H_9)$), isobutyl ethoxy magnesium ($Mg(OC_2H_5)(i-C_4H_9)$), isobutyl propoxy magnesium ($Mg(OC_3H_7)(i-C_4H_9)$), isobutyl n-butoxy magnesium ($Mg(OC_4H_9)(i-C_4H_9)$) and isobutyl isobutoxy magnesium ($Mg(i-OC_4H_9)(i-C_4H_9)$), etc., such as butyl ethoxy magnesium.

The magnesium compounds could be used with one kind or as a mixture of two or more kinds, but without any limitation thereto.

For example, if more than one magnesium compounds are used as a mixture, the ratio by molar of one magnesium compound to another magnesium compound in the mixture could be, for example, 0.25 to 4:1, such as 0.5 to 3:1, such as 1 to 2:1.

According to this invention, the term "nonmetallocene complex" refers to an organic metallic compound capable of exhibiting a catalysis activity in olefin polymerization when combined with an aluminoxane (sometimes hereinafter referred to as a nonmetallocene complex for olefin polymerization). The compound contains a central metal atom and at least one multi-dentate ligand (preferably a tri or more -dentate ligand) bonding to the central metal atom by a coordination bond. The term "nonmetallocene ligand" corresponds to the multi-dentate ligand.

According to this invention, the nonmetallocene complex is selected from the compounds having the following structure,

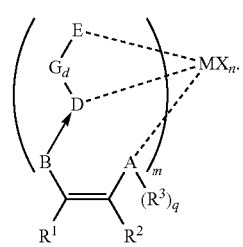

According to aforesaid chemical formula, the ligands which form a coordination bond with the central metal atom M contain n of the groups X and m of the multi-dentate ligands (the structure in the parenthesis). According to the chemical formula of said multi-dentate ligand, the groups A, D and E (the coordination groups) form a coordination bond with the central metal atom M through the coordination atoms (for example, hetero atoms like N, O, S, Se and P) contained in these groups.

According to this invention, the absolute value of the total sum of the negative charges carried by all of the ligands (including the group X and the multi-dentate ligand) is equal to that of the positive charges carried by the central metal atom M.

According to a further embodiment of this invention, the nonmetallocene complex is selected from the following compound (A) and the following compound (B),

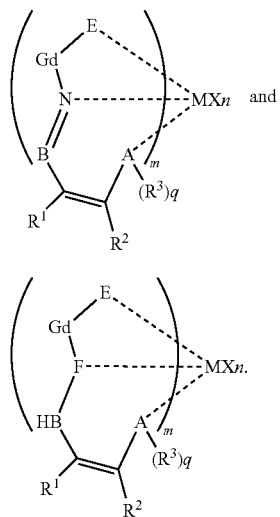

(A)

(B)

According to a further embodiment of this invention, the nonmetallocene complex is selected from the following compound (A-1), the following compound (A-2), the following compound (A-3), the following compound (A-4), the following compound (B-1), the following compound (B-2), the following compound (B-3), and the following compound (B-4),

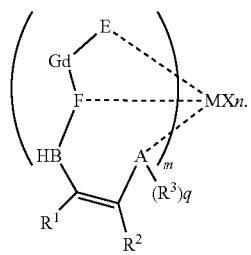

(A-1)

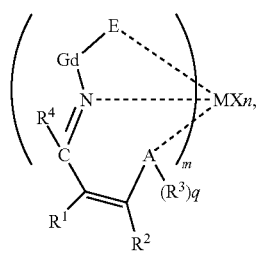

(A-2)

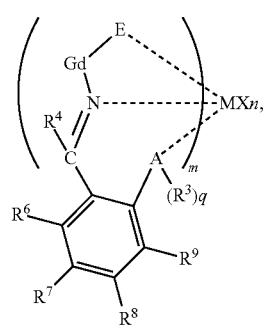

-continued

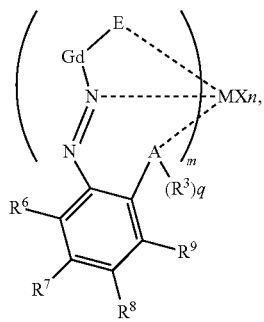

(A-3)

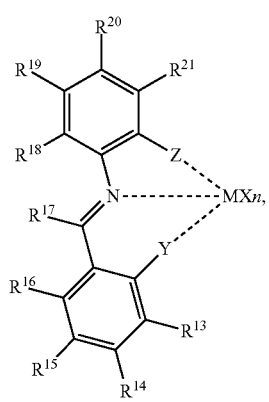

(A-4)

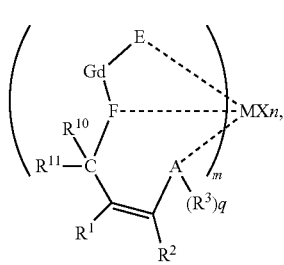

(B-1)

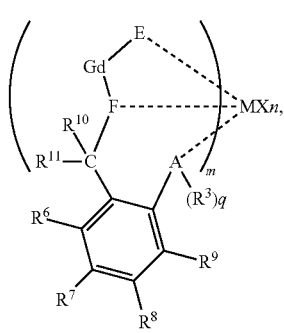

(B-2)

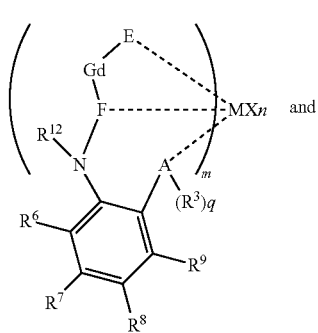

(B-3)

-continued

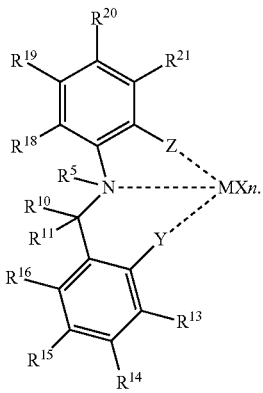

(B-4)

—N(O)R$^{25}$R$^{26}$,

and —P(O)R$^{32}$(OR$^{33}$), wherein N, O, S, Se and P each represents a coordination atom;

E is selected from the group consisting of a nitrogen-containing group, an oxygen-containing group, a sulfur-containing group, a selenium-containing group, a phosphor-containing group and a cyano group (—CN), wherein N, O, S, Se and P each represents a coordination atom;

F is selected from the group consisting of a nitrogen atom, a nitrogen-containing group, an oxygen-containing group, a sulfur-containing group, a selenium-containing group and a phosphor-containing group, wherein N, O, S, Se and P each represents a coordination atom;

G is selected from the group consisting of a $C_1$-$C_{30}$ hydrocarbyl, a substituted $C_1$-$C_{30}$ hydrocarbyl and an inert functional group;

Y is selected from the group consisting of an oxygen atom, a nitrogen-containing group, an oxygen-containing group, a sulfur-containing group, a selenium-containing group and a phosphor-containing group, wherein N, O, S, Se and P each represents a coordination atom;

Z is selected from the group consisting of a nitrogen-containing group, an oxygen-containing group, a sulfur-containing group, a selenium-containing group, a phosphor-containing group and a cyano group (—CN), for example, —NR$^{23}$R$^{24}$, —N(O)R$^{25}$R$^{26}$, —PR$^{28}$R$^{29}$, —P(O)R$^{30}$R$^{31}$, —OR$^{34}$, —SR$^{35}$, —S(O)R$^{36}$, —SeR$^{38}$ or —Se(O)R$^{39}$, wherein N, O, S, Se and P each represents a coordination atom;

→ represents a single bond or a double bond;
— represents a covalent bond or an ionic bond;
- - - represents a coordination bond, a covalent bond or an ionic bond;

$R^1$ to $R^4$, $R^6$ to $R^{36}$, $R^{38}$ and $R^{39}$ are each independently selected from the group consisting of a hydrogen atom, a $C_1$-$C_{30}$ hydrocarbyl, a substituted $C_1$-$C_{30}$ hydrocarbyl (preferably a halogenated hydrocarbyl, for example —CH$_2$Cl and —CH$_2$CH$_2$Cl) and an inert functional group, wherein these groups may be identical to or different from one another, and any adjacent groups (for example $R^1$ and $R^2$, $R^6$ and $R^7$, $R^7$ and $R^8$, $R^8$ and $R^9$, $R^{13}$ and $R^{14}$, $R^{14}$ and $R^{15}$, $R^{15}$ and $R^{16}$, $R^{18}$ and $R^{19}$, $R^{19}$ and $R^{20}$, $R^{20}$ and $R^{21}$, $R^{23}$ and $R^{24}$, or $R^{25}$ and $R^{26}$) may form a bond or a ring (preferably an aromatic ring, for example a unsubstituted benzene ring or a benzene ring substituted by one to four of a $C_1$-$C_{30}$ hydrocarbyl, a substituted $C_1$-$C_{30}$ hydrocarbyl (preferably a halogenated hydrocarbyl, for example —CH$_2$Cl and —CH$_2$CH$_2$Cl) or an inert functional group) with one another; and $R^5$ is selected from the group consisting of the lone pair electron on the nitrogen atom, a hydrogen atom, a $C_1$-$C_{30}$ hydrocarbyl, a substituted $C_1$-$C_{30}$ hydrocarbyl, an oxygen-containing group, a sulfur-containing group, a nitrogen-containing group, a selenium-containing group, and a phosphor-containing group, with the proviso that when $R^5$ is the oxygen-containing group, the sulfur-containing group, the In all of the aforesaid formulae, q is 0 or 1;

d is 0 or 1;

m is 1, 2 or 3;

M is selected from the group consisting of a Group III to XI metal atom in the Periodic Table of Elements, preferably a Group IVB metal atom, for example, Ti(IV), Zr(IV), Hf(IV), Cr(III), Fe(III), Ni(II), Pd(II) or Co(II);

n is 1, 2, 3 or 4, depending on the valence of the central metal atom M;

X is selected from the group consisting of a halogen atom, a hydrogen atom, a $C_1$-$C_{30}$ hydrocarbyl, a substituted $C_1$-$C_{30}$ hydrocarbyl, an oxygen-containing group, a nitrogen-containing group, a sulfur-containing group, a boron-containing group, an aluminium-containing group, a phosphor-containing group, a silicon-containing group, a germanium-containing group, and a tin-containing group, when multiple Xs exist, the Xs may be the same as or different from one another, and may form a bond or a ring with one another;

A is selected from the group consisting of an oxygen atom, a sulfur atom, a selenium atom,

—NR$^{23}$R$^{24}$, —N(O)R$^{25}$R$^{26}$,

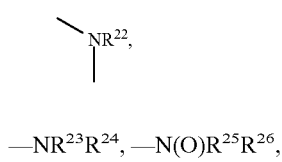

—PR$^{28}$R$^{29}$, —P(O)R$^{30}$OR$^{31}$, a sulfone group, a sulfoxide group and —Se(O)R$^{39}$, wherein N, O, S, Se and P each represents a coordination atom;

B is selected from the group consisting of a nitrogen atom, a nitrogen-containing group, a phosphor-containing group and a $C_1$-$C_{30}$ hydrocarbyl;

D is selected from the group consisting of a nitrogen atom, an oxygen atom, a sulfur atom, a selenium atom, a phosphor atom, a nitrogen-containing group, a phosphor-containing group, a $C_1$-$C_{30}$ hydrocarbyl, a sulfone group, a sulfoxide group, nitrogen-containing group, the selenium-containing group or the phosphor-containing group, N, O, S, P and Se in the group $R^5$ each can act as a coordination atom to coordinate with the central metal atom (the Group IVB metal atom).

According to this invention, in all of the aforesaid formulae, if necessary, any two or more adjacent groups (for example $R^{21}$ and the group Z, or $R^{13}$ and the group Y) may form a ring with one another, preferably a $C_6$-$C_{30}$ aromatic heteroatomic ring containing the hetero atom originated from the group Z or Y, for example a pyridine ring, wherein the aromatic heteroatomic ring is optionally substituted by one or more substituent(s) selected from the group consisting of a $C_1$-$C_{30}$ hydrocarbyl, a substituted $C_1$-$C_{30}$ hydrocarbyl and an inert functional group.

In the context of this invention, the halogen atom is selected from the group consisting of F, Cl, Br and I the nitrogen-containing group is selected from the group consisting of

—$NR^{23}R^{24}$, -T-$NR^{23}R^{24}$ and —$N(OR^{25}R^{26})$, the phosphor-containing group is selected from the group consisting of

—$PR^{28}R^{29}$, —$P(O)R^{30}R^{31}$ and —$P(O)R^{32}(OR^{33})$, the oxygen-containing group is selected from the group consisting of hydroxy, —$OR^{34}$ and -T-$OR^{34}$, the sulfur-containing group is selected from the group consisting of —$SR^{35}$, -T-$SR^{35}$, —$S(O)R^{36}$ and -T-$SO_2R^{37}$, the selenium-containing group is selected from the group consisting of —$SeR^{38}$, -T-$SeR^{38}$, —$Se(O)R^{39}$ and -T-$Se(O)R^{39}$, the group T is selected from the group consisting of a $C_1$-$C_{30}$ hydrocarbyl, a substituted $C_1$-$C_{30}$ hydrocarbyl and an inert functional group, and $R^{37}$ is selected from the group consisting of a hydrogen atom, a $C_1$-$C_{30}$ hydrocarbyl, a substituted $C_1$-$C_{30}$ hydrocarbyl and an inert functional group.

In the context of this invention, the $C_1$-$C_{30}$ hydrocarbyl is selected from the group consisting of a $C_1$-$C_{30}$ alkyl group (for example a $C_1$-$C_6$ alkyl group, for example isobutyl group), a $C_7$-$C_{50}$ alkylaryl group (for example tolyl, xylyl, diisobutyl phenyl), a $C_7$-$C_{50}$ aralkyl group (for example benzyl), a $C_3$-$C_{30}$ cyclic alkyl group, a $C_2$-$C_{30}$ alkenyl group, a $C_2$-$C_{30}$ alkynyl group, a $C_6$-$C_{30}$ aryl group (for example phenyl, naphthyl, anthracyl), a $C_8$-$C_{30}$ fused-ring group and a $C_4$-$C_{30}$ heterocyclic group, wherein the heterocyclic group contains 1 to 3 hetero atom(s) selected from the group consisting of a nitrogen atom, an oxygen atom and a sulfur atom, including for example a pyridyl group, a pyrrolyl group, a furanyl group and a thienyl group.

In the context of this invention, depending on the nature of the relevant groups to which the $C_1$-$C_{30}$ hydrocarbyl bond, it is obvious to a person skilled in the art that the $C_1$-$C_{30}$ hydrocarbyl may intend a $C_1$-$C_{30}$ hydrocarbon-diyl (a bivalent group, or referred to as a $C_1$-$C_{30}$ hydrocarbylene group) or a $C_1$-$C_{30}$ hydrocarbon-triyl (a trivalent group).

In the context of this invention, the substituted $C_1$-$C_{30}$ hydrocarbyl intends the aforesaid $C_1$-$C_{30}$ hydrocarbyl having one or more inert substituent(s). By inert, it means that these inert substituents will not substantially interfere with the coordination process between the aforesaid coordination groups (i.e. the aforesaid groups A, D, E, F, Y and Z, or further, if applicable, the group $R^5$) and the central metal atom M. In other words, restricted by the specific chemical structure of the present multi-dentate ligand, these substituents are incapable of or have no chance (due to for example steric hindrance) to coordinate with the central metal atom M to form a coordination bond therewith. Generally, the inert substituent refers to the aforesaid halogen atom or $C_1$-$C_{30}$ alkyl group (for example a $C_1$-$C_6$ alkyl group, for example isobutyl group).

In the context of this invention, the term "inert functional group" does not comprise the aforesaid $C_1$-$C_{30}$ hydrocarbyl or substituted $C_1$-$C_{30}$ hydrocarbyl in its concept. As the inert functional group, the halogen atom, the oxygen-containing group, the nitrogen-containing group, a silicon-containing group, a germanium-containing group, the sulfur-containing group, a tin-containing group, a $C_1$-$C_{10}$ ester group or a nitro group (—$NO_2$) can be exemplified.

In the context of this invention, restricted by the specific structure of the present multi-dentate ligand, the inert functional group is characterized that:
(1) it will not interfere with the coordination process between the aforesaid group A, D, E, F, Y or Z and the central metal atom M, and
(2) its capability to form a coordination bond with the central metal atom M is inferior to the capability of the aforesaid group A, D, E, F, Y or Z to form a coordination bond with the central metal atom M, and it will not displace the formed coordination between the central metal atom M and these groups.

In the context of this invention, the boron-containing group is selected from the group consisting of $BF_4^-$, $(C_6F_5)_4B^-$ and $(R^{40}BAr_3)^-$, the aluminium-containing group is selected from the group consisting of an alkyl aluminium, $AlPh_4^-$, $AlF_4^-$, $AlCl_4^-$, $AlBr_4^-$, $AlI_4$ and $R^{41}AlAr_3^-$, the silicon-containing group is selected from the group consisting of —$SiR^{42}R^{43}R^{44}$, and -T-$SiR^{45}$, the germanium-containing group is selected from the group consisting of —$GeR^{46}R^{47}R^{48}$, and -T-$GeR^4$, the tin-containing group is selected from the group consisting of —$SnR^{50}R^{51}R^{52}$, -T-$SnR^{53}$ and -T-$Sn(O)R^{54}$, the Ar group represents a $C_6$-$C_{30}$ aryl group, $R^{40}$ to $R^{54}$ are each independently selected from the group consisting of a hydrogen atom, the $C_1$-$C_{30}$ hydrocarbyl, the substituted $C_1$-$C_{30}$ hydrocarbyl and the inert functional group, wherein these groups may be identical to or different from one another, and any adjacent groups may form a bond or a ring with one another, and the group T is defined as aforesaid.

As the nonmetallocene complex, the following compounds can be further exemplified.

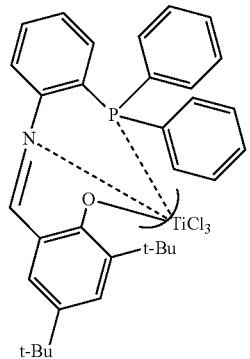

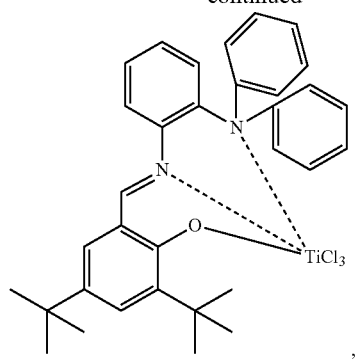
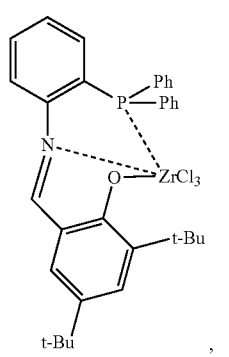
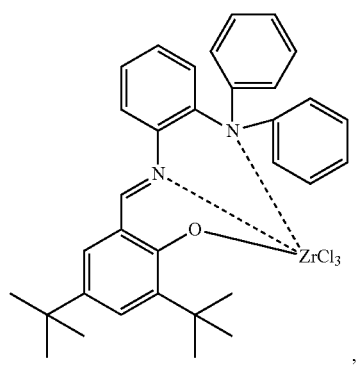
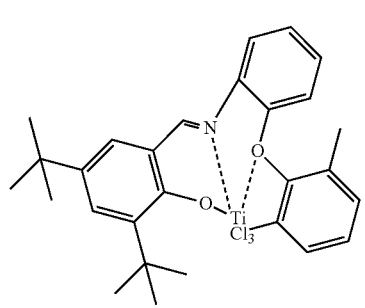
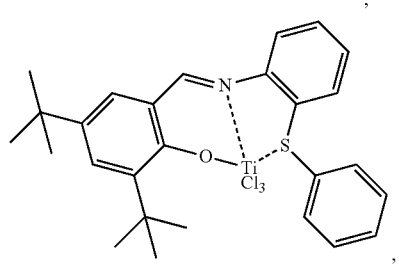
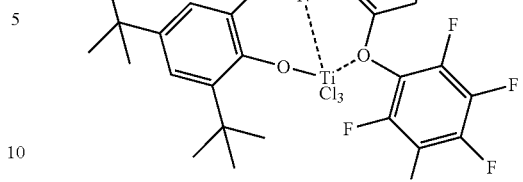
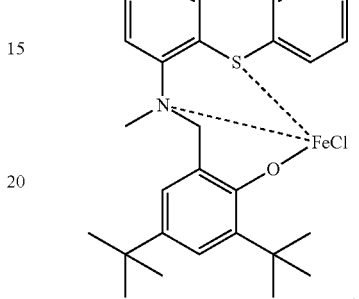
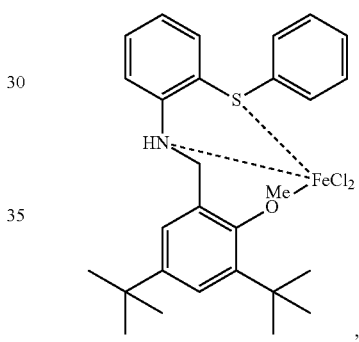
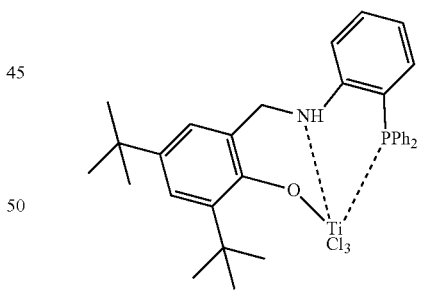
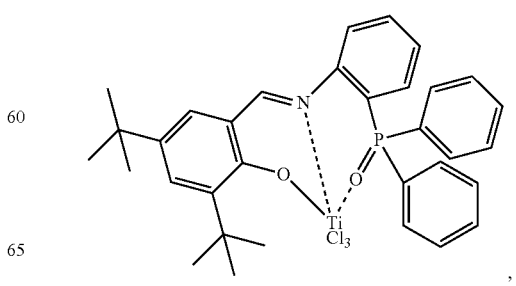

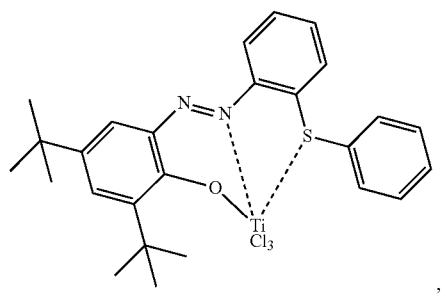
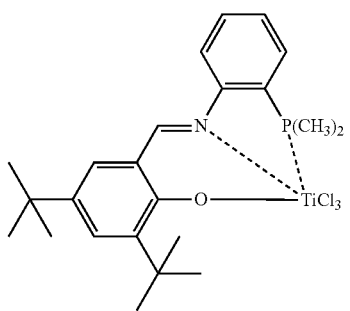
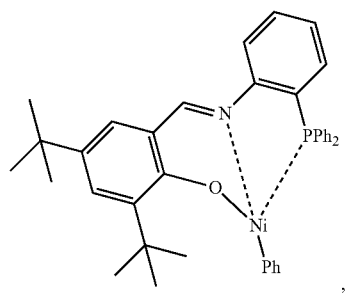
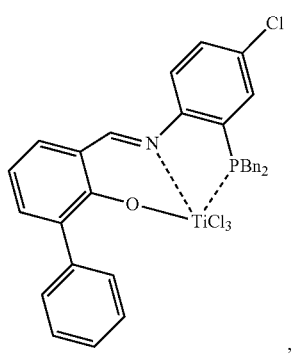
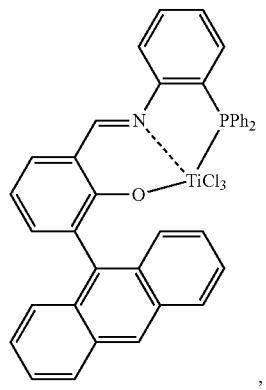
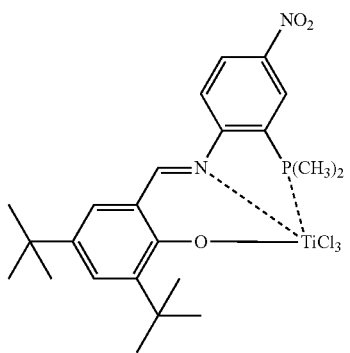
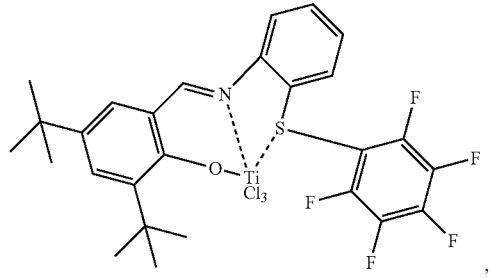
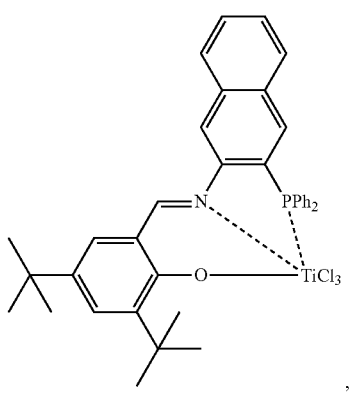
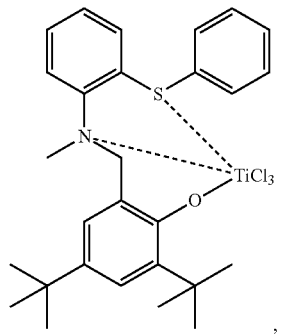
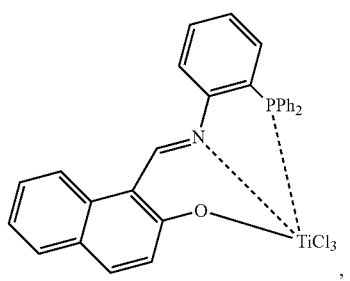

-continued
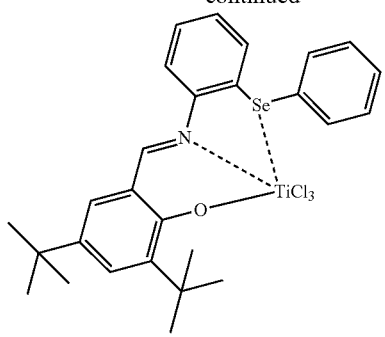
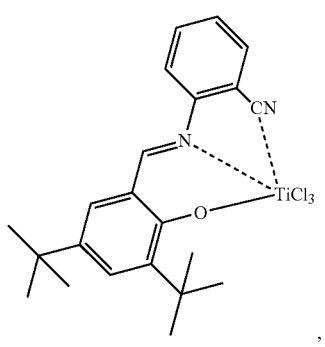
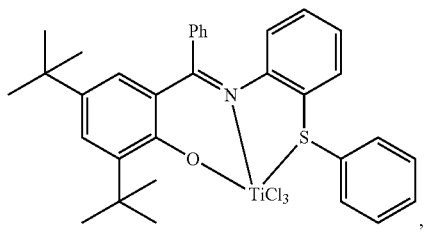
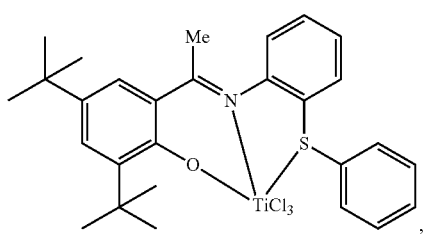
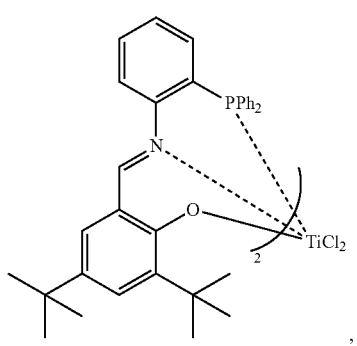
-continued
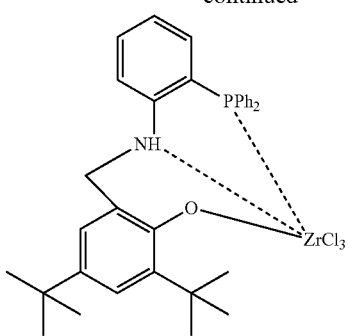
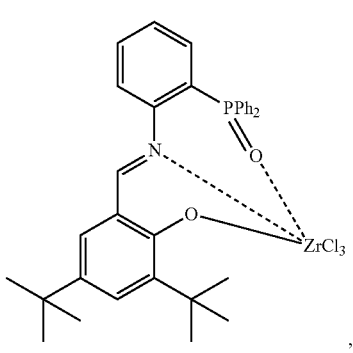
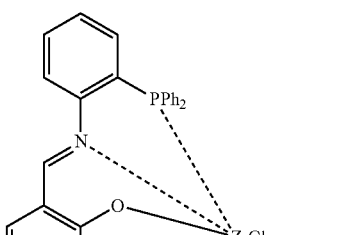
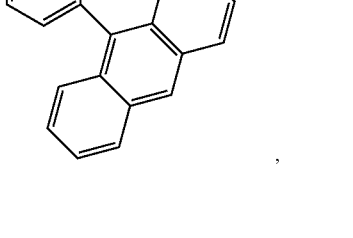
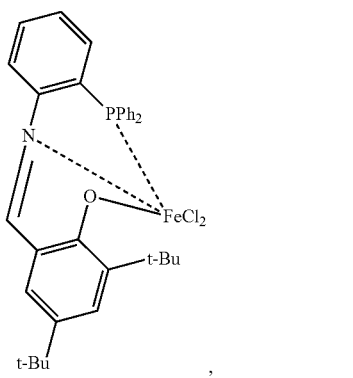

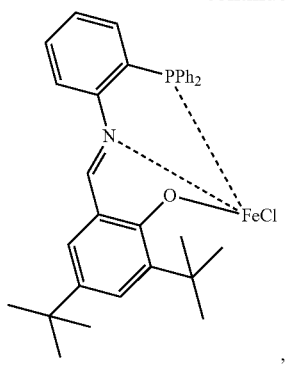
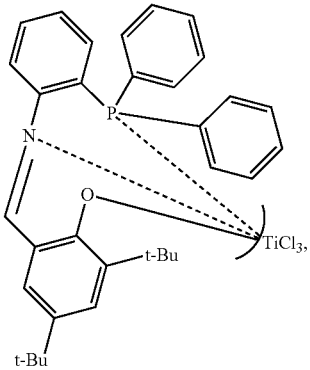
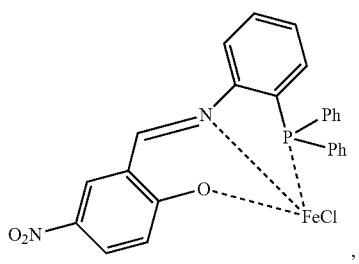
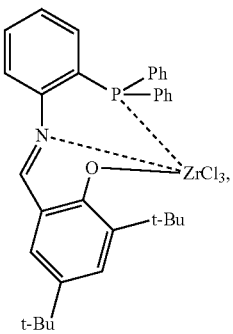
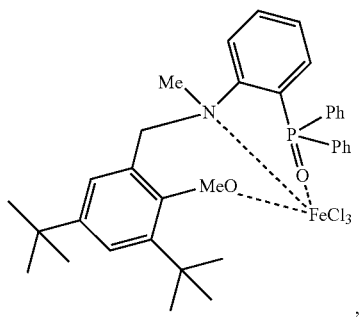
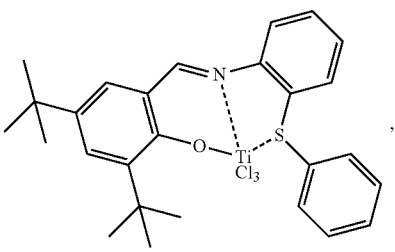
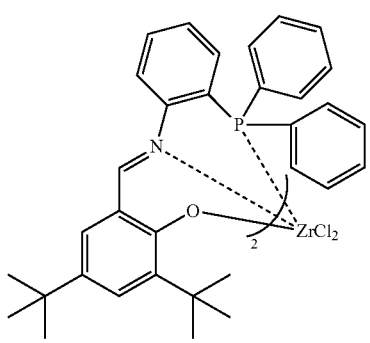
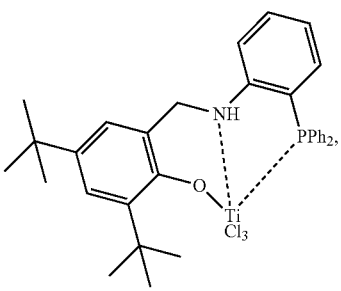
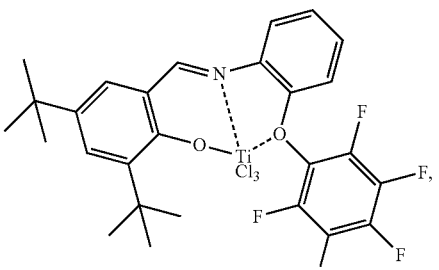
As the nonmetallocene complex, the following compounds can be further exemplified.

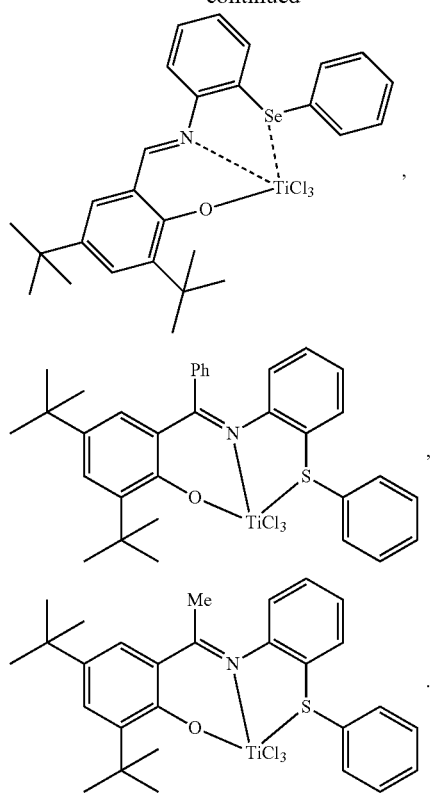
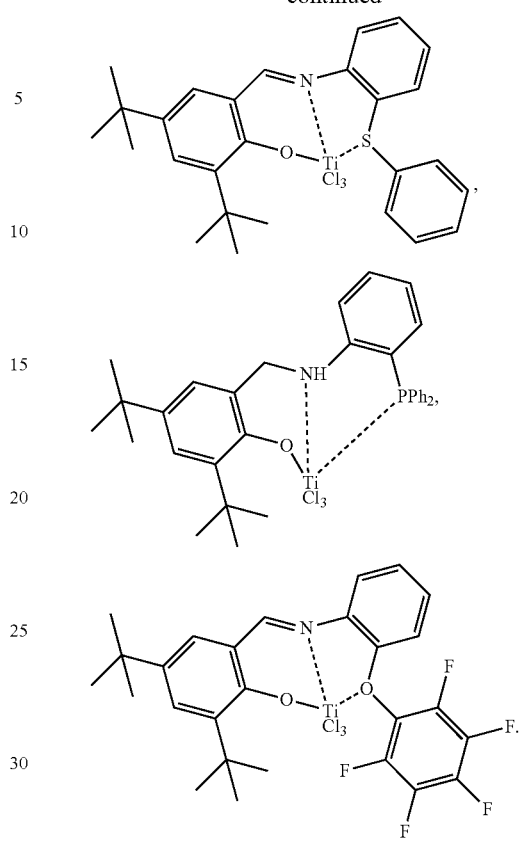
As the nonmetallocene complex, the following compounds can be further exemplified.
As the nonmetallocene complex, the following compounds can be further exemplified.
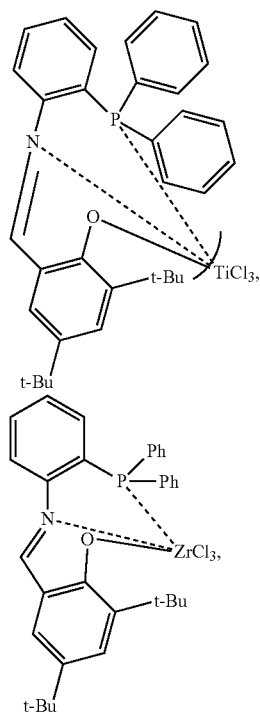
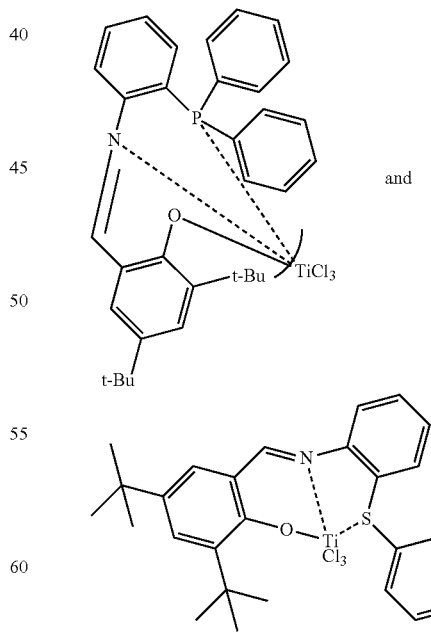
and
The nonmetallocene complexes could be used with one kind or as a mixture of two or more kinds at any ratio therebetween.

According to this invention, the multi-dentate ligand in the nonmetallocene complex does not correspond to or comprise the di-ether compound conventionally used in this field as an electron donor compound.

According to this invention, the multi-dentate ligand or the nonmetallocene complex can be produced in line with any process known in this field by a person skilled in the art. For the details of the process, one can refer to for example WO03/010207 or the Chinese Patent Nos. ZL01126323.7 and ZL02110844.7. All the references cited herein are incorporated by reference in their entireties.

According to the first embodiment of this invention, by directly drying the magnesium compound solution, a freely flowable solid product can be obtained, which corresponds to the supported nonmetallocene catalyst of this invention.

According to the first embodiment of this invention, in order to directly dry the magnesium compound solution, any conventional process, for example, drying under an inert gas atmosphere, vacuum drying or vacuum drying under heat, can be used, preferably vacuum drying under heat. The drying is generally conducted at a temperature 5 to 15° C. lower than the boiling point of any solvent in the magnesium compound solution, which would be a temperature of 30 to 160° C. or 60 to 130° C., while the duration for the drying is generally, not limiting to, 2 to 24 hours.

Further, according to the second embodiment of this invention, by metering into the magnesium compound solution a precipitating agent, solid matter (solid product) is precipitated out of the magnesium compound solution, whereby obtaining the supported nonmetallocene catalyst of this invention.

Or, according to the fourth embodiment of this invention, by metering into the magnesium compound solution a precipitating agent, solid matter (solid product) is precipitated out of the magnesium compound solution, whereby obtaining the modified carrier.

The precipitating agent is further described as follows.

According to this invention, the term "precipitating agent" is explained in a normal sense as known in this field, and refers to a chemically inert liquid capable of lowering the solubility of a solute (for example the magnesium compound) in its solution to the degree that said solute precipitates from the solution as solid matter.

According to this invention, as the precipitating agent, a solvent that represents as a poor solvent for the magnesium compound while as a good solvent for the solvent for dissolving the magnesium compound can be exemplified. For example, an alkane, a cyclic alkane, a halogenated alkane and a halogenated cyclic alkane can be further exemplified.

As the alkane, exemplified is pentane, hexane, heptane, octane, nonane and decane, and the like, such as hexane, heptane and decane, such as hexane.

As the cyclic alkane, exemplified is cyclohexane, cyclo pentane, cyclo heptane, cyclo decane, cyclo nonane, and the like, such as cyclo hexane.

As the halogenated alkane, exemplified is dichloro methane, dichloro hexane, dichloro heptane, trichloro methane, trichloro ethane, trichloro butane, dibromo methane, dibromo ethane, dibromo heptane, tribromo methane, tribromo ethane, tribromo butane, and the like.

As the halogenated cyclic alkane, exemplified is chlorinated cyclo pentane, chlorinated cyclo hexane, chlorinated cyclo heptane, chlorinated cyclo octane, chlorinated cyclo nonane, chlorinated cyclo decane, brominated cyclo pentane, brominated cyclo hexane, brominated cyclo heptane, brominated cyclo octane, brominated cyclo nonane, brominated cyclo decane, and the like.

The precipitating agent can be used with one kind or as a mixture of two or more kinds at any ratio therebetween.

The precipitating agent could be added all at once or dropwise, such as all at once. During the precipitation, any stirring means could be used to facilitate uniform dispersion of the precipitating agent throughout the magnesium compound solution, and eventually facilitate precipitation of the solid product. The stirring means could be in any form, for example, as a stirring paddle, whose rotational speed could be 10 to 1000 r/min.

There is no limitation as to the amount of the precipitating agent to be used, generally, the ratio by volume of the precipitating agent to the solvent for dissolving the magnesium compound is 1:0.2~5, preferably 1:0.5~2, more preferably 1:0.8~1.5.

There is no limitation as to the temperature at which the precipitating agent is, such as the normal temperature. Further, the precipitation process can be generally conducted at the normal temperature as well.

After completely precipitated, the thus obtained solid product is filtered, washed and dried. There is no limitation to the process for filtering, washing or drying, and any conventional process conventionally used in this field can be used as needed.

If needed, the washing can be generally conducted for 1 to 6 times, preferable 2 to 3 times. Herein, the solvent for washing can be the same as or different from the precipitating agent.

The drying can be conducted in line with a conventional process, for example, drying under an inert gas atmosphere, vacuum drying or vacuum drying under heat, preferably drying under an inert gas atmosphere or vacuum drying under heat, most preferably vacuum drying under heat.

The drying is generally conducted at a temperature ranging from the normal temperature to 100° C. for a duration by which the mass in drying will not loss weight any further. For example, in the case wherein tetrahydrofuran is used as the solvent for dissolving the magnesium compound, the drying is generally conducted at about 80° C. under vacuum for a duration of 2 to 12 hours, while toluene is used as the solvent for dissolving the magnesium compound, the drying is generally conducted at about 100° C. under vacuum for a duration of 4 to 24 hours.

Further, according to the third embodiment of this invention, by directly drying the magnesium compound solution, a freely flowable solid product can be obtained, which corresponds to the modified carrier of this invention.

In order to directly dry the magnesium compound solution, any conventional process, for example, drying under an inert gas atmosphere, vacuum drying or vacuum drying under heat, can be used, preferably vacuum drying under heat. The drying is generally conducted at a temperature 5 to 15° C. lower than the boiling point of any solvent in the magnesium compound solution, which would be a temperature of 30 to 160° C. or 60 to 130° C., while the duration for the drying is generally, not limiting to, 2 to 24 hours.

Then, according to the third and fourth embodiments of this invention, the modified carrier is treated with a chemical treating agent selected from the group consisting of Group IVB metal compounds (referred to as the chemical treating step hereinafter) so as to obtain the supported nonmetallocene catalyst of this invention.

The chemical treating agent is further described as follows.

According to this invention, a Group IVB metal compound is used as the chemical treating agent.

As the Group IVB metal compound, exemplified is a Group IVB metal halide, a Group IVB metal alkylate, a Group IVB metal alkoxylate, a Group IVB metal alkyl halide, and a Group IVB metal alkoxy halide.

As the Group IVB metal halide, the Group IVB metal alkylate, the Group IVB metal alkoxylate, the Group IVB metal alkyl halide and the Group IVB metal alkoxy halide, exemplified is a compound having the following general formula (IV).

wherein, m is 0, 1, 2, 3, or 4, n is 0, 1, 2, 3, or 4,

M is a Group IVB metal in the Periodic Table of Elements, for example, titanium, zirconium, hafnium and the like, X is a halogen atom, for example, F, Cl, Br, and I, and $R^1$ and $R^2$ each independently is selected from the group consisting of a $C_1$-$C_{10}$ alkyl, for example, methyl, ethyl, propyl, n-butyl, isobutyl and the like, $R^1$ and $R^2$ could be identical to or different from each other.

Specifically, the Group IVB metal halide could be exemplified as for example, titanium tetrafluoride ($TiF_4$), titanium tetrachloride ($TiCl_4$), titanium tetrabromide ($TiBr_4$), titanium tetraiodide ($TiI_4$), zirconium tetrafluoride ($ZrF_4$), zirconium tetrachloride ($ZrCl_4$), zirconium tetrabromide ($ZrBr_4$), zirconium tetraiodide ($ZrI_4$), hafnium tetrafluoride ($HfF_4$), hafnium tetrachloride ($HfCl_4$), hafnium tetrabromide ($HfBr_4$), hafnium tetraiodide ($HfI_4$).

As the Group IVB metal alkylate, exemplified is tetramethyl titanium ($Ti(CH_3)_4$), tetraethyl titanium ($Ti(CH_3CH_2)_4$), tetraisobutyl titanium ($Ti(i-C_4H_9)_4$), tetra-n-butyl titanium ($Ti(C_4H_9)_4$), triethyl methyl titanium ($Ti(CH_3)(CH_3CH_2)_3$), diethyl dimethyl titanium ($Ti(CH_3)_2(CH_3CH_2)_2$), trimethyl ethyl titanium ($Ti(CH_3)_3(CH_3CH_2)$), triisobutyl methyl titanium ($Ti(CH_3)(i-C_4H_9)_3$), diisobutyl dimethyl titanium ($Ti(CH_3)_2(i-C_4H_9)_2$), trimethyl isobutyl titanium ($Ti(CH_3)_3(i-C_4H_9)$), triisobutyl ethyl titanium ($Ti(CH_3CH_2)(i-C_4H_9)_3$), diisobutyl diethyl titanium ($Ti(CH_3CH_2)_2(i-C_4H_9)_2$), triethyl isobutyl titanium ($Ti(CH_3CH_2)_3(i-C_4H_9)$), tri-n-butyl methyl titanium ($Ti(CH_3)(C_4H_9)_3$), di-n-butyl dimethyl titanium ($Ti(CH_3)_2(C_4H_9)_2$), trimethyl n-butyl titanium ($Ti(CH_3)_3(C_4H_9)$), tri-n-butyl methyl titanium ($Ti(CH_3CH_2)(C_4H_9)_3$), di-n-butyl diethyl titanium ($Ti(CH_3CH_2)_2(C_4H_9)_2$), triethyl n-butyl titanium ($Ti(CH_3CH_2)_3(C_4H_9)$), and so on, tetramethyl zirconium ($Zr(CH_3)_4$), tetraethyl zirconium ($Zr(CH_3CH_2)_4$), tetraisobutyl zirconium ($Zr(i-C_4H_9)_4$), tetra-n-butyl zirconium ($Zr(C_4H_9)_4$), triethyl methyl zirconium ($Zr(CH_3)(CH_3CH_2)_3$), diethyl dimethyl zirconium ($Zr(CH_3)_2(CH_3CH_2)_2$), trimethyl ethyl zirconium ($Zr(CH_3)_3(CH_3CH_2)$), triisobutyl methyl zirconium ($Zr(CH_3)(i-C_4H_9)_3$), diisobutyl dimethyl zirconium ($Zr(CH_3)_2(i-C_4H_9)_2$), trimethyl isobutyl zirconium ($Zr(CH_3)_3(i-C_4H_9)$), triisobutyl ethyl zirconium ($Zr(CH_3CH_2)(i-C_4H_9)_3$), diisobutyl diethyl zirconium ($Zr(CH_3CH_2)_2(i-C_4H_9)_2$), triethyl isobutyl zirconium ($Zr(CH_3CH_2)_3(i-C_4H_9)$), tri-n-butyl methyl zirconium ($Zr(CH_3)(C_4H_9)_3$), di-n-butyl dimethyl zirconium ($Zr(CH_3)_2(C_4H_9)_2$), trimethyl n-butyl zirconium ($Zr(CH_3)_3(C_4H_9)$), tri-n-butyl methyl zirconium ($Zr(CH_3CH_2)(C_4H_9)_3$), di-n-butyl diethyl zirconium ($Zr(CH_3CH_2)_2(C_4H_9)_2$), triethyl n-butyl zirconium ($Zr(CH_3CH_2)_3(C_4H_9)$), and so on, tetramethyl hafnium ($Hf(CH_3)_4$), tetraethyl hafnium ($Hf(CH_3CH_2)_4$), tetraisobutyl hafnium ($Hf(i-C_4H_9)_4$), tetra-n-butyl hafnium ($Hf(C_4H_9)_4$), triethyl methyl hafnium ($Hf(CH_3)(CH_3CH_2)_3$), diethyl dimethyl hafnium ($Hf(CH_3)_2(CH_3CH_2)_2$), trimethyl ethyl hafnium ($Hf(CH_3)_3(CH_3CH_2)$), triisobutyl methyl hafnium ($Hf(CH_3)(i-C_4H_9)_3$), diisobutyl dimethyl hafnium ($Hf(CH_3)_2(i-C_4H_9)_2$), trimethyl isobutyl hafnium ($Hf(CH_3)_3(i-C_4H_9)$), triisobutyl ethyl hafnium ($Hf(CH_3CH_2)(i-C_4H_9)_3$), diisobutyl diethyl hafnium ($Hf(CH_3CH_2)_2(i-C_4H_9)_2$), triethyl isobutyl hafnium ($Hf(CH_3CH_2)_3(i-C_4H_9)$), tri-n-butyl methyl hafnium ($Hf(CH_3)(C_4H_9)_3$), di-n-butyl dimethyl hafnium ($Hf(CH_3)_2(C_4H_9)_2$), trimethyl n-butyl hafnium ($Hf(CH_3)_3(C_4H_9)$), tri-n-butyl methyl hafnium ($Hf(CH_3CH_2)(C_4H_9)_3$), di-n-butyl diethyl hafnium ($Hf(CH_3CH_2)_2(C_4H_9)_2$), triethyl n-butyl hafnium ($Hf(CH_3CH_2)_3(C_4H_9)$), and so on.

As the Group IVB metal alkoxylate, exemplified is tetramethoxy titanium ($Ti(OCH_3)_4$), tetraethoxy titanium ($Ti(OCH_3CH_2)_4$), tetraisobutoxy titanium ($Ti(i-OC_4H_9)_4$), tetra-n-butoxy titanium ($Ti(OC_4H_9)_4$), triethoxy methoxy titanium ($Ti(OCH_3)(OCH_3CH_2)_3$), diethoxy dimethoxy titanium ($Ti(OCH_3)_2(OCH_3CH_2)_2$), trimethoxy ethoxy titanium ($Ti(OCH_3)_3(OCH_3CH_2)$), triisobutoxy methoxy titanium ($Ti(OCH_3)(i-OC_4H_9)_3$), diisobutoxy dimethoxy titanium ($Ti(OCH_3)_2(i-OC_4H_9)_2$), trimethoxy isobutoxy titanium ($Ti(OCH_3)_3(i-OC_4H_9)$), triisobutoxy ethoxy titanium ($Ti(OCH_3CH_2)(i-OC_4H_9)_3$), diisobutoxy diethoxy titanium ($Ti(OCH_3CH_2)_2(i-OC_4H_9)_2$), triethoxy isobutoxy titanium ($Ti(OCH_3CH_2)_3(i-OC_4H_9)$), tri-n-butoxy methoxy titanium ($Ti(OCH_3)(OC_4H_9)_3$), di-n-butoxy dimethoxy titanium ($Ti(OCH_3)_2(OC_4H_9)_2$), trimethoxy n-butoxy titanium ($Ti(OCH_3)_3(OC_4H_9)$), tri-n-butoxy methoxy titanium ($Ti(OCH_3CH_2)(OC_4H_9)_3$), di-n-butoxy diethoxy titanium ($Ti(OCH_3CH_2)_2(OC_4H_9)_2$), triethoxy n-butoxy titanium ($Ti(OCH_3CH_2)_3(OC_4H_9)$), and so on, tetramethoxy zirconium ($Zr(OCH_3)_4$), tetraethoxy zirconium ($Zr(OCH_3CH_2)_4$), tetraisobutoxy zirconium ($Zr(i-OC_4H_9)_4$), tetra-n-butoxy zirconium ($Zr(OC_4H_9)_4$), triethoxy methoxy zirconium ($Zr(OCH_3)(OCH_3CH_2)_3$), diethoxy dimethoxy zirconium ($Zr(OCH_3)_2(OCH_3CH_2)_2$), trimethoxy ethoxy zirconium ($Zr(OCH_3)_3(OCH_3CH_2)$), triisobutoxy methoxy zirconium ($Zr(OCH_3)(i-OC_4H_9)_3$), diisobutoxy dimethoxy zirconium ($Zr(OCH_3)_2(i-OC_4H_9)_2$), trimethoxy isobutoxy zirconium ($Zr(OCH_3)_3(i-OC_4H_9)$), triisobutoxy ethoxy zirconium ($Zr(OCH_3CH_2)(i-OC_4H_9)_3$), diisobutoxy diethoxy zirconium ($Zr(OCH_3CH_2)_2(i-OC_4H_9)_2$), triethoxy isobutoxy zirconium ($Zr(OCH_3CH_2)_3(i-OC_4H_9)$), tri-n-butoxy methoxy zirconium ($Zr(OCH_3)(OC_4H_9)_3$), di-n-butoxy dimethoxy zirconium ($Zr(OCH_3)_2(OC_4H_9)_2$), trimethoxy n-butoxy zirconium ($Zr(OCH_3)_3(OC_4H_9)$), tri-n-butoxy methoxy zirconium ($Zr(OCH_3CH_2)(OC_4H_9)_3$), di-n-butoxy diethoxy zirconium ($Zr(OCH_3CH_2)_2(OC_4H_9)_2$), triethoxy n-butoxy zirconium ($Zr(OCH_3CH_2)_3(OC_4H_9)$), and so on, tetramethoxy hafnium ($Hf(OCH_3)_4$), tetraethoxy hafnium ($Hf(OCH_3CH_2)_4$), tetraisobutoxy hafnium ($Hf(i-OC_4H_9)_4$), tetra-n-butoxy hafnium ($Hf(OC_4H_9)_4$), triethoxy methoxy hafnium ($Hf(OCH_3)(OCH_3CH_2)_3$), diethoxy dimethoxy hafnium ($Hf(OCH_3)_2(OCH_3CH_2)_2$), trimethoxy ethoxy hafnium ($Hf(OCH_3)_3(OCH_3CH_2)$), triisobutoxy methoxy hafnium ($Hf(OCH_3)(i-OC_4H_9)_3$), diisobutoxy dimethoxy hafnium ($Hf(OCH_3)_2(i-OC_4H_9)_2$), trimethoxy isobutoxy hafnium ($Hf(OCH_3)_3(i-OC_4H_9)$), triisobutoxy ethoxy hafnium ($Hf(OCH_3CH_2)(i-OC_4H_9)_3$), diisobutoxy diethoxy hafnium ($Hf(OCH_3CH_2)_2(i-OC_4H_9)_2$), triethoxy isobutoxy hafnium ($Hf(OCH_3CH_2)_3(i-OC_4H_9)$), tri-n-butoxy methoxy hafnium ($Hf(OCH_3)(OC_4H_9)_3$), di-n-butoxy dimethoxy hafnium ($Hf(OCH_3)_2(OC_4H_9)_2$), trimethoxy n-butoxy hafnium ($Hf(OCH_3)_3(OC_4H_9)$), tri-n-butoxy methoxy hafnium ($Hf(OCH_3CH_2)(OC_4H_9)_3$), di-n-butoxy diethoxy hafnium ($Hf(OCH_3CH_2)_2(OC_4H_9)_2$), triethoxy n-butoxy hafnium ($Hf(OCH_3CH_2)_3(OC_4H_9)$), and so on.

As the Group IVB metal alkyl halide, exemplified is trimethyl chloro titanium ($TiCl(CH_3)_3$), triethyl chloro titanium ($TiCl(CH_3CH_2)_3$), triisobutyl chloro titanium ($TiCl(i-C_4$ $H_9)_3$), trin-butyl chloro titanium (TiCl($C_4H_9$)$_3$), dimethyl dichloro titanium (TiCl$_2$(CH$_3$)$_2$), diethyl dichloro titanium (TiCl$_2$(CH$_3$CH$_2$)$_2$), diisobutyl dichloro titanium (TiCl$_2$(i-C$_{4-9}$)$_2$), trin-butyl chloro titanium (TiCl(C$_4$H$_9$)$_3$), methyl trichloro titanium (Ti(CH$_3$)Cl$_3$), ethyl trichloro titanium (Ti(CH$_3$CH$_2$)Cl$_3$), isobutyl trichloro titanium (Ti(i-C$_4$H$_9$)Cl$_3$), n-butyl trichloro titanium (Ti(C$_4$H$_9$)Cl$_3$), trimethyl bromo titanium (TiBr(CH$_3$)$_3$), triethyl bromo titanium (TiBr(CH$_3$CH$_2$)$_3$), triisobutyl bromo titanium (TiBr(i-C$_4$H$_9$)$_3$), trin-butyl bromo titanium (TiBr(C$_4$H$_9$)$_3$), dimethyl dibromo titanium (TiBr$_2$(CH$_3$)$_2$), diethyl dibromo titanium (TiBr$_2$(CH$_3$CH$_2$)$_2$), diisobutyl dibromo titanium (TiBr$_2$(i-C$_4$H$_9$)$_2$), trin-butyl bromo titanium (TiBr(C$_4$H$_9$)$_3$), methyl tribromo titanium (Ti(CH$_3$)Br$_3$), ethyl tribromo titanium (Ti(CH$_3$CH$_2$)Br$_3$), isobutyl tribromo titanium (Ti(i-C$_4$H$_9$)Br$_3$), n-butyl tribromo titanium (Ti(C$_4$H$_9$)Br$_3$), trimethyl chloro zirconium (ZrCl(CH$_3$)$_3$), triethyl chloro zirconium (ZrCl(CH$_3$CH$_2$)$_3$), triisobutyl chloro zirconium (ZrCl(i-C$_4$H$_9$)$_3$), trin-butyl chloro zirconium (ZrCl(C$_4$H$_9$)$_3$), dimethyl dichloro zirconium (ZrCl$_2$(CH$_3$)$_2$), diethyl dichloro zirconium (ZrCl$_2$(CH$_3$CH$_2$)$_2$), diisobutyl dichloro zirconium (ZrCl$_2$(i-C$_4$H$_9$)$_2$), trin-butyl chloro zirconium (ZrCl(C$_4$H$_9$)$_3$), methyl trichloro zirconium (Zr(CH$_3$)Cl$_3$), ethyl trichloro zirconium (Zr(CH$_3$CH$_2$)Cl$_3$), isobutyl trichloro zirconium (Zr(i-C$_4$H$_9$)Cl$_3$), n-butyl trichloro zirconium (Zr(C$_4$H$_9$)Cl$_3$), trimethyl bromo zirconium (ZrBr(CH$_3$)$_3$), triethyl bromo zirconium (ZrBr(CH$_3$CH$_2$)$_3$), triisobutyl bromo zirconium (ZrBr(i-C$_4$H$_9$)$_3$), trin-butyl bromo zirconium (ZrBr(C$_4$H$_9$)$_3$), dimethyl dibromo zirconium (ZrBr$_2$(CH$_3$)$_2$), diethyl dibromo zirconium (ZrBr$_2$(CH$_3$CH$_2$)$_2$), diisobutyl dibromo zirconium (ZrBr$_2$(i-C$_4$H$_9$)$_2$), trin-butyl bromo zirconium (ZrBr(C$_4$H$_9$)$_3$), methyl tribromo zirconium (Zr(CH$_3$)Br$_3$), ethyl tribromo zirconium (Zr(CH$_3$CH$_2$)Br$_3$), isobutyl tribromo zirconium (Zr(i-C$_4$H$_9$)Br$_3$), n-butyl tribromo zirconium (Zr(C$_4$H$_9$)Br$_3$), trimethyl chloro hafnium (HfCl(CH$_3$)$_3$), triethyl chloro hafnium (HfCl(CH$_3$CH$_2$)$_3$), triisobutyl chloro hafnium (HfCl(i-C$_4$H$_9$)$_3$), trin-butyl chloro hafnium (HfCl(C$_4$H$_9$)$_3$), dimethyl dichloro hafnium (HfCl$_2$(CH$_3$)$_2$), diethyl dichloro hafnium (HfCl$_2$(CH$_3$CH$_2$)$_2$), diisobutyl dichloro hafnium (HfCl$_2$(i-C$_4$H$_9$)$_2$), trin-butyl chloro hafnium (HfCl(C$_4$H$_9$)$_3$), methyl trichloro hafnium (Hf(CH$_3$)Cl$_3$), ethyl trichloro hafnium (Hf(CH$_3$CH$_2$)Cl$_3$), isobutyl trichloro hafnium (Hf(i-C$_4$H$_9$)Cl$_3$), n-butyl trichloro hafnium (Hf(C$_4$H$_9$)Cl$_3$), trimethyl bromo hafnium (HfBr(CH$_3$)$_3$), triethyl bromo hafnium (HfBr(CH$_3$CH$_2$)$_3$), triisobutyl bromo hafnium (HfBr(i-C$_4$H$_9$)$_3$), trin-butyl bromo hafnium (HfBr(C$_4$H$_9$)$_3$), dimethyl dibromo hafnium (HfBr$_2$(CH$_3$)$_2$), diethyl dibromo hafnium (HfBr$_2$(CH$_3$CH$_2$)$_2$), diisobutyl dibromo hafnium (HfBr$_2$(i-C$_4$H$_9$)$_2$), trin-butyl bromo hafnium (HfBr(C$_4$H$_9$)$_3$), methyl tribromo hafnium (Hf(CH$_3$)Br$_3$), ethyl tribromo hafnium (Hf(CH$_3$CH$_2$)Br$_3$), isobutyl tribromo hafnium (Hf(i-C$_4$H$_9$)Br$_3$), n-butyl tribromo hafnium (Hf(C$_4$H$_9$)Br$_3$).

As the Group IVB metal alkoxy halide, exemplified is trimethoxy chloro titanium (TiCl(OCH$_3$)$_3$), triethoxy chloro titanium (TiCl(OCH$_3$CH$_2$)$_3$), triisobutoxy chloro titanium (TiCl(i-OC$_4$H$_9$)$_3$), tri-n-butoxy chloro titanium (TiCl(OC$_4$H$_9$)$_3$), dimethoxy dichloro titanium (TiCl$_2$(OCH$_3$)$_2$), diethoxy dichloro titanium (TiCl$_2$(OCH$_3$CH$_2$)$_2$), diisobutoxy dichloro titanium (TiCl$_2$(i-OC$_4$H$_9$)$_2$), tri-n-butoxy chloro titanium (TiCl(OC$_4$H$_9$)$_3$), methoxy trichloro titanium (Ti(OCH$_3$)Cl$_3$), ethoxy trichloro titanium (Ti(OCH$_3$CH$_2$)Cl$_3$), isobutoxy trichloro titanium (Ti(i-C$_4$H$_9$)Cl$_3$), n-butoxy trichloro titanium (Ti(OC$_4$H$_9$)Cl$_3$), trimethoxy bromo titanium (TiBr(OCH$_3$)$_3$), triethoxy bromo titanium (TiBr(OCH$_3$CH$_2$)$_3$), triisobutoxy bromo titanium (TiBr(i-OC$_4$H$_9$)$_3$), tri-n-butoxy bromo titanium (TiBr(OC$_4$H$_9$)$_3$), dimethoxy dibromo titanium (TiBr$_2$(OCH$_3$)$_2$), diethoxy dibromo titanium (TiBr$_2$(OCH$_3$CH$_2$)$_2$), diisobutoxy dibromo titanium (TiBr$_2$(i-OC$_4$H$_9$)$_2$), tri-n-butoxy bromo titanium (TiBr(OC$_4$H$_9$)$_3$), methoxy tribromo titanium (Ti(OCH$_3$)Br$_3$), ethoxy tribromo titanium (Ti(OCH$_3$CH$_2$)Br$_3$), isobutoxy tribromo titanium (Ti(i-C$_4$H$_9$)Br$_3$), n-butoxy tribromo titanium (Ti(OC$_4$H$_9$)Br$_3$), trimethoxy chloro zirconium (ZrCl(OCH$_3$)$_3$), triethoxy chloro zirconium (ZrCl(OCH$_3$CH$_2$)$_3$), triisobutoxy chloro zirconium (ZrCl(i-OC$_4$H$_9$)$_3$), tri-n-butoxy chloro zirconium (ZrCl(OC$_4$H$_9$)$_3$), dimethoxy dichloro zirconium (ZrCl$_2$(OCH$_3$)$_2$), diethoxy dichloro zirconium (ZrCl$_2$(OCH$_3$CH$_2$)$_2$), diisobutoxy dichloro zirconium (ZrCl$_2$(i-OC$_4$H$_9$)$_2$), tri-n-butoxy chloro zirconium (ZrCl(OC$_4$H$_9$)$_3$), methoxy trichloro zirconium (Zr(OCH$_3$)Cl$_3$), ethoxy trichloro zirconium (Zr(OCH$_3$CH$_2$)Cl$_3$), isobutoxy trichloro zirconium (Zr(i-C$_4$H$_9$)Cl$_3$), n-butoxy trichloro zirconium (Zr(OC$_4$H$_9$)Cl$_3$), trimethoxy bromo zirconium (ZrBr(OCH$_3$)$_3$), triethoxy bromo zirconium (ZrBr(OCH$_3$CH$_2$)$_3$), triisobutoxy bromo zirconium (ZrBr(i-OC$_4$H$_9$)$_3$), tri-n-butoxy bromo zirconium (ZrBr(OC$_4$H$_9$)$_3$), dimethoxy dibromo zirconium (ZrBr$_2$(OCH$_3$)$_2$), diethoxy dibromo zirconium (ZrBr$_2$(OCH$_3$CH$_2$)$_2$), diisobutoxy dibromo zirconium (ZrBr$_2$(i-OC$_4$H$_9$)$_2$), tri-n-butoxy bromo zirconium (ZrBr(OC$_4$H$_9$)$_3$), methoxy tribromo zirconium (Zr(OCH$_3$)Br$_3$), ethoxy tribromo zirconium (Zr(OCH$_3$CH$_2$)Br$_3$), isobutoxy tribromo zirconium (Zr(i-C$_4$H$_9$)Br$_3$), n-butoxy tribromo zirconium (Zr(OC$_4$H$_9$)Br$_3$), trimethoxy chloro hafnium (HfCl(OCH$_3$)$_3$), triethoxy chloro hafnium (HfCl(OCH$_3$CH$_2$)$_3$), triisobutoxy chloro hafnium (HfCl(i-OC$_4$H$_9$)$_3$), tri-n-butoxy chloro hafnium (HfCl(OC$_4$H$_9$)$_3$), dimethoxy dichloro hafnium (HfCl$_2$(OCH$_3$)$_2$), diethoxy dichloro hafnium (HfCl$_2$(OCH$_3$CH$_2$)$_2$), diisobutoxy dichloro hafnium (HfCl$_2$(i-OC$_4$H$_9$)$_2$), tri-n-butoxy chloro hafnium (HfCl(OC$_4$H$_9$)$_3$), methoxy trichloro hafnium (Hf(OCH$_3$)Cl$_3$), ethoxy trichloro hafnium (Hf(OCH$_3$CH$_2$)Cl$_3$), isobutoxy trichloro hafnium (Hf(i-C$_4$H$_9$)Cl$_3$), n-butoxy trichloro hafnium (Hf(OC$_4$H$_9$)Cl$_3$), trimethoxy bromo hafnium (HfBr(OCH$_3$)$_3$), triethoxy bromo hafnium (HfBr(OCH$_3$CH$_2$)$_3$), triisobutoxy bromo hafnium (HfBr(i-OC$_4$H$_9$)$_3$), tri-n-butoxy bromo hafnium (HfBr(OC$_4$H$_9$)$_3$), dimethoxy dibromo hafnium (HfBr$_2$(OCH$_3$)$_2$), diethoxy dibromo hafnium (HfBr$_2$(OCH$_3$CH$_2$)$_2$), diisobutoxy dibromo hafnium (HfBr$_2$(i-OC$_4$H$_9$)$_2$), tri-n-butoxy bromo hafnium (HfBr(OC$_4$H$_9$)$_3$), methoxy tribromo hafnium (Hf(OCH$_3$)Br$_3$), ethoxy tribromo hafnium (Hf(OCH$_3$CH$_2$)Br$_3$), isobutoxy tribromo hafnium (Hf(i-C$_4$H$_9$)Br$_3$), n-butoxy tribromo hafnium (Hf(OC$_4$H$_9$)Br$_3$).

As the Group IVB metal compound, preference is given to the Group IVB metal halide, such as TiCl$_4$, TiBr$_4$, ZrCl$_4$, ZrBr$_4$, HfCl$_4$ and HfBr$_4$, such as TiCl$_4$ and ZrCl$_4$.

The Group IVB metal compound could be used with one kind or as a mixture of two or more kinds at any ratio therebetween.

When the chemical treating agent presents as a liquid at the normal temperature, the chemical treating agent can be used by directly dropwise adding a predetermined amount of the chemical treating agent to a reaction subject to be treated with said chemical treating agent (i.e. the aforesaid modified carrier).

When the chemical treating agent presents a solid at the normal temperature, for ease of metering and handling, it is preferably to use said chemical treating agent in the form of a solution. Of course, when the chemical treating agent presents a liquid at the normal temperature, said chemical treating agent can be also used in the form of a solution if needed, without any specific limitation.

In preparation of the solution of the chemical treating agent, there is no limitation as to the solvent to be used herein, as long as the solvent is capable of dissolving the chemical treating agent.

Specifically, as the solvent, exemplified is a $C_{5-12}$ alkane or a halogenated $C_{5-12}$ alkane, for example pentane, hexane, heptane, octane, nonane, decane, undecane, dodecane, cyclohexane, chloro pentane, chloro hexane, chloro heptane, chloro octane, chloro nonane, chloro decane, chloro undecane, chloro dodecane, chloro cyclohexane and so on, preferably pentane, hexane, decane and cyclohexane, most preferably hexane.

The solvent could be used with one kind or as a mixture of two or more kinds at any ratio therebetween.

It is obvious that a solvent capable of extracting the magnesium compound is not used herein to dissolve the chemical treating agent, for example an ether based solvent, for example tetrahydrofuran.

Further, there is no limitation as to the concentration of the chemical treating agent in the solution, which could be determined as needed, as long as it is sufficient for the solution to deliver the predetermined amount of the chemical treating agent for the chemical treatment. As aforesaid, if the chemical treating agent presents as a liquid, it is convenient to use said chemical treating agent as such for the treatment, while it is also acceptable to convert it into a solution before use. Generally, the molar concentration of the chemical treating agent in its solution is, but not limiting to, 0.01 to 1.0 mol/L.

As a process for conducing the chemical treatment, exemplified is a process wherein, when a solid chemical treating agent (for example $ZrCl_4$) is used, first of all, a solution of the chemical treating agent is prepared, then the chemical treating agent is added (preferably dropwise) at a predetermined amount to the modified carrier to be treated, or when a liquid chemical treating agent (for example $TiCl_4$) is used, it is acceptable to add (preferably dropwise) a predetermined amount of the chemical treating agent as such (or after prepared into a solution) to the modified carrier to be treated. Then, the chemical treating reaction continues (facilitated by any stirring means, if necessary) at a reaction temperature ranging from −30° C. to 60° C. (preferably −20° C. to 30° C.) for 0.5 to 24 hours, preferably 1 to 8 hours, more preferably 2 to 6 hours. Then, the resultant is filtrated, washed and dried.

According to this invention, the filtrating, washing (generally for 1 to 8 times, preferably 2 to 6 times, most preferably 2 to 4 times) and drying can be conducted in a conventional manner, wherein the solvent for washing could be the same as that used for dissolving the chemical treating agent.

According to this invention, as the amount of the chemical treating agent to be used, it is preferably that the ratio by molar of the magnesium compound (based on Mg, solid basis) to the chemical treating agent (based on the Group IVB metal, for example Ti) is 1:0.01-1, preferably 1:0.01-0.50, more preferably 1:0.10-0.30.

According to a further embodiment of this invention, the present process for producing a supported nonmetallocene catalyst further comprises a step of pre-treating the modified carrier with an assistant chemical treating agent selected from the group consisting of an aluminoxane, an alkylaluminum and any combination thereof before treating the modified carrier with the chemical treating agent, referred to as the pre-treating step hereinafter. Then, the chemical treating step is conducted by using the chemical treating agent in the same way as aforesaid, with the only difference of replacing the modified carrier with the thus pre-treated modified carrier.

The assistant chemical treating agent is further described as follows.

According to this invention, as the assistant chemical treating agent, exemplified is aluminoxane and alkylaluminum.

As the aluminoxane, exemplified is a linear aluminoxane $((R)(R)Al\text{—}(Al(R)\text{—}O)_n\text{—}O\text{—}Al(R)(R))$ having the following formula (I), and a cyclic aluminoxane $(\text{—}(Al(R)\text{—}O\text{—})_{n+2}\text{—})$ having the following formula (II).

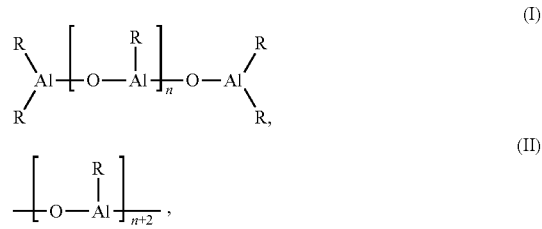

(I)

(II)

wherein the Rs are identical to or different from one another, preferably identical to one another, and each independently is selected from the group consisting of a $C_1$-$C_8$ alkyl, preferably methyl, ethyl, and iso-butyl, most preferably methyl, n is an integer of 1 to 50, preferably of 10 to 30.

Specifically, the aluminoxane could be preferably selected from the group consisting of methyl aluminoxane, ethyl aluminoxane, isobutyl aluminoxane and n-butyl aluminoxane, preferably methyl aluminoxane (MAO) and isobutyl aluminoxane (IBAO).

The aluminoxane could be used with one kind or as a mixture of two or more kinds at any ratio therebetween.

As the alkylaluminum, exemplified is a compound having a general formula (III) as follows:

(III)

wherein the Rs are identical to or different from one another, preferably identical to one another, and is each independently selected from the group consisting of a $C_1$-$C_8$ alkyl, preferably methyl, ethyl and iso-butyl, most preferably methyl.

Specifically, the alkylaluminum could be selected from the group consisting of trimethyl aluminum $(Al(CH_3)_3)$, triethyl aluminum $(Al(CH_3CH_2)_3)$, tripropyl aluminum $(Al(C_3H_7)_3)$, triisobutyl aluminum $(Al(i\text{-}C_4H_9)_3)$, tri-n-butyl aluminum $(Al(C_4H_9)_3)$, triisoamyl aluminum $(Al(i\text{-}C_5H_{11})_3)$, tri-n-amyl aluminum $(Al(C_5H_{11})_3)$, trihexyl aluminum $(Al(C_6H_{13})_3)$, tri-iso-hexyl aluminum $(Al(i\text{-}C_6H_{13})_3)$, diethyl methyl aluminum $(Al(CH_3)(CH_3CH_2)_2)$ and ethyl dimethyl aluminum $(Al(CH_3CH_2)(CH_3)_2)$, and the like, wherein preference is given to trimethyl aluminum, triethyl aluminum, triisobutyl aluminum and tripropyl aluminum, most preferably triethyl aluminum and triisobutyl aluminum.

The alkylaluminum could be used with one kind or as a mixture of two or more kinds at any ratio therebetween.

According to this invention, as the assistant chemical treating agent, used could be only the alkylaluminum or only the aluminoxane, or any mixture of the alkylaluminum and the aluminoxane. There is no limitation as to the ratio between any two or more components in the mixture, which could be determined as needed.

According to this invention, the assistant chemical treating agent is generally used in the form of a solution. In preparation of the solution of the assistant chemical treating agent, there is no limitation as to the solvent to be used herein, as long as the solvent can dissolve the assistant chemical treating agent.

Specifically, as the solvent, exemplified is a $C_{5-12}$ alkane or a halogenated $C_{5-12}$ alkane, for example pentane, hexane, heptane, octane, nonane, decane, undecane, dodecane, cyclohexane, chloro pentane, chloro hexane, chloro heptane, chloro octane, chloro nonane, chloro decane, chloro undecane, chloro dodecane, chloro cyclohexane and so on, preferably pentane, hexane, decane and cyclohexane, most preferably hexane.

It is obvious that a solvent capable of extracting the magnesium compound is not used herein to dissolve the assistant chemical treating agent, for example an ether based solvent, for example tetrahydrofuran.

The solvent could be used with one kind or as a mixture of two or more kinds at any ratio therebetween.

Further, there is no limitation as to the concentration of the assistant chemical treating agent in the solution, which could be determined as needed, as long as it is sufficient for the solution to deliver a predetermined amount of the assistant chemical treating agent for the pre-treatment.

As a process for conducing the pre-treatment, exemplified is a process wherein, first of all, a solution of the assistant chemical treating agent is prepared, then at a temperature ranging from −30° C. to 60° C. (preferably −20° C. to 30° C.), the assistant chemical treating agent solution (containing a predetermined amount of the assistant chemical treating agent) is metering (preferably dropwise) into the modified carrier to be pre-treated with said assistant chemical treating agent, or the modified carrier is metering into the assistant chemical treating agent solution, so as to form a reaction mixture. Then, the reaction continues (facilitated by any stirring means, if necessary) for 1 to 8 hours, preferably 2 to 6 hours, more preferably 3 to 4 hours. Then, the thus obtained product is separated from the reaction mixture by filtrating, washing (for 1 to 6 times, preferably 1 to 3 times) and optional drying. Or alternatively, the thus obtained product is directly used in the next step (i.e. the aforesaid chemical treating step) in the form of the reaction mixture without being subject to the separation beforehand. In this case, the reaction mixture contains a certain amount of solvent, and for this reason, the amount of the solvent involved in said next step could be reduced accordingly.

According to this invention, as the amount of the assistant chemical treating agent to be used, it is preferably that the ratio by molar of the magnesium compound (based on Mg, on a solid basis) to the assistant chemical treating agent (based on Al) is 1:0-1.0, preferably 1:0-0.5, more preferably 1:0.1-0.5.

It is known that any of the aforementioned processes and steps is preferably carried out under a substantial water-free and oxygen-free condition. By substantial water-free and oxygen-free condition, it means that water and oxygen in the system concerned is continuously controlled to be less than 10 ppm. Further, the support nonmetallocene catalyst according to this invention, after prepared, is usually stored under a sealed condition under a slightly positive pressure before use.

According to this invention, as the amount of the nonmetallocene complex to be used, it is preferably that the ratio by molar of the magnesium compound (based on Mg, on a solid basis) to the nonmetallocene complex is 1:0.01-1, preferably 1:0.04-0.4, more preferably 1:0.08-0.2.

According to this invention, as the amount of the solvent for dissolving the magnesium compound to be used, it is preferably that the ratio of the magnesium compound (on a solid basis) to the solvent is 1 mol:75~400 ml, preferably 1 mol:150~300 ml, more preferably 1 mol:200~250 ml.

According to this invention, as the amount of the precipitating agent to be used, it is preferably that the ratio by volume of the precipitating agent to the solvent for dissolving the magnesium compound is 1:0.2~5, preferably 1:0.5~2, more preferably 1:0.8~1.5.

According to this invention, as the amount of the chemical treating agent to be used, it is preferably that the ratio by molar of the magnesium compound (based on Mg, on a solid basis) to the chemical treating agent (based on the Group IVB metal, for example Ti) is 1:0.01-1, preferably 1:0.01-0.50, more preferably 1:0.10-0.30.

According to this invention, as the amount of the assistant chemical treating agent to be used, it is preferably that the ratio by molar of the magnesium compound (based on Mg, on a solid basis) to the assistant chemical treating agent (based on Al) is 1:0-1.0, preferably 1:0-0.5, more preferably 1:0.1-0.5.

In one embodiment, this invention relates to a supported nonmetallocene catalyst produced in line with the process according to any of the first to fourth embodiments of this invention, also referred to as a supported nonmetallocene catalyst for olefin polymerization.

In a further embodiment according to this invention, this invention relates to an olefin homopolymerization/copolymerization process, wherein the supported nonmetallocene catalyst of this invention is used as the catalyst for olefin polymerization, to homopolymerize or copolymerize olefin(s).

In the context of the olefin homopolymerization/copolymerization process of this invention, one can directly refer to the prior art for any content or information that has not been expressively and specifically described hereinafter, for example, the reactor for polymerization, the amount of olefin(s), the way by which the catalyst or olefin is introduced, unnecessiating the need of detailing same further herein.

According to the present olefin homopolymerization/copolymerization process, the supported nonmetallocene catalyst of this invention is used as the main catalyst, one or more selected from the group consisting of an aluminoxane, an alkylaluminum, a halogenated alkyl aluminum, a fluoroborane, an alkylboron and an alkylboron ammonium salt is used as the co-catalyst, to homopolymerize or copolymerize olefin.

As the way of adding the main catalyst and the co-catalyst to the polymerization system, exemplified is a way wherein the main catalyst is added prior to the co-catalyst, or vise versa, or the main catalyst and the co-catalyst contact with each other by mixing and then added altogether, or separately but simultaneously added. As the way of adding the main catalyst and the co-catalyst separately, exemplified is the case wherein the main catalyst and the co-catalyst are successively added to one feed line or multiple feed lines. When the main catalyst and the co-catalyst are to be added separately but simultaneously, multiple feed lines are required. For a continuous polymerization, the way of simultaneously and continuously adding to multiple feed lines is preferred, while for a batch polymerization, the way of mixing the main catalyst and the co-catalyst with each other and then adding to one feed line altogether, or adding to a feed line the co-catalyst and then adding the main catalyst to the same feed line, is preferred.

There is no limitation as to how to conduct the olefin homopolymerization/copolymerization, any conventional process known to a person skilled in the art can be used, for example, a slurry process, an emulsion process, a solution process, a bulk process or a gas phase process, preferably the slurry process or the gas phase process.

According to this invention, as the olefin to be used, exemplified is a $C_2$ to $C_{10}$ mono-olefin, a diolefin, a cyclic olefin and other ethylenic unsaturated compounds.

Specifically, as the $C_2$ to $C_{10}$ mono-olefin, exemplified is ethylene, propylene, 1-butene, 1-hexene, 1-heptene, 4-methyl-1-pentene, 1-octene, 1-decene, 1-undecene, 1-dodecene and styrene. As the cyclic olefin, exemplified is 1-cyclopentene and norbornene. As the diolefin, exemplified is 1,4-butadiene, 2,5-pentadiene, 1,6-hexadiene, norbornadiene and 1,7-octadiene. As the other ethylenic unsaturated compound, exemplified is vinyl acetate, and (meth)acrylate. This invention prefers the homopolymerization of ethylene, or the copolymerization of ethylene with propylene, 1-butene or 1-hexene.

According to this invention, by homopolymerization, it refers to the polymerization of a single kind of olefin, by copolymerization, it refers to the polymerization between two or more of the aforesaid olefins.

According to this invention, the co-catalyst is selected from the group consisting of an aluminoxane, an alkylaluminum, a halogenated alkyl aluminum, a fluoroborane, an alkylboron and an alkylboron ammonium salt, such as the aluminoxane and the alkylaluminum.

As the aluminoxane, exemplified is a linear aluminoxane $((R)(R)Al\!-\!(Al(R)\!-\!O)_n\!-\!O\!-\!Al(R)(R))$ having the following formula (I-1), and a cyclic aluminoxane $(-\!(Al(R)\!-\!O\!-\!)_{n+2}\!-\!)$ having the following formula (II-1).

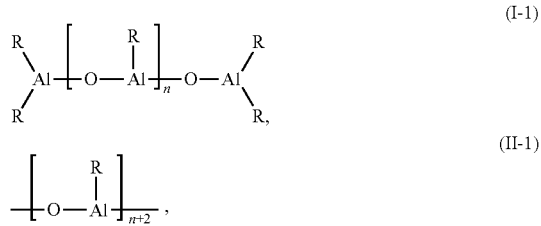

wherein the Rs are identical to or different from one another, preferably identical to one another, and each independently is selected from the group consisting of a $C_1$-$C_8$ alkyl, preferably methyl, ethyl, and iso-butyl, most preferably methyl, n is an integer of 1 to 50, preferably of 10 to 30.

Specifically, the aluminoxane could be preferably selected from the group consisting of methyl aluminoxane, ethyl aluminoxane, isobutyl aluminoxane and n-butyl aluminoxane, preferably methyl aluminoxane (MAO) and isobutyl aluminoxane (IBAO), most preferably methyl aluminoxane (MAO).

The aluminoxane could be used with one kind or as a mixture of two or more kinds at any ratio therebetween.

As the alkylaluminum, exemplified is a compound having a general formula (III-1) as follows:

$$Al(R)_3 \quad (III\text{-}1)$$

wherein the Rs are identical to or different from one another, preferably identical to one another, and is each independently selected from the group consisting of a $C_1$-$C_8$ alkyl, preferably methyl, ethyl and iso-butyl, most preferably methyl.

Specifically, the alkylaluminum could be selected from the group consisting of trimethyl aluminum $(Al(CH_3)_3)$, triethyl aluminum $(Al(CH_3CH_2)_3)$, tripropyl aluminum $(Al(C_3H_7)_3)$, triisobutyl aluminum $(Al(i\text{-}C_4H_9)_3)$, tri-n-butyl aluminum $(Al(C_4H_9)_3)$, triisoamyl aluminum $(Al(i\text{-}C_5H_{11})_3)$, tri-n-amyl aluminum $(Al(C_5H_{11})_3)$, tri-hexyl aluminum $(Al(C_6H_{13})_3)$, tri-iso-hexyl aluminum $(Al(i\text{-}C_6H_{13})_3)$, diethyl methyl aluminum $(Al(CH_3)(CH_3CH_2)_2)$ and ethyl dimethyl aluminum $(Al(CH_3CH_2)(CH_3)_2)$, and the like, wherein preference is given to trimethyl aluminum, triethyl aluminum, triisobutyl aluminum and tripropyl aluminum, more preferably triethyl aluminum and triisobutyl aluminum, most preferably triethyl aluminum.

The alkylaluminum could be used with one kind or as a mixture of two or more kinds at any ratio therebetween.

As the halogenated alkyl aluminum, the fluoroborane, the alkylboron and the alkylboron ammonium salt, exemplified is one conventionally used in this field, but without any limitation thereto.

Further, according to this invention, the co-catalyst could be used with one kind or as a mixture of two or more kinds of the aforesaid co-catalysts at any ratio therebetween as needed, but without any limitation thereto.

According to this invention, depending on how the olefin homopolymerization/copolymerization is conducted, a solvent for polymerization may be involved.

As the solvent for polymerization, one conventionally used in this field for olefin homopolymerization/copolymerization can be used, but without any limitation thereto.

As the solvent for polymerization, exemplified is a $C_{4\text{-}10}$ alkane (for example, butane, pentane, hexane, heptane, octane, nonane, or decane), a halogenated $C_{1\text{-}10}$ alkane (for example, dichloro methane), an aromatic hydrocarbon based solvent (for example toluene or xylene), and so on. Hexane is preferred for this purpose.

The solvent for polymerization could be used with one kind or as a mixture of two or more kinds at any ratio therebetween.

According to this invention, the polymerization pressure under which the olefin homopolymerization/copolymerization is conducted is generally between 0.1 to 10 MPa, preferably 0.1 to 4 MPa, most preferably 1 to 3 MPa, but without any limitation thereto. According to this invention, the polymerization temperature at which the olefin homopolymerization/copolymerization is conducted is generally from −40° C. to 200° C., preferably 10° C. to 100° C., more preferably 40° C. to 90° C., but without any limitation thereto.

Further, according to this invention, the olefin homopolymerization/copolymerization can be conduct in the presence of or in the absence of hydrogen gas. If presents, the partial pressure of hydrogen gas may generally account for 0.01 to 99% (preferably 0.01 to 50%) of the polymerization pressure, but without any limitation thereto.

According to the olefin homopolymerization/copolymerization process of this invention, the ratio by molar of the co-catalyst (based on Al or B) to the supported nonmetallocene catalyst (based on the central metal atom M) is generally 1 to 1000:1, preferably 10 to 500:1, more preferably 15 to 300:1, but without any limitation thereto.

EXAMPLE

The present invention is further illustrated by using the following examples, not limiting to same.

The bulk density of the polymer was measured according to the Chinese Standard GB 1636-79 (unit: g/cm³).

The content of the Group IVB metal (for example Ti) and the content of the Mg element in the supported nonmetallocene catalyst were determined by the ICP-AES method, while the content of the nonmetallocene ligand was determined by the element analysis method.

The polymerization activity of the catalyst was calculated as follows.

Upon completion of the polymerization, the polymer product in the reactor was filtered and dried, and then weighed for its weight (by mass). Then, the polymerization activity of the catalyst was expressed by a value obtained by dividing the weight of the polymer product by the weight (by mass) of the supported nonmetallocene catalyst used (unit: kg polymer per 1 g Cat).

The molecular weights Mw, Mn and the molecular weight distribution (Mw/Mn) of the polymer were determined at a temperature of 150° C. by using the GPC V2000 type gel permeation chromatographer (from WATERS Co., USA), with o-trichlorobenzene as the solvent.

The viscosity averaged molecular weight of the polymer was calculated as follows.

The intrinsic viscosity of the polymer was determined according to the standard ASTM D4020-00 by using a high temperature dilution type Ubbelohde viscometer (with a capillary inner diameter of 0.44 mm, a thermostatic bath media of 300# silicon oil, the solvent for dilution of decalin and a temperature of 135° C.), and then the viscosity averaged molecular weight Mv of the polymer was calculated in line with the following formula.

$$Mv=5.37\times10^4\times[\eta]^{1.37}$$

wherein, $\eta$ is the intrinsic viscosity.

Example I

Corresponding to the First Embodiment

Example I-1

Anhydrous magnesium chloride was used as the magnesium compound, tetrahydrofuran was used as the solvent for dissolving the magnesium compound and the nonmetallocene complex, the compound represented by

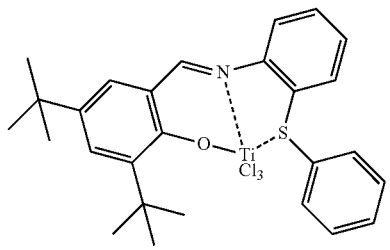

was used as the nonmetallocene complex.

5 g of the anhydrous magnesium chloride and the nonmetallocene complex were weighted, tetrahydrofuran was added thereto to completely dissolve same at the normal temperature. After stirring for 2 hours, the resultant was uniformly heated to 90° C. and directly vacuum dried, to obtain the supported nonmetallocene catalyst.

In this example, the ratio of magnesium chloride to tetrahydrofuran was 1 mol:210 ml, the ratio by molar of magnesium chloride to the nonmetallocene complex was 1:0.08.

The thus obtained supported nonmetallocene catalyst was named as CAT-I-1.

Example I-2

Substantially the same as the Example I-1, except for the following changes:

The nonmetallocene complex was changed to

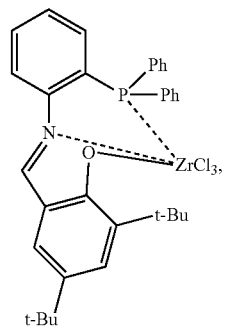

the solvent for dissolving the magnesium compound and the nonmetallocene complex was changed to toluene, and the magnesium compound solution was vacuum dried at 100° C.

In this example, the ratio of the magnesium compound to toluene was 1 mol:150 ml, the ratio by molar of the magnesium compound to the nonmetallocene complex was 1:0.15.

The thus obtained supported nonmetallocene catalyst was named as CAT-I-2.

Example I-3

Substantially the same as the Example I-1, except for the following changes:

The magnesium compound was changed to anhydrous magnesium bromide (MgBr$_2$), the nonmetallocene complex was changed to

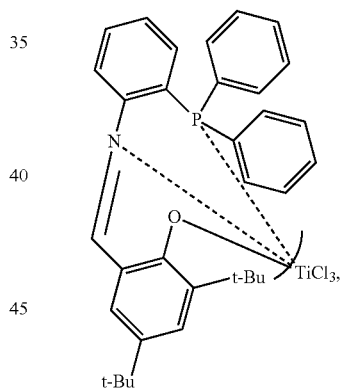

the solvent for dissolving the magnesium compound and the nonmetallocene complex was changed to ethyl benzene, and the magnesium compound solution was vacuum dried at 110° C.

In this example, the ratio of the magnesium compound to the solvent for dissolving the magnesium compound and the nonmetallocene complex was 1 mol:250 ml, the ratio by molar of the magnesium compound to the nonmetallocene complex was 1:0.20.

The thus obtained supported nonmetallocene catalyst was named as CAT-I-3.

Example I-4

Substantially the same as the Example I-1, except for the following changes:

The magnesium compound was changed to ethoxy magnesium chloride (MgCl(OC$_2$H$_5$)), the nonmetallocene complex was changed to

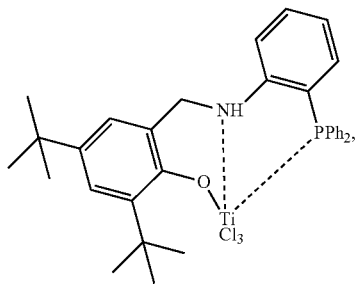

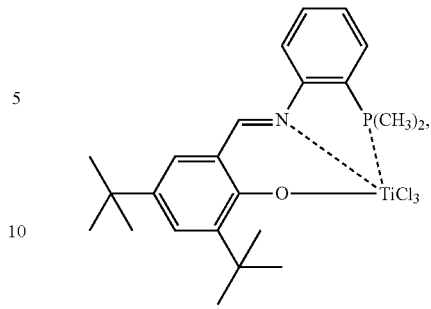

the solvent for dissolving the magnesium compound and the nonmetallocene complex was changed to xylene, and the magnesium compound solution was vacuum dried at 150° C.

In this example, the ratio of the magnesium compound to the solvent for dissolving the magnesium compound and the nonmetallocene complex was 1 mol:300 ml, the ratio by molar of the magnesium compound to the nonmetallocene complex was 1:0.04.

The thus obtained supported nonmetallocene catalyst was named as CAT-I-4.

Example I-5

Substantially the same as the Example I-1, except for the following changes:

The magnesium compound was changed to butoxy magnesium bromide (MgBr(OC$_4$H$_9$)), the nonmetallocene complex was changed to

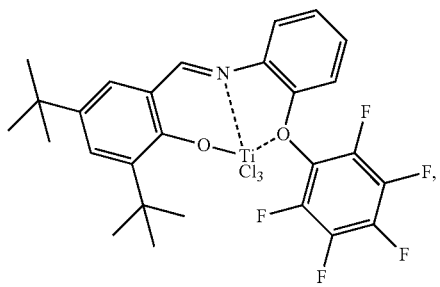

the solvent for dissolving the magnesium compound and the nonmetallocene complex was changed to diethyl benzene, and the magnesium compound solution was vacuum dried at 110° C.

In this example, the ratio of the magnesium compound to the solvent for dissolving the magnesium compound and the nonmetallocene complex was 1 mol:400 ml, the ratio by molar of the magnesium compound to the nonmetallocene complex was 1:0.30.

The thus obtained supported nonmetallocene catalyst was named as CAT-I-5.

Example I-6

Substantially the same as the Example I-1, except for the following changes:

The magnesium compound was changed to methyl magnesium chloride (Mg(CH$_3$)Cl), the nonmetallocene complex was changed to the solvent for dissolving the magnesium compound and the nonmetallocene complex was changed to chloro toluene, and the magnesium compound solution was vacuum dried at 120° C.

In this example, the ratio by molar of the magnesium compound to the nonmetallocene complex was 1:0.10.

The thus obtained supported nonmetallocene catalyst was named as CAT-I-6.

Example I-7

Substantially the same as the Example I-1, except for the following changes:

The magnesium compound was changed to ethyl magnesium chloride (Mg(C$_2$H$_5$)Cl), the nonmetallocene complex was changed to

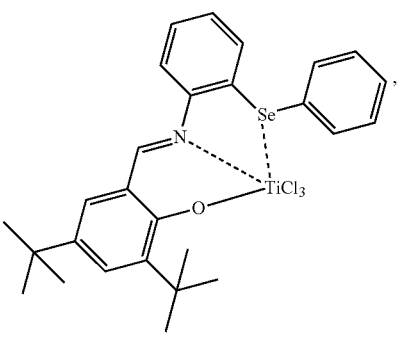

and the magnesium compound solution was vacuum dried at 60° C.

The thus obtained supported nonmetallocene catalyst was named as CAT-I-7.

Example I-8

Substantially the same as the Example I-1, except for the following changes:

The magnesium compound was changed to ethyl magnesium (Mg(C$_2$H$_5$)$_2$), the nonmetallocene complex was changed to

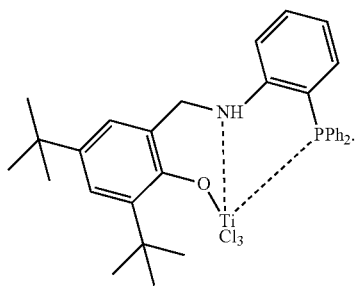

The thus obtained supported nonmetallocene catalyst was named as CAT-I-8.

Example I-9

Substantially the same as the Example I-1, except for the following changes:

The magnesium compound was changed to methyl ethoxy magnesium (Mg(OC$_2$H$_5$)(CH$_3$)).

The thus obtained supported nonmetallocene catalyst was named as CAT-I-9.

Example I-10

Substantially the same as the Example I-1, except for the following changes:

The magnesium compound was changed to ethyl n-butoxy magnesium (Mg(OC$_4$H$_9$)(C$_2$H$_5$)).

The thus obtained supported nonmetallocene catalyst was named as CAT-I-10.

Reference Example I-1-A

Substantially the same as the Example I-1, except for the following changes:

The ratio by molar of magnesium chloride to the nonmetallocene complex was changed to 1:0.16.

The thus obtained catalyst was named as CAT-I-1-A.

Reference Example I-1-B

Substantially the same as the Example I-1, except for the following changes:

The ratio by molar of magnesium chloride to the nonmetallocene complex was changed to 1:0.04.

The thus obtained catalyst was named as CAT-I-1-B.

Reference Example I-1-C

Substantially the same as the Example I-1, except for the following changes:

In preparation of the catalyst, 60 ml hexane was added to the magnesium compound solution to precipitate same, which was then filtered, washed with hexane for 3 times (60 ml per time), and finally vacuum dried at 60° C.

The thus obtained catalyst was named as CAT-I-1-C.

Reference Example I-1-D

Substantially the same as the Example I-1, except for the following changes:

The nonmetallocene complex was changed to the following nonmetallocene ligand.

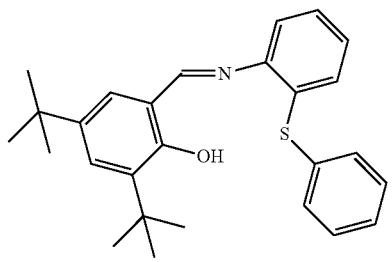 [SMILES: CC(C)(C)c1cc(/C=N/c2ccccc2Sc2ccccc2)c(O)c(C(C)(C)C)c1]

The thus obtained catalyst was named as CAT-I-1-D.

Application Example I

The catalysts CAT-I-1 to CAT-I-9, CAT-I-1-A to CAT-I-1-D obtained from the aforesaid Example I series were used for ethylene homopolymerization or copolymerization under the following conditions according to the following processes respectively.

Homopolymerization: an autoclave for polymerization (5 L), a slurry polymerization process, hexane (2.5 L) as the solvent, a total polymerization pressure of 1.5 MPa, a polymerization temperature of 85° C., a ratio by molar of the co-catalyst to the active metal in the catalyst of 200, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto, and ethylene was continuously supplied thereto to keep the total polymerization pressure constant at 1.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table I-1.

Copolymerization: an autoclave for polymerization (5 L), a slurry polymerization process, hexane (2.5 L) as the solvent, a total polymerization pressure of 1.5 MPa, a polymerization temperature of 85° C., a ratio by molar of the co-catalyst to the active metal in the catalyst of 200, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto. Hexene-1 (50 g) was added thereto all at once as the comonomer. Ethylene was continuously supplied thereto to keep the total polymerization pressure constant at 1.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table I-1.

TABLE I-1

The results of the olefin polymerization obtained with the supported nonmetallocene catalysts

| Experiment No. | Catalyst No. | Co-catalyst | type | Poly activity (kgPE/gCat) | Molecular weight distribution |
|---|---|---|---|---|---|
| 1 | CAT-I-1 | methyl aluminoxane | homopolymerization | 4.29 | 2.32 |
| 2 | CAT-I-1 | methyl aluminoxane | copolymerization | 6.44 | 2.45 |
| 3 | CAT-I-1 | triethyl aluminum | homopolymerization | 2.16 | 2.70 |
| 4 | CAT-I-2 | methyl aluminoxane | homopolymerization | 5.45 | 2.37 |
| 5 | CAT-I-3 | methyl aluminoxane | homopolymerization | 8.51 | 2.52 |
| 6 | CAT-I-4 | methyl aluminoxane | homopolymerization | 3.38 | 2.38 |
| 7 | CAT-I-5 | methyl aluminoxane | homopolymerization | 3.53 | 2.45 |
| 8 | CAT-I-6 | methyl aluminoxane | homopolymerization | 5.01 | 2.33 |
| 9 | CAT-I-7 | methyl aluminoxane | homopolymerization | 3.79 | 2.42 |
| 10 | CAT-I-8 | methyl aluminoxane | homopolymerization | 3.30 | 2.36 |
| 11 | CAT-I-9 | methyl aluminoxane | homopolymerization | 3.59 | 2.45 |
| 12 | CAT-I-1-A | methyl aluminoxane | homopolymerization | 7.60 | 2.26 |
| 13 | CAT-I-1-B | methyl aluminoxane | homopolymerization | 2.10 | 2.32 |
| 14 | CAT-I-1-C | methyl aluminoxane | homopolymerization | 3.98 | 2.31 |
| 15 | CAT-I-1-D | methyl aluminoxane | homopolymerization | No activity | — |

As can be seen from the Table I-1, the polymer obtained from the polymerization by using the supported nonmetallocene catalyst produced in line with the present process exhibits a narrow molecular weight distribution. It is well known in this field that polyethylene produced from the polymerization by using a Ziegler-Natta catalyst usually exhibits a molecular weight distribution of about from 3 to 8.

Upon comparison of the results from the experiment No. 1 and those from the experiment Nos. 12 and 13 in the Table I-1, it is clear that the activity of the catalyst increases or decreases as the amount of the nonmetallocene complex to be introduced into the catalyst increases or decreases, while the molecular weight distribution of the polymer remains substantially unchanged. This fact indicates that the activity of the supported nonmetallocene catalyst of this invention originates from the nonmetallocene complex, and the performances of the polymer obtained from the polymerization depend on it as well.

Upon comparison of the results from the experiment No. 1 and those from the experiment No. 14 in the Table I-1, it is clear that the catalyst obtained by directly drying the magnesium compound solution according to this invention exhibits a significantly higher activity than that obtained by filtering, washing and drying the magnesium compound solution.

As can be seen from the results of the experiment No. 15, the catalyst obtained with the case wherein the nonmetallocene ligand was used in preparation of the supported nonmetallocene catalyst shows no activity for olefin polymerization. It is know that only a catalyst wherein a nonmetallocene ligand and an active metal compound react with each other to in-situ form a nonmetallocene complex, or a catalyst produced by directly supporting a nonmetallocene complex, shows an activity for olefin polymerization, while that containing only a nonmetallocene ligand without an active metal element does not.

Example II

Corresponding to the Second Embodiment

Example II-1

Anhydrous magnesium chloride was used as the magnesium compound, tetrahydrofuran was used as the solvent for dissolving the magnesium compound and the nonmetallocene complex, the compound represented by

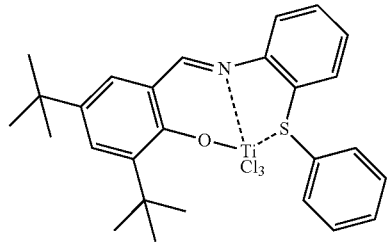

was used as the nonmetallocene complex.

5 g of the anhydrous magnesium chloride and the nonmetallocene complex were weighted, tetrahydrofuran was added thereto to completely dissolve same at the normal temperature. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 90° C. and vacuum dried, to obtain the supported nonmetallocene catalyst.

In this example, the ratio of magnesium chloride to tetrahydrofuran was 1 mol:210 ml, the ratio by molar of magnesium chloride to the nonmetallocene complex was 1:0.08, and the ratio by volume of the precipitating agent to tetrahydrofuran was 1:1.

The thus obtained supported nonmetallocene catalyst was named as CAT-II-1.

Example II-2

Substantially the same as the Example II-1, except for the following changes:

The nonmetallocene complex was changed to

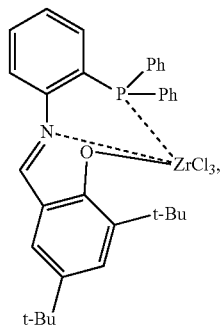

the solvent for dissolving the magnesium compound and the nonmetallocene complex was changed to toluene, and the precipitating agent was changed to cyclohexane.

In this example, the ratio of the magnesium compound to toluene was 1 mol:150 ml, the ratio by molar of the magnesium compound to the nonmetallocene complex was 1:0.15, and the ratio by volume of the precipitating agent to the solvent for dissolving the magnesium compound and the nonmetallocene complex was 1:2.

The thus obtained supported nonmetallocene catalyst was named as CAT-II-2.

Example II-3

Substantially the same as the Example II-1, except for the following changes:

The magnesium compound was changed to anhydrous magnesium bromide ($MgBr_2$), the nonmetallocene complex was changed to

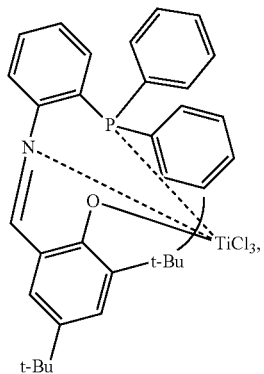

the solvent for dissolving the magnesium compound and the nonmetallocene complex was changed to ethyl benzene, and the precipitating agent was changed to cycloheptane.

In this example, the ratio of the magnesium compound to the solvent for dissolving the magnesium compound and the nonmetallocene complex was 1 mol:250 ml, the ratio by molar of the magnesium compound to the nonmetallocene complex was 1:0.20, and the ratio by volume of the precipitating agent to the solvent for dissolving the magnesium compound and the nonmetallocene complex was 1:0.70.

The thus obtained supported nonmetallocene catalyst was named as CAT-II-3.

Example II-4

Substantially the same as the Example II-1, except for the following changes:

The magnesium compound was changed to ethoxy magnesium chloride ($MgCl(OC_2H_5)$), the nonmetallocene complex was changed to

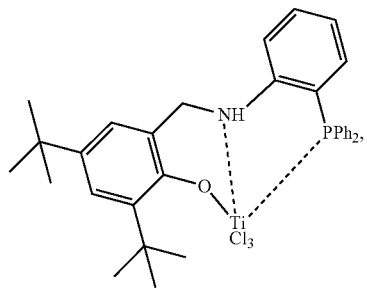

the solvent for dissolving the magnesium compound and the nonmetallocene complex was changed to xylene, and the precipitating agent was changed to decane.

In this example, the ratio of the magnesium compound to the solvent for dissolving the magnesium compound and the nonmetallocene complex was 1 mol:300 ml, the ratio by molar of the magnesium compound to the nonmetallocene complex was 1:0.04, and the ratio by volume of the precipitating agent to the solvent for dissolving the magnesium compound and the nonmetallocene complex was 1:1.5.

The thus obtained supported nonmetallocene catalyst was named as CAT-II-4.

Example II-5

Substantially the same as the Example II-1, except for the following changes:

The magnesium compound was changed to butoxy magnesium bromide ($MgBr(OC_4H_9)$), the nonmetallocene complex was changed to

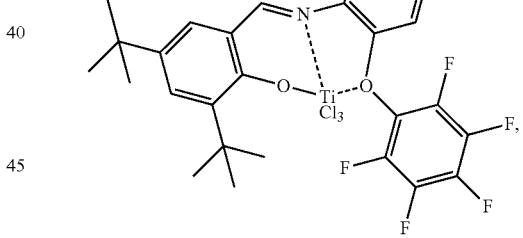

the solvent for dissolving the magnesium compound and the nonmetallocene complex was changed to diethyl benzene.

In this example, the ratio of the magnesium compound to the solvent for dissolving the magnesium compound and the nonmetallocene complex was 1 mol:400 ml, the ratio by molar of the magnesium compound to the nonmetallocene complex was 1:0.30.

The thus obtained supported nonmetallocene catalyst was named as CAT-II-5.

Example II-6

Substantially the same as the Example II-1, except for the following changes:

The magnesium compound was changed to methyl magnesium chloride ($Mg(CH_3)Cl$), the nonmetallocene complex was changed to

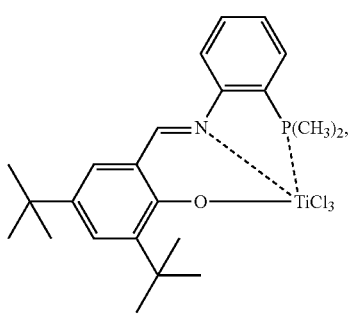

the solvent for dissolving the magnesium compound and the nonmetallocene complex was changed to chloro toluene.

In this example, the ratio by molar of the magnesium compound to the nonmetallocene complex was 1:0.10.

The thus obtained supported nonmetallocene catalyst was named as CAT-II-6.

Example II-7

Substantially the same as the Example II-1, except for the following changes:

The magnesium compound was changed to ethyl magnesium chloride (Mg(C$_2$H$_5$)Cl), the nonmetallocene complex was changed to

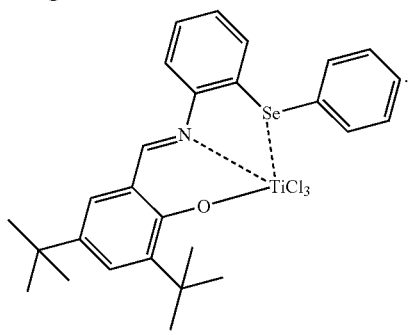

The thus obtained supported nonmetallocene catalyst was named as CAT-II-7.

Example II-8

Substantially the same as the Example II-1, except for the following changes:

The magnesium compound was changed to ethyl magnesium (Mg(C$_2$H$_5$)$_2$), the nonmetallocene complex was changed to

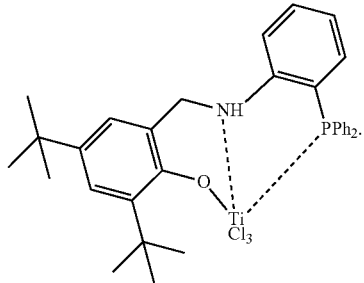

The thus obtained supported nonmetallocene catalyst was named as CAT-II-8.

Example II-9

Substantially the same as the Example II-1, except for the following changes:

The magnesium compound was changed to methyl ethoxy magnesium (Mg(OC$_2$H$_5$)(CH$_3$)).

The thus obtained supported nonmetallocene catalyst was named as CAT-II-9.

Example II-10

Substantially the same as the Example II-1, except for the following changes:

The magnesium compound was changed to ethyl n-butoxy magnesium (Mg(OC$_4$H$_9$)(C$_2$H$_5$)).

The thus obtained supported nonmetallocene catalyst was named as CAT-II-10.

Reference Example II-1-A

Substantially the same as the Example II-1, except for the following changes:

The ratio by molar of magnesium chloride to the nonmetallocene complex was changed to 1:0.16.

The thus obtained catalyst was named as CAT-II-1-A.

Reference Example II-1-B

Substantially the same as the Example II-1, except for the following changes:

The ratio by molar of magnesium chloride to the nonmetallocene complex was changed to 1:0.04.

The thus obtained catalyst was named as CAT-II-1-B.

Reference Example II-1-C

Substantially the same as the Example II-1, except for the following changes:

The nonmetallocene complex was changed to the following nonmetallocene ligand.

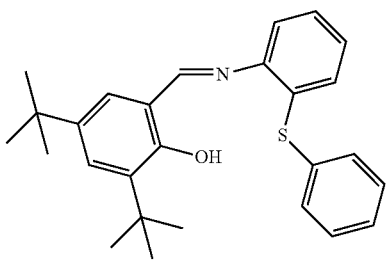 [SMILES: CC(C)(C)c1cc(/C=N/c2ccccc2Sc2ccccc2)c(O)c(C(C)(C)C)c1]

The thus obtained catalyst was named as CAT-II-1-C.

Application Example II

The catalysts CAT-II-1 to CAT-II-9, CAT-II-1-A to CAT-II-1-C obtained from the aforesaid Example II series were used for ethylene homopolymerization or copolymerization under the following conditions according to the following processes respectively.

Homopolymerization: an autoclave for polymerization (5 L), a slurry polymerization process, hexane (2.5 L) as the solvent, a total polymerization pressure of 1.5 MPa, a polymerization temperature of 85° C., a ratio by molar of the co-catalyst to the active metal in the catalyst of 200, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto, and ethylene was continuously supplied thereto to keep the total polymerization pressure constant at 1.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table II-1.

Copolymerization: an autoclave for polymerization (5 L), a slurry polymerization process, hexane (2.5 L) as the solvent, a total polymerization pressure of 1.5 MPa, a polymerization temperature of 85° C., a ratio by molar of the co-catalyst to the active metal in the catalyst of 200, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto. Hexene-1 (50 g) was added thereto all at once as the comonomer. Ethylene was continuously supplied thereto to keep the total polymerization pressure constant at 1.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table II-1.

TABLE II-1

The results of the olefin polymerization obtained with the supported nonmetallocene catalysts

| Experiment No. | Catalyst No. | Co-catalyst | type | Poly activity (kgPE/gCat) | Molecular weight distribution |
|---|---|---|---|---|---|
| 1 | CAT-II-1 | methyl aluminoxane | homopolymerization | 3.98 | 2.31 |
| 2 | CAT-II-1 | methyl aluminoxane | copolymerization | 5.93 | 2.45 |
| 3 | CAT-II-1 | triethyl aluminum | homopolymerization | 2.00 | 2.70 |
| 4 | CAT-II-2 | methyl aluminoxane | homopolymerization | 5.01 | 2.37 |
| 5 | CAT-II-3 | methyl aluminoxane | homopolymerization | 7.90 | 2.52 |
| 6 | CAT-II-4 | methyl aluminoxane | homopolymerization | 3.13 | 2.38 |
| 7 | CAT-II-5 | methyl aluminoxane | homopolymerization | 3.27 | 2.45 |
| 8 | CAT-II-6 | methyl aluminoxane | homopolymerization | 4.62 | 2.33 |
| 9 | CAT-II-7 | methyl aluminoxane | homopolymerization | 3.51 | 2.42 |
| 10 | CAT-II-8 | methyl aluminoxane | homopolymerization | 3.06 | 2.36 |
| 11 | CAT-II-9 | methyl aluminoxane | homopolymerization | 3.33 | 2.45 |
| 12 | CAT-II-1-A | methyl aluminoxane | homopolymerization | 6.85 | 2.26 |
| 13 | CAT-II-1-B | methyl aluminoxane | homopolymerization | 1.95 | 2.32 |
| 14 | CAT-II-1-C | methyl aluminoxane | homopolymerization | No activity | — |

As can be seen from the Table II-1, the polymer obtained from the polymerization by using the supported nonmetallocene catalyst produced in line with the present process exhibits a narrow molecular weight distribution. It is well known in this field that polyethylene produced from the polymerization by using a Ziegler-Natta catalyst usually exhibits a molecular weight distribution of about from 3 to 8.

Upon comparison of the results from the experiment No. 1 and those from the experiment Nos. 12 and 13 in the Table II-1, it is clear that the activity of the catalyst increases or decreases as the amount of the nonmetallocene complex to be introduced into the catalyst increases or decreases, while the molecular weight distribution of the polymer remains substantially unchanged. This fact indicates that the activity of the supported nonmetallocene catalyst of this invention originates from the nonmetallocene complex, and the performances of the polymer obtained from the polymerization depend on it as well.

As can be seen from the results of the experiment No. 14, just like the experiment No. 15 in the Table I-1, the catalyst obtained with the case wherein a nonmetallocene ligand was used in preparation of the supported nonmetallocene catalyst shows no activity for olefin polymerization.

Example III

Corresponding to the Third Embodiment

Example III-1

Anhydrous magnesium chloride was used as the magnesium compound, tetrahydrofuran was used as the solvent for dissolving the magnesium compound and the nonmetallocene complex, titanium tetrachloride was used as the chemical treating agent, the compound represented by

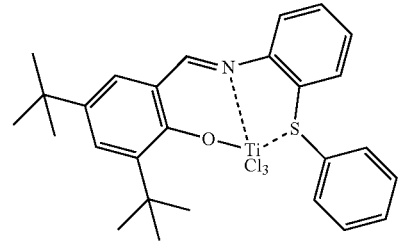

was used as the nonmetallocene complex.

5 g of the anhydrous magnesium chloride and the nonmetallocene complex were weighted, tetrahydrofuran was added thereto to completely dissolve same at the normal temperature. After stirring for 2 hours, the resultant was uniformly heated to 60° C. and directly vacuum dried, to obtain the modified carrier.

Then, to the modified carrier, 60 ml hexane was added, and then titanium tetrachloride was dropwise added thereto under stirring over a period of 30 minutes. The reaction continued at 60° C. under stirring for 4 hours, then filtered, washed with hexane for 2 times (60 ml each time), and vacuum dried at the normal temperature to obtain the supported nonmetallocene catalyst.

In this example, the ratio of magnesium chloride to tetrahydrofuran was 1 mol:210 ml, the ratio by molar of magnesium chloride to the nonmetallocene complex was 1:0.08, and the ratio by molar of magnesium chloride to titanium tetrachloride was 1:0.15.

The thus obtained supported nonmetallocene catalyst was named as CAT-III-1.

Example III-1-1

Substantially the same as the Example III-1, except for the following changes:
The nonmetallocene complex was changed to

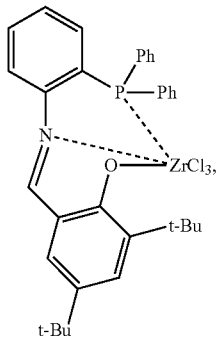

the solvent for dissolving the magnesium compound and the nonmetallocene complex was changed to toluene, and the chemical treating agent was changed to zirconium tetrachloride ($ZrCl_4$).

The magnesium compound solution was vacuum dried at 90° C.

In this example, the ratio of the magnesium compound to toluene was 1 mol:150 ml, the ratio by molar of the magnesium compound to the nonmetallocene complex was 1:0.15, and the ratio by molar of the magnesium compound to the chemical treating agent was 1:0.20.

The thus obtained supported nonmetallocene catalyst was named as CAT-III-1-1.

Example III-1-2

Substantially the same as the Example III-1, except for the following changes:
The magnesium compound was changed to anhydrous magnesium bromide ($MgBr_2$), the nonmetallocene complex was changed to

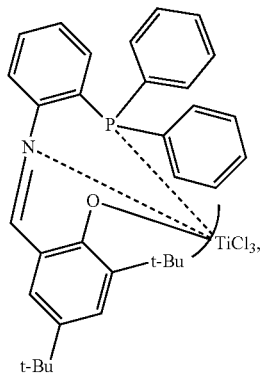

the solvent for dissolving the magnesium compound and the nonmetallocene complex was changed to ethyl benzene, and the chemical treating agent was changed to titanium tetrabromide ($TiBr_4$).

The magnesium compound solution was vacuum dried at 130° C.

In this example, the ratio of the magnesium compound to the solvent for dissolving the magnesium compound and the nonmetallocene complex was 1 mol:250 ml, the ratio by molar of the magnesium compound to the nonmetallocene complex was 1:0.20, and the ratio by molar of the magnesium compound to the chemical treating agent was 1:0.30.

The thus obtained supported nonmetallocene catalyst was named as CAT-III-1-2.

Example III-1-3

Substantially the same as the Example III-1, except for the following changes:
The magnesium compound was changed to ethoxy magnesium chloride ($MgCl(OC_2H_5)$), the nonmetallocene complex was changed to

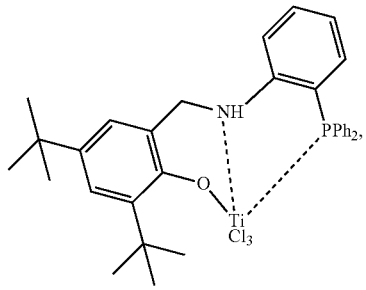

the solvent for dissolving the magnesium compound and the nonmetallocene complex was changed to xylene, and the chemical treating agent was changed to tetraethyl titanium ($Ti(CH_3CH_2)_4$).

The magnesium compound solution was vacuum dried at 110° C.

In this example, the ratio of the magnesium compound to the solvent for dissolving the magnesium compound and the nonmetallocene complex was 1 mol:300 ml, the ratio by molar of the magnesium compound to the nonmetallocene complex was 1:0.04, and the ratio by molar of the magnesium compound to the chemical treating agent was 1:0.05.

The thus obtained supported nonmetallocene catalyst was named as CAT-III-1-3.

Example III-1-4

Substantially the same as the Example III-1, except for the following changes:
The magnesium compound was changed to butoxy magnesium bromide ($MgBr(OC_4H_9)$), the nonmetallocene complex was changed to

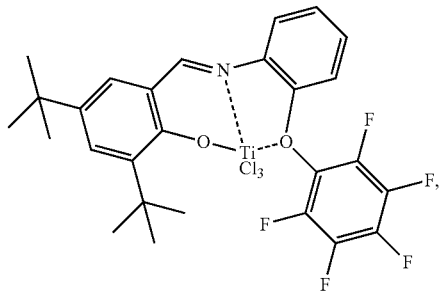

the solvent for dissolving the magnesium compound and the nonmetallocene complex was changed to diethyl benzene, and the chemical treating agent was changed to tetra-n-butyl titanium ($Ti(C_4H_9)_4$).

The magnesium compound solution was vacuum dried at 100° C.

In this example, the ratio of the magnesium compound to the solvent for dissolving the magnesium compound and the nonmetallocene complex was 1 mol:400 ml, the ratio by molar of the magnesium compound to the nonmetallocene complex was 1:0.30, and the ratio by molar of the magnesium compound to the chemical treating agent was 1:0.50.

The thus obtained supported nonmetallocene catalyst was named as CAT-III-1-4.

Example III-1-5

Substantially the same as the Example III-1, except for the following changes:

The magnesium compound was changed to methyl magnesium chloride (Mg(CH$_3$)Cl), the nonmetallocene complex was changed to

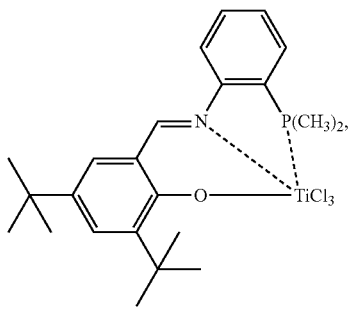

the solvent for dissolving the magnesium compound and the nonmetallocene complex was changed to chloro toluene, and the chemical treating agent was changed to tetraethyl zirconium (Zr(CH$_3$CH$_2$)$_4$).

The magnesium compound solution was vacuum dried at 130° C.

In this example, the ratio by molar of the magnesium compound to the nonmetallocene complex was 1:0.10, and the ratio by molar of the magnesium compound to the chemical treating agent was 1:0.10.

The thus obtained supported nonmetallocene catalyst was named as CAT-III-1-5.

Example III-1-6

Substantially the same as the Example III-1, except for the following changes:

The magnesium compound was changed to ethyl magnesium chloride (Mg(C$_2$H$_5$)Cl), the nonmetallocene complex was changed to

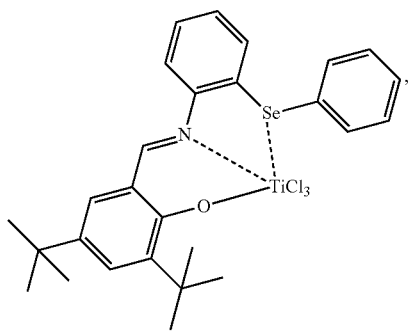

and the chemical treating agent was changed to tetraethoxy titanium (Ti(OCH$_3$CH$_2$)$_4$).

The thus obtained supported nonmetallocene catalyst was named as CAT-III-1-6.

Example III-1-7

Substantially the same as the Example III-1, except for the following changes:

The magnesium compound was changed to ethyl magnesium (Mg(C$_2$H$_5$)$_2$), the nonmetallocene complex was changed to

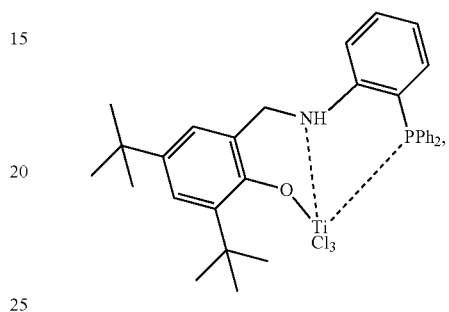

and the chemical treating agent was changed to isobutyl trichloro titanium (Ti(i-C$_4$H$_9$)Cl$_3$).

The thus obtained supported nonmetallocene catalyst was named as CAT-III-1-7.

Example III-1-8

Substantially the same as the Example III-1, except for the following changes:

The magnesium compound was changed to methyl ethoxy magnesium (Mg(OC$_2$H$_5$)(CH$_3$)), and the chemical treating agent was changed to triisobutoxy chloro titanium (TiCl(i-OC$_4$H$_9$)$_3$).

The thus obtained supported nonmetallocene catalyst was named as CAT-III-1-8.

Example III-1-9

Substantially the same as the Example III-1, except for the following changes:

The magnesium compound was changed to ethyl n-butoxy magnesium (Mg(OC$_4$H$_9$)(C$_2$H$_5$)), and the chemical treating agent was changed to dimethoxy dichloro zirconium (ZrCl$_2$(OCH$_3$)$_2$).

The thus obtained supported nonmetallocene catalyst was named as CAT-III-1-9.

Example III-2

Anhydrous magnesium chloride was used as the magnesium compound, tetrahydrofuran was used as the solvent for dissolving the magnesium compound and the nonmetallocene complex, titanium tetrachloride was used as the chemical treating agent, the compound represented by

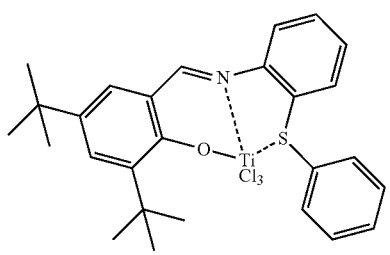

was used as the nonmetallocene complex.

5 g of the anhydrous magnesium chloride and the nonmetallocene complex were weighted, tetrahydrofuran was added thereto to completely dissolve same at the normal temperature. After stirring for 2 hours, the resultant was uniformly heated to 60° C. and directly vacuum dried, to obtain the modified carrier.

Then, to the modified carrier, 60 ml hexane was added, and then triethyl aluminum (as the assistant chemical treating agent, at a concentration of 15 wt % in hexane) was dropwise added thereto under stirring over a period of 30 minutes. The reaction continued at 60° C. under stirring for 4 hours, then filtered, washed with hexane for 2 times (60 ml each time), and vacuum dried at the normal temperature.

Then, to the thus pre-treated modified carrier, 60 ml hexane was added, and then titanium tetrachloride was dropwise added thereto under stirring over a period of 30 minutes. The reaction continued at 60° C. under stirring for 4 hours, then filtered, washed with hexane for 2 times (60 ml each time), and vacuum dried at the normal temperature to obtain the supported nonmetallocene catalyst.

In this example, the ratio of magnesium chloride to tetrahydrofuran was 1 mol:210 ml, the ratio by molar of magnesium chloride to the nonmetallocene complex was 1:0.08, the ratio by molar of magnesium chloride to triethyl aluminum was 1:0.15, and the ratio by molar of magnesium chloride to titanium tetrachloride was 1:0.15.

The thus obtained supported nonmetallocene catalyst was named as CAT-III-2.

Example III-2-1

Substantially the same as the Example III-2, except for the following changes:
The nonmetallocene complex was changed to

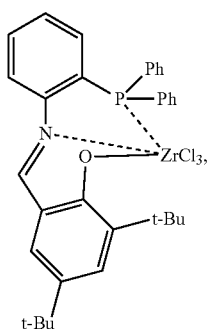

the solvent for dissolving the magnesium compound and the nonmetallocene complex was changed to toluene, the assistant chemical treating agent was changed to methyl aluminoxane (MAO, a 10 wt % solution in toluene), and the chemical treating agent was changed to zirconium tetrachloride (ZrCl$_4$).

The magnesium compound solution was vacuum dried at 90° C.

After pre-treated with the assistant chemical treating agent, the resultant was washed with toluene for 3 times.

In this example, the ratio of the magnesium compound to toluene was 1 mol:150 ml, the ratio by molar of the magnesium compound to the nonmetallocene complex was 1:0.15, the ratio by molar of the magnesium compound to the assistant chemical treating agent was 1:0.15, and the ratio by molar of the magnesium compound to the chemical treating agent was 1:0.20.

The thus obtained supported nonmetallocene catalyst was named as CAT-III-2-1.

Example III-2-2

Substantially the same as the Example III-2, except for the following changes:
The magnesium compound was changed to anhydrous magnesium bromide (MgBr$_2$), the nonmetallocene complex was changed to

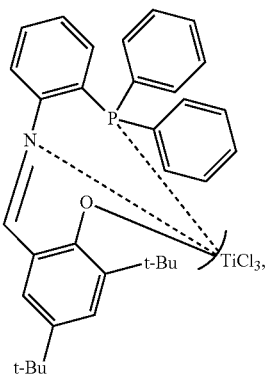

the solvent for dissolving the magnesium compound and the nonmetallocene complex was changed to ethyl benzene, the assistant chemical treating agent was changed to trimethyl aluminum (Al(CH$_3$)$_3$), and the chemical treating agent was changed to titanium tetrabromide (TiBr$_4$).

The magnesium compound solution was vacuum dried at 130° C.

In this example, the ratio of the magnesium compound to the solvent for dissolving the magnesium compound and the nonmetallocene complex was 1 mol:250 ml, the ratio by molar of the magnesium compound to the nonmetallocene complex was 1:0.2, the ratio by molar of the magnesium compound to the assistant chemical treating agent was 1:0.30, and the ratio by molar of the magnesium compound to the chemical treating agent was 1:0.30.

The thus obtained supported nonmetallocene catalyst was named as CAT-III-2-2.

Example III-2-3

Substantially the same as the Example III-2, except for the following changes:
The magnesium compound was changed to ethoxy magnesium chloride (MgCl(OC$_2$H$_5$)), the nonmetallocene complex was changed to

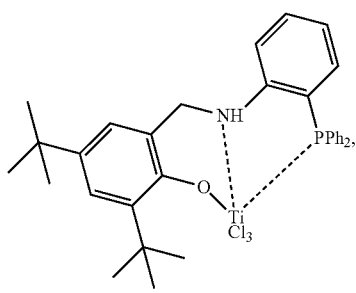

the solvent for dissolving the magnesium compound and the nonmetallocene complex was changed to xylene, the assistant chemical treating agent was changed to triisobutyl aluminum (Al(i-$C_4H_9$)$_3$), and the chemical treating agent was changed to tetraethyl titanium (Ti($CH_3CH_2$)$_4$).

The magnesium compound solution was vacuum dried at 110° C.

In this example, the ratio of the magnesium compound to the solvent for dissolving the magnesium compound and the nonmetallocene complex was 1 mol:300 ml, the ratio by molar of the magnesium compound to the nonmetallocene complex was 1:0.04, the ratio by molar of the magnesium compound to the assistant chemical treating agent was 1:0.05, and the ratio by molar of the magnesium compound to the chemical treating agent was 1:0.05.

The thus obtained supported nonmetallocene catalyst was named as CAT-III-2-3.

Example III-2-4

Substantially the same as the Example III-2, except for the following changes:

The magnesium compound was changed to butoxy magnesium bromide (MgBr(O$C_4H_9$)), the nonmetallocene complex was changed to

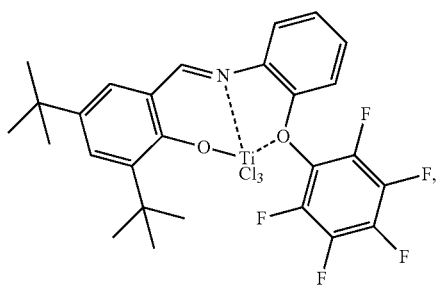

the solvent for dissolving the magnesium compound and the nonmetallocene complex was changed to diethyl benzene, the assistant chemical treating agent was changed to isobutyl aluminoxane, and the chemical treating agent was changed to tetran-butyl titanium (Ti($C_4H_9$)$_4$).

The magnesium compound solution was vacuum dried at 100° C.

In this example, the ratio of the magnesium compound to the solvent for dissolving the magnesium compound and the nonmetallocene complex was 1 mol:400 ml, the ratio by molar of the magnesium compound to the nonmetallocene complex was 1:0.30, the ratio by molar of the magnesium compound to the assistant chemical treating agent was 1:0.50, and the ratio by molar of the magnesium compound to the chemical treating agent was 1:0.50.

The thus obtained supported nonmetallocene catalyst was named as CAT-III-2-4.

Example III-2-5

Substantially the same as the Example III-2, except for the following changes:

The magnesium compound was changed to methyl magnesium chloride (Mg($CH_3$)Cl), the solvent for dissolving the magnesium compound and the nonmetallocene complex was changed to chloro toluene, the assistant chemical treating agent was changed to diethyl methyl aluminum (Al($CH_3$)($CH_3CH_2$)$_2$), and the chemical treating agent was changed to tetraethyl zirconium (Zr($CH_3CH_2$)$_4$).

The magnesium compound solution was vacuum dried at 130° C.

In this example, the ratio by molar of the magnesium compound to the nonmetallocene complex was 1:0.10, the ratio by molar of the magnesium compound to the assistant chemical treating agent was 1:0.10, and the ratio by molar of the magnesium compound to the chemical treating agent was 1:0.10.

The thus obtained supported nonmetallocene catalyst was named as CAT-III-2-5.

Reference Example III-1-A

Substantially the same as the Example III-1, except for the following changes:

No nonmetallocene complex was used.

The thus obtained catalyst was named as CAT-II-1-A.

Reference Example III-1-B

Substantially the same as the Example III-1, except for the following changes:

The ratio by molar of magnesium chloride to the nonmetallocene complex was changed to 1:0.16.

The thus obtained catalyst was named as CAT-II-1-B.

Reference Example III-1-C

Substantially the same as the Example III-1, except for the following changes:

The ratio by molar of magnesium chloride to the nonmetallocene complex was changed to 1:0.04.

The thus obtained catalyst was named as CAT-II-1-C.

Reference Example III-1-D

Substantially the same as the Example III-1, except for the following changes:

The modified carrier was not treated by titanium tetrachloride.

The thus obtained catalyst was named as CAT-III-1-D.

Reference Example III-1-E

Substantially the same as the Example III-1, except for the following changes:

In preparation of the modified carrier, 60 ml hexane was added to the magnesium compound solution to precipitate same, which was then filtered, washed with hexane for 3 times (60 ml per time).

The thus obtained catalyst was named as CAT-III-1-E.

Reference Example III-1-F

Substantially the same as the Example III-1, except for the following changes:

The nonmetallocene complex was changed to the following nonmetallocene ligand.

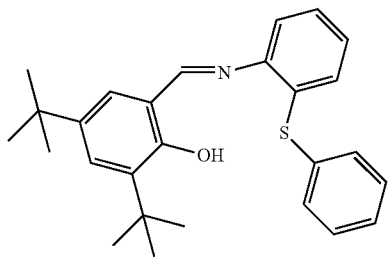

The thus obtained catalyst was named as CAT-III-1-F.

Example III-3

Application Example III

The catalysts CAT-III-1, CAT-III-2, CAT-III-1-1 to CAT-III-1-5, CAT-III-2-5, CAT-III-1-A to CAT-III-1-F obtained from the aforesaid Example III series were used for ethylene homopolymerization/copolymerization and ultra high molecular weight polyethylene preparation under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table III-1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table III-1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a ratio by molar of the co-catalyst to the active metal in the catalyst of 100, a polymerization time of 6 hours.

Specifically, 2.5 L hexane was added to the autoclave for polymerization, and the stirring means was started. Then, 50 mg of a mixture of the supported nonmetallocene catalyst and the co-catalyst was added thereto, and finally ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table III-2

TABLE III-1

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm$^3$) | Molecular weight distribution |
|---|---|---|---|---|---|---|---|
| 1 | CAT-III-1 | triethyl aluminum | 100 | homopolymerization | 86.24 | 0.29 | 3.20 |
| 2 | CAT-III-1 | methyl aluminoxane | 100 | homopolymerization | 88.37 | 0.30 | 2.77 |
| 3 | CAT-III-1 | triethyl aluminum | 100 | copolymerization | 95.85 | 0.30 | 2.98 |
| 4 | CAT-III-1 | triethyl aluminum | 500 | copolymerization | 101.12 | 0.30 | 3.28 |
| 5 | CAT-III-1-1 | triethyl aluminum | 100 | homopolymerization | 33.70 | 0.25 | — |
| 6 | CAT-III-1-2 | triethyl aluminum | 100 | homopolymerization | 95.24 | 0.26 | — |
| 7 | CAT-III-1-3 | triethyl aluminum | 100 | homopolymerization | 44.77 | 0.26 | — |
| 8 | CAT-III-1-4 | triethyl aluminum | 100 | homopolymerization | 31.65 | 0.25 | — |
| 9 | CAT-III-1-5 | triethyl aluminum | 100 | homopolymerization | 82.90 | 0.28 | — |
| 10 | CAT-III-2 | triethyl aluminum | 100 | homopolymerization | 90.27 | 0.30 | 2.87 |
| 11 | CAT-III-2 | methyl aluminoxane | 100 | homopolymerization | 94.35 | 0.32 | 2.56 |
| 12 | CAT-III-2 | triethyl aluminum | 100 | copolymerization | 103.70 | 0.31 | 2.95 |
| 13 | CAT-III-2-1 | triethyl aluminum | 100 | homopolymerization | 47.65 | 0.26 | — |
| 14 | CAT-III-2-2 | triethyl aluminum | 100 | homopolymerization | 73.55 | 0.29 | — |
| 15 | CAT-III-2-3 | triethyl aluminum | 100 | homopolymerization | 51.82 | 0.27 | — |
| 16 | CAT-III-2-4 | triethyl aluminum | 100 | homopolymerization | 38.40 | 0.27 | — |
| 17 | CAT-III-2-5 | triethyl aluminum | 100 | homopolymerization | 88.40 | 0.28 | — |
| 18 | CAT-III-1-A | triethyl aluminum | 100 | homopolymerization | 70.20 | 0.28 | 4.14 |
| 19 | CAT-III-1-B | triethyl aluminum | 100 | homopolymerization | 101.50 | 0.31 | 2.70 |

TABLE III-1-continued

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm$^3$) | Molecular weight distribution |
|---|---|---|---|---|---|---|---|
| 20 | CAT-III-1-C | triethyl aluminum | 100 | homopolymerization | 78.74 | 0.29 | 3.44 |
| 21 | CAT-III-1-D | triethyl aluminum | 100 | homopolymerization | 12.56 | 0.31 | 2.70 |
| 22 | CAT-III-1-E | triethyl aluminum | 100 | homopolymerization | 80.20 | 0.31 | 3.34 |
| 23 | CAT-III-1-F | triethyl aluminum | 100 | homopolymerization | 43.63 | 0.28 | 3.14 |

TABLE III-2

The results of the ultra high molecular weight polyethylene preparation obtained with the supported nonmetallocene catalysts

| Experiment No. | Catalyst No. | Co-catalyst | Poly activity (kgPE/gCat) | Bulk density (g/cm$^3$) | Mv (10$^4$ g/mol) |
|---|---|---|---|---|---|
| 1 | CAT-III-1 | triethyl aluminum | 93.37 | 0.34 | 400 |
| 2 | CAT-III-1 | methyl aluminoxane | 80.26 | 0.34 | 430 |
| 3 | CAT-III-2 | triethyl aluminum | 102.38 | 0.34 | 450 |
| 4 | CAT-III-2 | methyl aluminoxane | 97.46 | 0.35 | 535 |
| 5 | CAT-III-1-A | triethyl aluminum | 68.99 | 0.31 | 280 |
| 6 | CAT-III-1-B | triethyl aluminum | 98.28 | 0.33 | 496 |
| 7 | CAT-III-1-C | triethyl aluminum | 77.81 | 0.32 | 375 |
| 8 | CAT-III-1-D | triethyl aluminum | 20.68 | 0.26 | 240 |
| 9 | CAT-III-1-E | triethyl aluminum | 83.37 | 0.38 | 370 |
| 10 | CAT-III-1-F | triethyl aluminum | 57.51 | 0.30 | 420 |

As can be seen from the results of the experiment Nos. 3 and 4 in the Table III-1, increasing the ratio by molar of the co-catalyst to the active metal in the catalyst will not significantly change the polymerization activity and the bulk density of the polymer. This fact indicates that a high activity for olefin polymerization can be obtained with a relatively less amount of the co-catalyst when the supported nonmetallocene catalyst produced in line with the process of this invention is used herein.

Upon comparison of the results of the experiment No. 1 and those of the experiment No. 3, the results of the experiment No. 10 and those of the experiment No. 12, in the Table III-1, it is clear that in case of copolymerization, the polymerization activity increases significantly. This fact indicates that the supported nonmetallocene catalyst produced in line with the process of this invention exhibits a relatively significant co-monomer effect.

Upon comparison of the results from the experiment No. 1 and those from the reference example experiment Nos. 18 to 20 in the Table III-1, it is clear that the activity of the catalyst increases or decreases as the amount of the nonmetallocene complex to be introduced into the catalyst increases or decreases, while the molecular weight distribution of the polymer narrows or broadens accordingly. Further, the activity of the catalyst increases or decreases as the amount of the chemical treating agent to be introduced into the catalyst increases or decreases, while the molecular weight distribution of the polymer broadens or narrows accordingly. This fact indicates that the nonmetallocene complex shows a function of narrowing the molecular weight distribution of the polymer, while the chemical treating agent shows a function of increasing the activity of the catalyst and broadening the molecular weight distribution of the polymer. For this reason, different catalysts in terms of activity and polymer performances can be obtained with this invention by altering the ratio between these two components.

As can be seen from the results of the experiment Nos. 1 to 9 and 10 to 16 in the Table III-1, treatment of the modified carrier with the assistant chemical treating agent will increase the activity of the catalyst and narrow the molecular weight distribution of the polymer. This fact indicates that the assistant chemical treating agent shows a function of increasing the activity of the catalyst and narrowing the molecular weight distribution of the polymer.

As can be seen from the results of the experiment Nos. 1, 18 and 21 in the Table III-1 and those of the experiment Nos. 1, 5 and 8 in the Table III-2, the catalyst obtained with the case wherein only nonmetallocene complex was used in preparation of the supported nonmetallocene catalyst, or that obtained with the case wherein only chemical treating agent was used in preparation of the supported nonmetallocene catalyst, shows lowered activity than that obtained with the case wherein both of the nonmetallocene complex and the chemical treating agent were used in preparation of the supported nonmetallocene catalyst. This fact indicates that the supported nonmetallocene catalyst produced in line with the process of this invention necessarily involves a synergic effect. That is, the activity observed with the case wherein both components exist is higher than that observed with the case wherein only either component exists.

Upon comparison of the results from the experiment No. 1 and those from the experiment No. 22 in the Table III-1, it is clear that the catalyst obtained by a direct drying process exhibits a significantly higher activity than that obtained by a filtering, washing and drying process.

Upon comparison of the results from the experiment No. 1 and those from the experiment No. 23 in the Table III-1, it is clear that the activity of the catalyst obtained by supporting the nonmetallocene complex is significantly higher than that of the catalyst obtained by supporting the nonmetallocene ligand. The reason is that a nonmetallocene ligand per se has no activity for olefin polymerization, and will be given same only after in-situ reacting with a chemical treating agent to form a nonmetallocene complex.

As can be seen from the Table III-2, it is possible to prepare an ultra high molecular weight polyethylene (with to some degree increased bulk density) by using the catalyst according to this invention. Upon comparison of the results from the experiment No. 1 and those from the experiment No. 2, the results from the experiment No. 3 and those from the experiment No. 4, it is clear that the viscosity averaged molecular weight of the polymer can be increased by using MAO as the co-catalyst. Upon comparison of the results from the experiment No. 1 and those from the reference example experiment Nos. 5 to 7 in the Table III-2, it is clear that the viscosity averaged molecular weight of the polymer increases or decreases as the amount of the nonmetallocene complex to be introduced into the catalyst increases or decreases. This fact indicates that the nonmetallocene complex further shows a function of increasing the viscosity averaged molecular weight of the polymer.

Upon comparison of the results from the experiment No. 1 and those from the reference experiment No. 10 in the Table III-2, it is clear that the activity in preparation of the ultra high molecular weight polyethylene of the catalyst obtained by supporting the nonmetallocene complex is significantly higher than that of the catalyst obtained by supporting the nonmetallocene ligand. The reason is also that a nonmetallocene ligand per se has no activity for olefin polymerization, and will be given same only after in-situ reacting with a chemical treating agent to form a nonmetallocene complex. Further, in treatment of the modified carrier containing the nonmetallocene ligand with the chemical treating agent, the in-situ reaction is so violent that the formed structure of the modified carrier is destroyed, which leads to a lowered molecular weight of the resultant ultra high molecular weight polyethylene.

Example IV

Corresponding to the Fourth Embodiment

Example IV-1

Anhydrous magnesium chloride was used as the magnesium compound, tetrahydrofuran was used as the solvent for dissolving the magnesium compound and the nonmetallocene complex, titanium tetrachloride was used as the chemical treating agent, the compound represented by

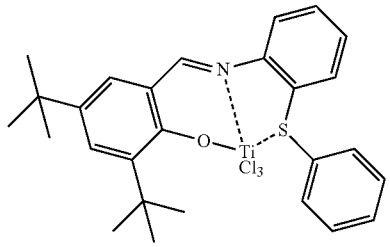

was used as the nonmetallocene complex.

5 g of the anhydrous magnesium chloride and the nonmetallocene complex were weighted, tetrahydrofuran was added thereto to completely dissolve same at the normal temperature. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 60° C. and vacuum dried, to obtain the modified carrier.

Then, to the modified carrier, 60 ml hexane was added, and then titanium tetrachloride was dropwise added thereto under stirring over a period of 30 minutes. The reaction continued at 60° C. under stirring for 4 hours, then filtered, washed with hexane for 2 times (60 ml each time), and vacuum dried at the normal temperature to obtain the supported nonmetallocene catalyst.

In this example, the ratio of magnesium chloride to tetrahydrofuran was 1 mol:210 ml, the ratio by molar of magnesium chloride to the nonmetallocene complex was 1:0.08, the ratio by volume of the precipitating agent to tetrahydrofuran was 1:1, and the ratio by molar of magnesium chloride to titanium tetrachloride was 1:0.15.

The thus obtained supported nonmetallocene catalyst was named as CAT-IV-1.

Example IV-1-1

Substantially the same as the Example IV-1, except for the following changes:

The nonmetallocene complex was changed to

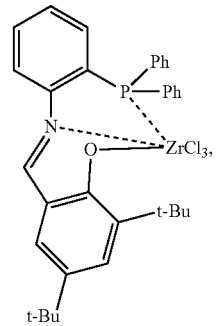

the solvent for dissolving the magnesium compound and the nonmetallocene complex was changed to toluene, the precipitating agent was changed to cyclohexane, and the chemical treating agent was changed to zirconium tetrachloride ($ZrCl_4$).

In this example, the ratio of the magnesium compound to toluene was 1 mol:150 ml, the ratio by molar of the magnesium compound to the nonmetallocene complex was 1:0.15, the ratio by volume of the precipitating agent to the solvent for dissolving the magnesium compound and the nonmetallocene complex was 1:2, and the ratio by molar of the magnesium compound to the chemical treating agent was 1:0.20.

The thus obtained supported nonmetallocene catalyst was named as CAT-IV-1-1.

Example IV-1-2

Substantially the same as the Example IV-1, except for the following changes:

The magnesium compound was changed to anhydrous magnesium bromide ($MgBr_2$), the nonmetallocene complex was changed to

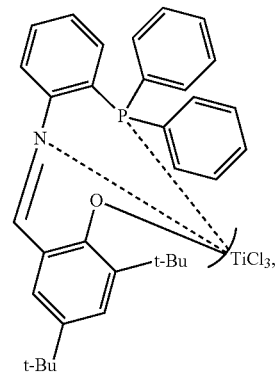

the solvent for dissolving the magnesium compound and the nonmetallocene complex was changed to ethyl benzene, the precipitating agent was changed to cycloheptane, and the chemical treating agent was changed to titanium tetrabromide (TiBr$_4$).

In this example, the ratio of the magnesium compound to the solvent for dissolving the magnesium compound and the nonmetallocene complex was 1 mol:250 ml, the ratio by molar of the magnesium compound to the nonmetallocene complex was 1:0.20, the ratio by volume of the precipitating agent to the solvent for dissolving the magnesium compound and the nonmetallocene complex was 1:0.7, and the ratio by molar of the magnesium compound to the chemical treating agent was 1:0.30.

The thus obtained supported nonmetallocene catalyst was named as CAT-IV-1-2.

Example IV-1-3

Substantially the same as the Example IV-1, except for the following changes:

The magnesium compound was changed to ethoxy magnesium chloride (MgCl(OC$_2$H$_5$)), the nonmetallocene complex was changed to

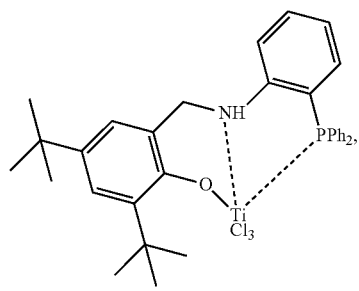

the solvent for dissolving the magnesium compound and the nonmetallocene complex was changed to xylene, the precipitating agent was changed to decane, and the chemical treating agent was changed to tetraethyl titanium (Ti(CH$_3$CH$_2$)$_4$).

In this example, the ratio of the magnesium compound to the solvent for dissolving the magnesium compound and the nonmetallocene complex was 1 mol:300 ml, the ratio by molar of the magnesium compound to the nonmetallocene complex was 1:0.04, the ratio by volume of the precipitating agent to the solvent for dissolving the magnesium compound and the nonmetallocene complex was 1:1.5, and the ratio by molar of the magnesium compound to the chemical treating agent was 1:0.05.

The thus obtained supported nonmetallocene catalyst was named as CAT-IV-1-3.

Example IV-1-4

Substantially the same as the Example IV-1, except for the following changes:

The magnesium compound was changed to butoxy magnesium bromide (MgBr(OC$_4$H$_9$)), the nonmetallocene complex was changed to

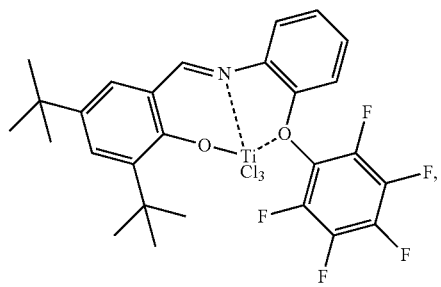

the solvent for dissolving the magnesium compound and the nonmetallocene complex was changed to diethyl benzene, and the chemical treating agent was changed to tetran-butyl titanium (Ti(C$_4$H$_9$)$_4$).

In this example, the ratio of the magnesium compound to the solvent for dissolving the magnesium compound and the nonmetallocene complex was 1 mol:400 ml, the ratio by molar of the magnesium compound to the nonmetallocene complex was 1:0.30, and the ratio by molar of the magnesium compound to the chemical treating agent was 1:0.50.

The thus obtained supported nonmetallocene catalyst was named as CAT-IV-1-4.

Example IV-1-5

Substantially the same as the Example IV-1, except for the following changes:

The magnesium compound was changed to methyl magnesium chloride (Mg(CH$_3$)Cl), the nonmetallocene complex was changed to

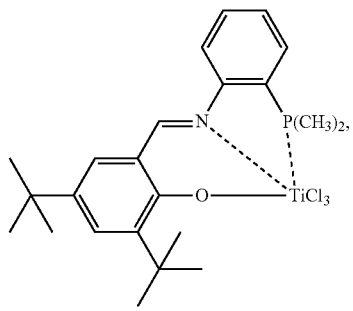

the solvent for dissolving the magnesium compound and the nonmetallocene complex was changed to chloro toluene, and the chemical treating agent was changed to tetraethyl zirconium (Zr(CH$_3$CH$_2$)$_4$).

In this example, the ratio by molar of the magnesium compound to the nonmetallocene complex was 1:0.10, and the ratio by molar of the magnesium compound to the chemical treating agent was 1:0.10.

The thus obtained supported nonmetallocene catalyst was named as CAT-IV-1-5.

Example IV-1-6

Substantially the same as the Example IV-1, except for the following changes:

The magnesium compound was changed to ethyl magnesium chloride (Mg(C$_2$H$_5$)Cl), the nonmetallocene complex was changed to

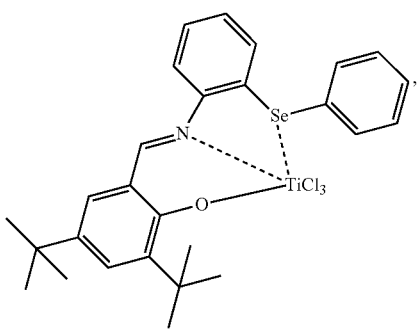, and the chemical treating agent was changed to tetraethoxy titanium (Ti(OCH$_3$CH$_2$)$_4$).

The thus obtained supported nonmetallocene catalyst was named as CAT-IV-1-6.

Example IV-1-7

Substantially the same as the Example IV-1, except for the following changes:

The magnesium compound was changed to ethyl magnesium (Mg(C$_2$H$_5$)$_2$), the nonmetallocene complex was changed to

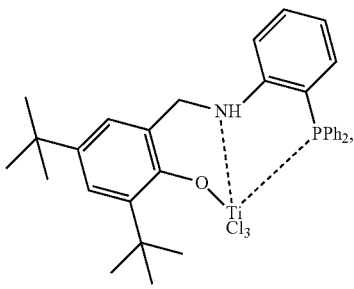

and the chemical treating agent was changed to isobutyl trichloro titanium (Ti(i-C$_4$H$_9$)Cl$_3$).

The thus obtained supported nonmetallocene catalyst was named as CAT-IV-1-7.

Example IV-1-8

Substantially the same as the Example IV-1, except for the following changes:

The magnesium compound was changed to methyl ethoxy magnesium (Mg(OC$_2$H$_5$)(CH$_3$)), and the chemical treating agent was changed to triisobutoxy chloro titanium (TiCl(i-OC$_4$H$_9$)$_3$).

The thus obtained supported nonmetallocene catalyst was named as CAT-IV-1-8.

Example IV-1-9

Substantially the same as the Example IV-1, except for the following changes:

The magnesium compound was changed to ethyl n-butoxy magnesium (Mg(OC$_4$H$_9$)(C$_2$H$_5$)), and the chemical treating agent was changed to dimethoxy dichloro zirconium (ZrCl$_2$(OCH$_3$)$_2$).

The thus obtained supported nonmetallocene catalyst was named as CAT-IV-1-9.

Example IV-2

Anhydrous magnesium chloride was used as the magnesium compound, tetrahydrofuran was used as the solvent for dissolving the magnesium compound and the nonmetallocene complex, titanium tetrachloride was used as the chemical treating agent, the compound represented by

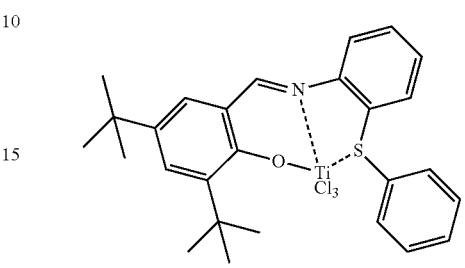

was used as the nonmetallocene complex.

5 g of the anhydrous magnesium chloride and the nonmetallocene complex were weighted, tetrahydrofuran was added thereto to completely dissolve same at the normal temperature. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 60° C. and vacuum dried, to obtain the modified carrier.

Then, to the modified carrier, 60 ml hexane was added, and then triethyl aluminum (as the assistant chemical treating agent, at a concentration of 15 wt % in hexane) was dropwise added thereto under stirring over a period of 30 minutes. The reaction continued at 60° C. under stirring for 4 hours, then filtered, washed with hexane for 2 times (60 ml each time), and vacuum dried at the normal temperature.

Then, to the thus pre-treated modified carrier, 60 ml hexane was added, and then titanium tetrachloride was dropwise added thereto under stirring over a period of 30 minutes. The reaction continued at 60° C. under stirring for 4 hours, then filtered, washed with hexane for 2 times (60 ml each time), and vacuum dried at the normal temperature to obtain the supported nonmetallocene catalyst.

In this example, the ratio of magnesium chloride to tetrahydrofuran was 1 mol:210 ml, the ratio by molar of magnesium chloride to the nonmetallocene complex was 1:0.08, the ratio by volume of the precipitating agent to tetrahydrofuran was 1:1, the ratio by molar of magnesium chloride to triethyl aluminum was 1:0.15, and the ratio by molar of magnesium chloride to titanium tetrachloride was 1:0.15.

The thus obtained supported nonmetallocene catalyst was named as CAT-IV-2.

Example IV-2-1

Substantially the same as the Example IV-2, except for the following changes:

The nonmetallocene complex was changed to

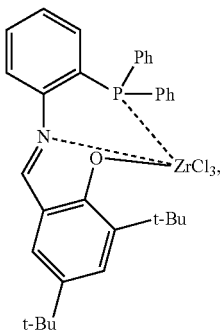

the solvent for dissolving the magnesium compound and the nonmetallocene complex was changed to toluene, the precipitating agent was changed to cyclohexane, the assistant chemical treating agent was changed to methyl aluminoxane (MAO, a 10 wt % solution in toluene), and the chemical treating agent was changed to zirconium tetrachloride ($ZrCl_4$).

The magnesium compound solution was vacuum dried at 90° C.

After pre-treated with the assistant chemical treating agent, the resultant was washed with toluene for 3 times.

In this example, the ratio of the magnesium compound to toluene was 1 mol:150 ml, the ratio by molar of the magnesium compound to the nonmetallocene complex was 1:0.15, the ratio by volume of the precipitating agent to the solvent for dissolving the magnesium compound and the nonmetallocene complex was 1:2, the ratio by molar of the magnesium compound to the assistant chemical treating agent was 1:0.15, and the ratio by molar of the magnesium compound to the chemical treating agent was 1:0.20.

The thus obtained supported nonmetallocene catalyst was named as CAT-IV-2-1.

Example IV-2-2

Substantially the same as the Example IV-2, except for the following changes:

The magnesium compound was changed to anhydrous magnesium bromide ($MgBr_2$), the nonmetallocene complex was changed to

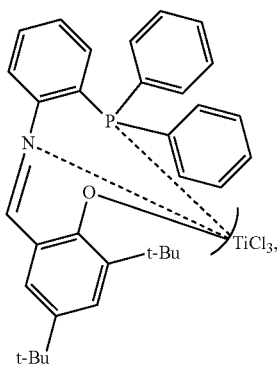

the solvent for dissolving the magnesium compound and the nonmetallocene complex was changed to ethyl benzene, the precipitating agent was changed to cycloheptane, the assistant chemical treating agent was changed to trimethyl aluminum ($Al(CH_3)_3$), and the chemical treating agent was changed to titanium tetrabromide ($TiBr_4$).

In this example, the ratio of the magnesium compound to the solvent for dissolving the magnesium compound and the nonmetallocene complex was 1 mol:250 ml, the ratio by molar of the magnesium compound to the nonmetallocene complex was 1:0.2, the ratio by volume of the precipitating agent to the solvent for dissolving the magnesium compound and the nonmetallocene complex was 1:0.70, the ratio by molar of the magnesium compound to the assistant chemical treating agent was 1:0.30, and the ratio by molar of the magnesium compound to the chemical treating agent was 1:0.30.

The thus obtained supported nonmetallocene catalyst was named as CAT-IV-2-2.

Example IV-2-3

Substantially the same as the Example IV-2, except for the following changes:

The magnesium compound was changed to ethoxy magnesium chloride ($MgCl(OC_2H_5)$), the nonmetallocene complex was changed to

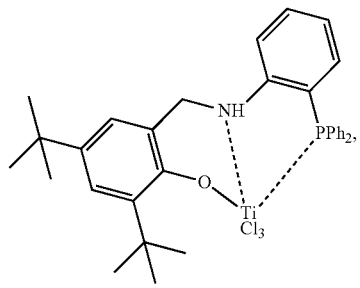

the solvent for dissolving the magnesium compound and the nonmetallocene complex was changed to xylene, the precipitating agent was changed to decane, the assistant chemical treating agent was changed to triisobutyl aluminum ($Al(i-C_4H_9)_3$), and the chemical treating agent was changed to tetraethyl titanium ($Ti(CH_3CH_2)_4$).

In this example, the ratio of the magnesium compound to the solvent for dissolving the magnesium compound and the nonmetallocene complex was 1 mol:300 ml, the ratio by molar of the magnesium compound to the nonmetallocene complex was 1:0.04, the ratio by volume of the precipitating agent to the solvent for dissolving the magnesium compound and the nonmetallocene complex was 1:1.5, the ratio by molar of the magnesium compound to the assistant chemical treating agent was 1:0.05, and the ratio by molar of the magnesium compound to the chemical treating agent was 1:0.05.

The thus obtained supported nonmetallocene catalyst was named as CAT-IV-2-3.

Example IV-2-4

Substantially the same as the Example IV-2, except for the following changes:

The magnesium compound was changed to butoxy magnesium bromide ($MgBr(OC_4H_9)$), the nonmetallocene complex was changed to

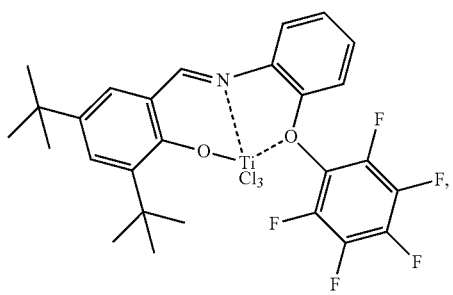

the solvent for dissolving the magnesium compound and the nonmetallocene complex was changed to diethyl benzene, the assistant chemical treating agent was changed to isobutyl aluminoxane, and the chemical treating agent was changed to tetran-butyl titanium (Ti($C_4H_9$)$_4$).

In this example, the ratio of the magnesium compound to the solvent for dissolving the magnesium compound and the nonmetallocene complex was 1 mol:400 ml, the ratio by molar of the magnesium compound to the nonmetallocene complex was 1:0.30, the ratio by molar of the magnesium compound to the assistant chemical treating agent was 1:0.50, and the ratio by molar of the magnesium compound to the chemical treating agent was 1:0.50.

The thus obtained supported nonmetallocene catalyst was named as CAT-IV-2-4.

Example IV-2-5

Substantially the same as the Example IV-2, except for the following changes:

The magnesium compound was changed to methyl magnesium chloride (Mg($CH_3$)Cl), the solvent for dissolving the magnesium compound and the nonmetallocene complex was changed to chloro toluene, the assistant chemical treating agent was changed to diethyl methyl aluminum (Al($CH_3$)($CH_3CH_2$)$_2$), and the chemical treating agent was changed to tetraethyl zirconium (Zr($CH_3CH_2$)$_4$).

In this example, the ratio by molar of the magnesium compound to the nonmetallocene complex was 1:0.10, the ratio by molar of the magnesium compound to the assistant chemical treating agent was 1:0.10, and the ratio by molar of the magnesium compound to the chemical treating agent was 1:0.10.

The thus obtained supported nonmetallocene catalyst was named as CAT-IV-2-5.

Reference Example IV-1-A

Substantially the same as the Example IV-1, except for the following changes:

No nonmetallocene complex was used.
The thus obtained catalyst was named as CAT-IV-1-A.

Reference Example IV-1-B

Substantially the same as the Example IV-1, except for the following changes:

The ratio by molar of magnesium chloride to the nonmetallocene complex was changed to 1:0.16.
The thus obtained catalyst was named as CAT-IV-1-B.

Reference Example IV-1-C

Substantially the same as the Example IV-1, except for the following changes:

The ratio by molar of magnesium chloride to the nonmetallocene complex was changed to 1:0.04.
The thus obtained catalyst was named as CAT-IV-1-C.

Reference Example IV-1-D

Substantially the same as the Example IV-1, except for the following changes:

The modified carrier was not treated by titanium tetrachloride.
The thus obtained catalyst was named as CAT-IV-1-D.

Reference Example IV-1-E

Substantially the same as the Example IV-1, except for the following changes:

The nonmetallocene complex was changed to the following nonmetallocene ligand.

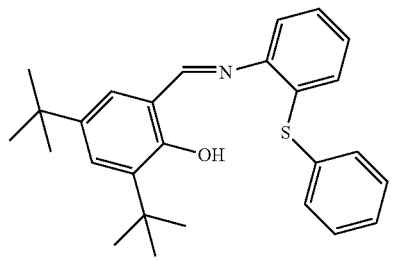 [SMILES: CC(C)(C)c1cc(/C=N/c2ccccc2Sc2ccccc2)c(O)c(C(C)(C)C)c1]

The thus obtained catalyst was named as CAT-IV-1-E.

Example IV-3

Application Example IV

The catalysts CAT-IV-1, CAT-IV-2, CAT-IV-1-1 to CAT-IV-1-5, CAT-IV-2-5, CAT-IV-1-A to CAT-IV-1-E obtained from the aforesaid Example IV series were used for ethylene homopolymerization/copolymerization and ultra high molecular weight polyethylene preparation under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table IV-1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 50 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table IV-1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a ratio by molar of the co-catalyst to the active metal in the catalyst of 100, a polymerization time of 6 hours.

Specifically, 2.5 L hexane was added to the autoclave for polymerization, and the stirring means was started. Then, 50 mg of a mixture of the supported nonmetallocene catalyst and the co-catalyst was added thereto, and finally ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table IV-2.

TABLE IV-1

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm$^3$) | Molecular weight distribution |
|---|---|---|---|---|---|---|---|
| 1 | CAT-IV-1 | triethyl aluminum | 100 | homopolymerization | 80.20 | 0.31 | 3.34 |
| 2 | CAT-IV-1 | methyl aluminoxane | 100 | homopolymerization | 82.18 | 0.32 | 2.92 |
| 3 | CAT-IV-1 | triethyl aluminum | 100 | copolymerization | 89.14 | 0.32 | 3.07 |
| 4 | CAT-IV-1 | triethyl aluminum | 500 | copolymerization | 94.04 | 0.32 | 3.40 |
| 5 | CAT-IV-1-1 | triethyl aluminum | 100 | homopolymerization | 31.34 | 0.27 | — |
| 6 | CAT-IV-1-2 | triethyl aluminum | 100 | homopolymerization | 62.54 | 0.28 | — |
| 7 | CAT-IV-1-3 | triethyl aluminum | 100 | homopolymerization | 41.64 | 0.28 | — |
| 8 | CAT-IV-1-4 | triethyl aluminum | 100 | homopolymerization | 29.43 | 0.27 | — |
| 9 | CAT-IV-1-5 | triethyl aluminum | 100 | homopolymerization | 77.10 | 0.30 | — |
| 10 | CAT-IV-2 | triethyl aluminum | 100 | homopolymerization | 82.41 | 0.32 | 2.96 |
| 11 | CAT-IV-2 | methyl aluminoxane | 100 | homopolymerization | 87.75 | 0.34 | 2.75 |
| 12 | CAT-IV-2 | triethyl aluminum | 100 | copolymerization | 96.44 | 0.33 | 3.05 |
| 13 | CAT-IV-2-1 | triethyl aluminum | 100 | homopolymerization | 44.31 | 0.28 | — |
| 14 | CAT-IV-2-2 | triethyl aluminum | 100 | homopolymerization | 68.40 | 0.31 | — |
| 15 | CAT-IV-2-3 | triethyl aluminum | 100 | homopolymerization | 48.19 | 0.29 | — |
| 16 | CAT-IV-2-4 | triethyl aluminum | 100 | homopolymerization | 35.71 | 0.29 | — |
| 17 | CAT-IV-2-5 | triethyl aluminum | 100 | homopolymerization | 82.21 | 0.30 | — |
| 18 | CAT-IV-1-A | triethyl aluminum | 100 | homopolymerization | 65.29 | 0.30 | 4.21 |
| 19 | CAT-IV-1-B | triethyl aluminum | 100 | homopolymerization | 94.40 | 0.33 | 2.86 |
| 20 | CAT-IV-1-C | triethyl aluminum | 100 | homopolymerization | 73.23 | 0.31 | 3.57 |
| 21 | CAT-IV-1-D | triethyl aluminum | 100 | homopolymerization | 11.47 | 0.27 | 2.40 |
| 22 | CAT-IV-1-E | triethyl aluminum | 100 | homopolymerization | 56.82 | 0.29 | 3.26 |

TABLE IV-2

The results of the ultra high molecular weight polyethylene preparation obtained with the supported nonmetallocene catalysts

| Experiment No. | Catalyst No. | Co-catalyst | Poly activity (kgPE/gCat) | Bulk density (g/cm$^3$) | Mv ($10^4$ g/mol) |
|---|---|---|---|---|---|
| 1 | CAT-IV-1 | triethyl aluminum | 83.37 | 0.38 | 370 |
| 2 | CAT-IV-1 | methyl aluminoxane | 71.66 | 0.38 | 400 |
| 3 | CAT-IV-2 | triethyl aluminum | 91.41 | 0.38 | 425 |
| 4 | CAT-IV-2 | methyl aluminoxane | 87.02 | 0.39 | 522 |
| 5 | CAT-IV-1-A | triethyl aluminum | 54.47 | 0.35 | 280 |
| 6 | CAT-IV-1-B | triethyl aluminum | 87.75 | 0.37 | 484 |
| 7 | CAT-IV-1-C | triethyl aluminum | 67.74 | 0.35 | 300 |
| 8 | CAT-IV-1-D | triethyl aluminum | 16.40 | 0.31 | 585 |
| 9 | CAT-IV-1-E | triethyl aluminum | 60.57 | 0.33 | 390 |

As can be seen from the results of the experiment Nos. 3 and 4 in the Table IV-1, increasing the amount of the co-catalyst to be used (i.e. increasing the ratio by molar of the co-catalyst to the active metal in the catalyst) will not significantly change the polymerization activity and the bulk density of the polymer. This fact indicates that a high activity for olefin polymerization can be obtained with a relatively less amount of the co-catalyst when the supported nonmetallocene catalyst produced in line with the process of this invention is used herein.

Upon comparison of the results of the experiment No. 1 and those of the experiment No. 3, the results of the experiment No. 10 and those of the experiment No. 12 in the Table IV-1, it is clear that in case of copolymerization, the polymerization activity increases significantly. This fact indicates that the supported nonmetallocene catalyst produced in line with the process of this invention exhibits a relatively significant co-monomer effect.

Upon comparison of the results from the experiment No. 1 and those from the reference example experiment Nos. 18 to 20 in the Table IV-1, it is clear that the activity of the catalyst increases or decreases as the amount of the nonmetallocene complex to be introduced into the catalyst increases or decreases, while the molecular weight distribution of the polymer narrows or broadens accordingly. Further, the activity of the catalyst increases or decreases as the amount of the chemical treating agent to be introduced into the catalyst increases or decreases, while the molecular weight distribution of the polymer broadens or narrows accordingly. This fact indicates that the nonmetallocene complex shows a function of narrowing the molecular weight distribution of the polymer, while the chemical treating agent shows a function of increasing the activity of the catalyst and broadening the molecular weight distribution of the polymer. For this reason, different catalysts in terms of activity and polymer performances can be obtained with this invention by altering the ratio between these two components.

As can be seen from the results of the experiment Nos. 1 to 9 and 10 to 16 in the Table IV-1, treatment of the modified carrier with the assistant chemical treating agent will increase the activity of the catalyst and narrow the molecular weight distribution of the polymer. This fact indicates that the assistant chemical treating agent shows a function of increasing the activity of the catalyst and narrowing the molecular weight distribution of the polymer.

Upon comparison of the results from the experiment No. 1 and those from the reference example experiment No. 21 in the Table IV-1, the results from the experiment No. 1 and those from the reference example experiment No. 8 in the Table IV-2, it is clear that the chemical treatment will significantly increase the activity of the catalyst.

Upon comparison of the results from the experiment No. 1 and those from the reference example experiment No. 22 in the Table IV-1, just as revealed by the Table III-1, it is clear that the activity of the catalyst obtained by supporting the nonmetallocene complex is significantly higher than that of the catalyst obtained by supporting the nonmetallocene ligand. The reason is also that a nonmetallocene ligand per se has no activity for olefin polymerization, and will be given same only after in-situ reacting with a chemical treating agent to form a nonmetallocene complex.

As can be seen from the Table IV-2, it is possible to prepare an ultra high molecular weight polyethylene (with to some degree increased bulk density) by using the catalyst according to this invention. Upon comparison of the results from the experiment No. 1 and those from the experiment No. 2, the results from the experiment No. 3 and those from the experiment No. 4, it is clear that the viscosity averaged molecular weight of the polymer can be increased by using MAO as the co-catalyst. Upon comparison of the results from the experiment No. 1 and those from the reference example experiment Nos. 5 to 8 in the Table IV-2, it is clear that the viscosity averaged molecular weight of the polymer increases or decreases as the amount of the nonmetallocene complex to be introduced into the catalyst increases or decreases. This fact indicates that the nonmetallocene complex further shows a function of increasing the viscosity averaged molecular weight of the polymer.

As can be seen from the results of the experiment Nos. 1, 18 and 21 in the Table IV-1 and those of the experiment Nos. 1, 5 and 8 in the Table IV-2, the catalyst obtained with the case wherein only nonmetallocene complex was used in preparation of the supported nonmetallocene catalyst, or that obtained with the case wherein only chemical treating agent was used in preparation of the supported nonmetallocene catalyst, shows lowered activity than that obtained with the case wherein both of the nonmetallocene complex and the chemical treating agent were used in preparation of the supported nonmetallocene catalyst. This fact indicates that the supported nonmetallocene catalyst produced in line with the process of this invention necessarily involves a synergic effect. That is, the activity observed with the case wherein both components exist is higher than that observed with the case wherein only either component exists.

Upon comparison of the results from the experiment No. 1 and those from the reference example experiment No. 9 in the Table IV-2, it is clear that the activity in preparation of the ultra high molecular weight polyethylene of the catalyst obtained by supporting the nonmetallocene complex is significantly higher than that of the catalyst obtained by supporting the nonmetallocene ligand. The reason is also that a nonmetallocene ligand per se has no activity for olefin polymerization, and will be given same only after in-situ reacting with a chemical treating agent to form a nonmetallocene complex. Further, in treatment of the modified carrier containing the nonmetallocene ligand with the chemical treating agent, the in-situ reaction is so violent that the formed structure of the modified carrier is destroyed, which leads to a lowered molecular weight of the resultant ultra high molecular weight polyethylene.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A process for producing a supported nonmetallocene catalyst, comprising:
    dissolving at least one magnesium compound and at least one nonmetallocene complex in at least one solvent to obtain a magnesium compound solution; and
    drying the magnesium compound solution or mixing the magnesium compound solution with at least one precipitating agent to obtain the supported nonmetallocene catalyst,
    wherein the nonmetallocene complex is chosen from the group consisting of compounds having the following formula,

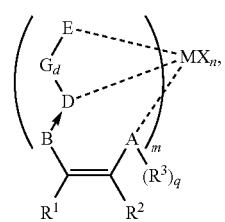

wherein;
q is 0 or 1;
d is 1;
m is 1, 2 or 3;
M is chosen from the group consisting of Group III to XI metal atoms;
n is 1, 2, 3 or 4;
X is chosen from the group consisting of halogen atoms, a hydrogen atom, $C_1$-$C_{30}$ hydrocarbyl groups, substituted $C_1$-$C_{30}$ hydrocarbyl groups, oxygen-containing groups, nitrogen-containing groups, sulfur-containing groups, boron-containing groups, aluminum-containing groups, phosphor-containing groups, silicon-containing groups, germanium-containing groups, and tin-containing groups, when multiple Xs exist, the Xs may be the same as or different from one another, and may form a bond or a ring with one another;
A is chosen from the group consisting of an oxygen atom, a sulfur atom, a selenium atom,

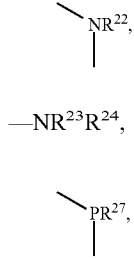

—$NR^{23}R^{24}$,

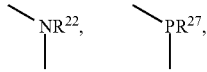

—$PR^{28}R^{29}$, —$P(O)R^{30}OR^{31}$, sulfone groups, sulfoxide groups, and —$Se(O)R^{39}$, wherein N, O, S, Se and P in A each represents a coordination atom;
B is chosen from the group consisting of a nitrogen atom, nitrogen-containing groups, phosphor-containing groups, and $C_1$-$C_{30}$ hydrocarbylene groups;
D is chosen from the group consisting of a nitrogen atom, an oxygen atom, a sulfur atom, a selenium atom, a phosphor atom, nitrogen-containing groups, phosphor-containing groups, $C_1$-$C_{30}$ hydrocarbylene group, sulfone group, sulfoxide groups,

 

and —$P(O)R^{32}(OR^{33})$, wherein N, O, S, Se and P in D each represents a coordination atom;
E is chosen from the group consisting of nitrogen-containing groups, oxygen-containing groups, sulfur-containing groups, selenium-containing groups, phosphor-containing groups, and cyano groups, wherein N, O, S, Se and P in E each represents a coordination atom;
G is chosen from the group consisting of $C_1$-$C_{30}$ hydrocarbylene groups, substituted $C_1$-$C_{30}$ hydrocarbylene groups, and inert functional groups;
→ represents a single bond or a double bond;
— represents a covalent bond or an ionic bond;
- - - represents a coordination bond, a covalent bond or an ionic bond;
$R^1$ to $R^3$, $R^{22}$ to $R^{33}$, and $R^{39}$ are each independently chosen from the group consisting of a hydrogen atom, $C_1$-$C_{30}$ hydrocarbyl groups, substituted $C_1$-$C_{30}$ hydrocarbyl groups, and inert functional groups, wherein these groups may be identical to or different from one another, and any adjacent groups may form a bond or a ring with one another.

2. A process for producing a supported nonmetallocene catalyst comprising:
dissolving at least one magnesium compound and at least one nonmetallocene complex in at least one solvent to obtain a magnesium compound solution;
drying the magnesium compound solution or mixing the magnesium compound solution with at least one precipitating agent to obtain a modified carrier; and
treating the modified carrier with at least one chemical treating agent chosen from the group consisting of Group IVB metal compounds to obtain the supported nonmetallocene catalyst,
wherein the nonmetallocene complex is chosen from the group consisting of compounds having the following formula,

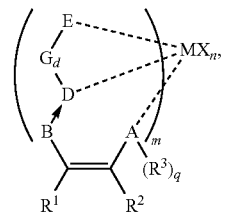

wherein:
q is 0 or 1;
d is 1;
m is 1, 2 or 3;
M is chosen from the group consisting of Group III to XI metal atoms;
n is 1, 2, 3 or 4;
X is chosen from the group consisting of halogen atoms, a hydrogen atom, $C_1$-$C_{30}$ hydrocarbyl groups, substituted $C_1$-$C_{30}$ hydrocarbyl groups, oxygen-containing groups, nitrogen-containing groups, sulfur-containing groups, boron-containing groups, aluminum-containing groups, phosphor-containing groups, silicon-containing groups, germanium-containing groups, and tin-containing groups, when multiple Xs exist, the Xs may be the same as or different from one another, and may form a bond or a ring with one another;
A is chosen from the group consisting of an oxygen atom, a sulfur atom, a selenium atom,

—$NR^{23}R^{24}$,

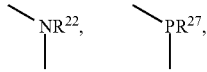

—$PR^{28}R^{29}$, —$P(O)R^{30}OR^{31}$, sulfone groups, sulfoxide groups, and —$Se(O)R^{39}$, wherein N, O, S, Se and P in A each represents a coordination atom;

B is chosen from the group consisting of a nitrogen atom, nitrogen-containing groups, phosphor-containing groups, and $C_1$-$C_{30}$ hydrocarbylene groups;

D is chosen from the group consisting of a nitrogen atom, an oxygen atom, a sulfur atom, a selenium atom, a phosphor atom, nitrogen-containing groups, phosphor-containing groups, $C_1$-$C_{30}$ hydrocarbylene group, sulfone group, sulfoxide groups,

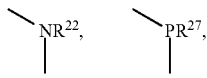

and $-P(O)R^{32}(OR^{33})$, wherein N, O, S, Se and P in D each represents a coordination atom;

E is chosen from the group consisting of nitrogen-containing groups, oxygen-containing groups, sulfur-containing groups, selenium-containing groups, phosphor-containing groups, and cyano groups, wherein N, O, S, Se and P in E each represents a coordination atom;

G is chosen from the group consisting of $C_1$-$C_{30}$ hydrocarbylene groups, substituted $C_1$-$C_{30}$ hydrocarbylene groups, and inert functional groups;

→ represents a single bond or a double bond;

— represents a covalent bond or an ionic bond;

- - - represents a coordination bond, a covalent bond or an ionic bond;

$R^1$ to $R^3$, $R^{22}$ to $R^{33}$, and $R^{39}$ are each independently chosen from the group consisting of a hydrogen atom, $C_1$-$C_{30}$ hydrocarbyl groups, substituted $C_1$-$C_{30}$ hydrocarbyl groups, and inert functional groups, wherein these groups may be identical to or different from one another, and any adjacent groups may form a bond or a ring with one another.

3. The process according to claim 2, further comprising pre-treating the modified carrier with at least one assistant chemical treating agent chosen from the group consisting of aluminoxanes and alkylaluminums before treating the modified carrier with the at least one chemical treating agent.

4. The process according to claim 1 or 2, wherein the at least one magnesium compound is chosen from the group consisting of magnesium halides, alkoxy magnesium halides, alkoxy magnesiums, alkyl magnesiums, alkyl magnesium halides and alkyl alkoxy magnesiums.

5. The process according to claim 4, wherein the at least one magnesium compound is chosen from the group consisting of magnesium halides.

6. The process according to claim 1 or 2, wherein the at least one solvent is chosen from the group consisting of $C_{6-12}$ aromatic hydrocarbons, halogenated $C_{6-12}$ aromatic hydrocarbons, esters and ethers.

7. The process according to claim 6, wherein the at least one solvent is chosen from the group consisting of $C_{6-12}$ aromatic hydrocarbons and tetrahydrofuran.

8. The process according to claim 1 or 2, wherein the at least one nonmetallocene complex is chose from compound (A) and compound (B),

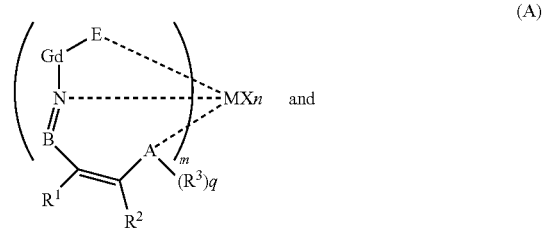

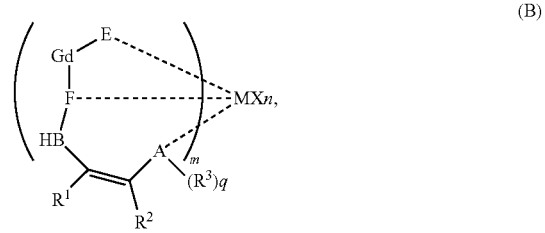

wherein,

F is chosen from the group consisting of a nitrogen atom, nitrogen-containing groups, oxygen-containing groups, sulfur-containing groups, selenium-containing groups and phosphor-containing groups, wherein N, O, S, Se and P in F each represents a coordination atom.

9. The process according to claim 8, wherein the at least one nonmetallocene complex is chosen from the group consisting of compound (A-1), compound (A-2), compound (A-3), compound (A-4), compound (B-1), compound (B-2), compound (B-3), and compound (B-4),

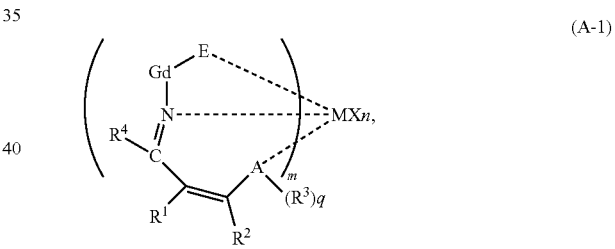

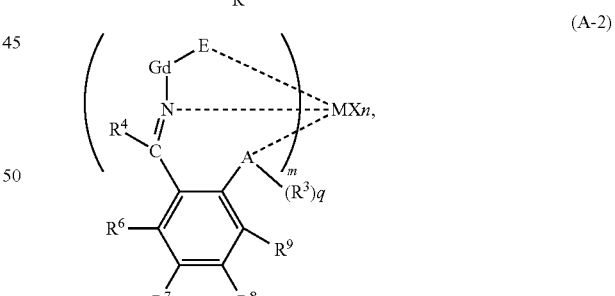

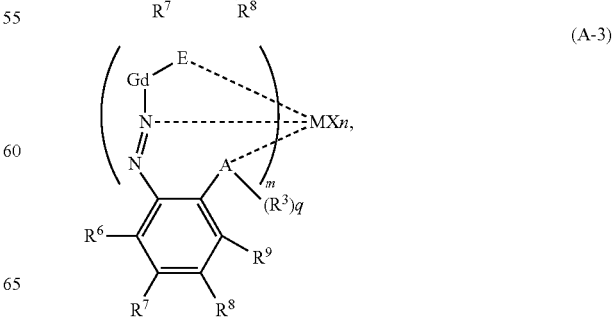

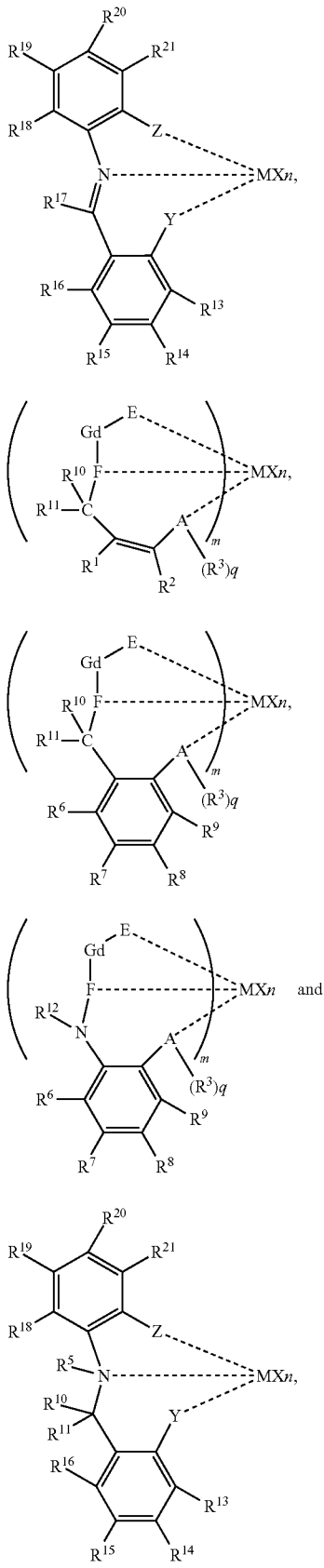

(A-4)

(B-1)

(B-2)

(B-3)

(B-4)

wherein,
Y is chosen from the group consisting of an oxygen atom, nitrogen-containing groups, oxygen-containing groups, sulfur-containing groups, selenium-containing groups and phosphor-containing groups, wherein N, O, S, Se and P in Y each represents a coordination atom;

Z is chosen from the group consisting of nitrogen-containing groups, oxygen-containing groups, sulfur-containing groups, selenium-containing groups, phosphor-containing groups and cyano groups, wherein N, O, S, Se and P in Z each represents a coordination atom;

$R^4$, and $R^6$ to $R^{21}$ are each independently chosen from the group consisting of a hydrogen atom, $C_1$-$C_{30}$ hydrocarbyl groups, substituted $C_1$-$C_{30}$ hydrocarbyl groups and inert functional groups, wherein these groups may be identical to or different from one another, and any adjacent groups may form a bond or a ring with one another; and $R^5$ is chosen from the group consisting of a lone pair electron on the nitrogen atom, a hydrogen atom, $C_1$-$C_{30}$ hydrocarbyl groups, substituted $C_1$-$C_{30}$ hydrocarbyl groups, oxygen-containing groups, sulfur-containing groups, nitrogen-containing groups, selenium-containing groups, and phosphor-containing groups, with the proviso that when $R^5$ is chosen from the group consisting of oxygen-containing groups, sulfur-containing groups, nitrogen-containing groups, selenium-containing groups and phosphor-containing groups, N, O, S, P and Se in the $R^5$ each can act as a coordination atom.

10. The process according to claim 9, wherein,
the halogen atom is chosen from the group consisting of F, Cl, Br and I,
the nitrogen-containing groups are chosen from the group consisting of

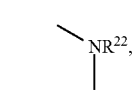

$NR^{23}R^{24}$, and -T-$NR^{23}R^{24}$,
the phosphor-containing groups are chosen from the group consisting of

\PR^{27},
|

—$PR^{28}R^{29}$, —$P(O)R^{30}R^{31}$ and —$P(O)R^{32}(OR^{33})$,
the oxygen-containing groups are chosen from the group consisting of hydroxy, —$OR^{34}$ and -T-$OR^{34}$,
the sulfur-containing groups are chosen from the group consisting of —$SR^{35}$, -T-$SR^{35}$, —$S(O)R^{36}$ and -T-$SO_2R^{37}$,
the selenium-containing groups are chosen from the group of —$SeR^{38}$, -T-$SeR^{38}$, —$Se(O)R^{39}$ and -T-$Se(O)R^{39}$,
the group T is chosen from the group consisting of $C_1$-$C_{30}$ hydrocarbylene groups, substituted $C_1$-$C_{30}$ hydrocarbylene groups and inert functional groups,
$R^{37}$ is chosen from the group consisting of a hydrogen atom, $C_1$-$C_{30}$ hydrocarbyl groups, substituted $C_1$-$C_{30}$ hydrocarbyl groups and inert functional groups,
the $C_1$-$C_{30}$ hydrocarbyl groups are chosen from the group consisting of $C_1$-$C_{30}$ alkyl groups, $C_7$-$C_{50}$ alkylaryl groups, $C_7$-$C_{50}$ aralkyl groups, $C_3$-$C_{30}$ cyclic alkyl groups, $C_2$-$C_{30}$ alkenyl groups, $C_2$-$C_{30}$ alkynyl groups, $C_6$-$C_{30}$ aryl groups, $C_8$-$C_{30}$ fused-ring groups and $C_4$-$C_{30}$ heterocycle groups, wherein the $C_4$-$C_{30}$ heterocycle group contains 1 to 3 hetero atom(s) chosen from the group consisting of a nitrogen atom, an oxygen atom and a sulfur atom, the substituted $C_1$-$C_{30}$ hydrocarbyl groups are chosen from the group consisting of $C_1$-$C_{30}$ hydrocarbyl groups having at least one substituent chosen from the group consisting of halogen atoms and $C_1$-$C_{30}$ alkyl groups, the inert functional groups are chosen from the group consisting of halogen atoms, oxygen-containing groups, nitrogen-containing groups, silicon-containing groups, germanium-containing groups, sulfur-containing groups, tin-containing groups, $C_1$-$C_{10}$ ester groups and nitro groups, the boron-containing groups are chosen from the group of $BF_4^-$, $(C_6F_5)_4B^-$ and $(R^{40}BAr_3)^-$, the aluminium-containing groups are chosen from the group consisting of $AlPh_4^-$, $AlF_4^-$, $AlCl_4^-$, $AlBr_4^-$, $AlI_4^-$ and $R^{41}AlAr_3^-$, the silicon-containing groups are chosen from the group consisting of —$SiR^{42}R^{43}R^{44}$, and -T-$SiR^{45}$, the germanium-containing groups are chosen from the group consisting of $GeR^{46}R^{17}R^{48}$ and -T-$GeR^{49}$, the tin-containing groups are chosen from the group consisting of —$SnR^{50}R^{51}R^{52}$, -T-$SnR^{53}$ and -T-Sn(O)$R^{54}$, the Ar is chosen from the group consisting of $C_6$-$C_{30}$ aryl groups, $R^{34}$ to $R^{36}$, $R^{38}$ and $R^{40}$ to $R^{54}$ are each independently chosen from the group consisting of a hydrogen atom, $C_1$-$C_{30}$ hydrocarbyl groups, substituted $C_1$-$C_{30}$ hydrocarbyl groups and inert functional groups, wherein these groups may be identical to or different from one another, and any adjacent groups may form a bond or a ring with one another.

11. The process according to claim 1 or 2, at least one nonmetallocene complex is chosen from the group consisting of:

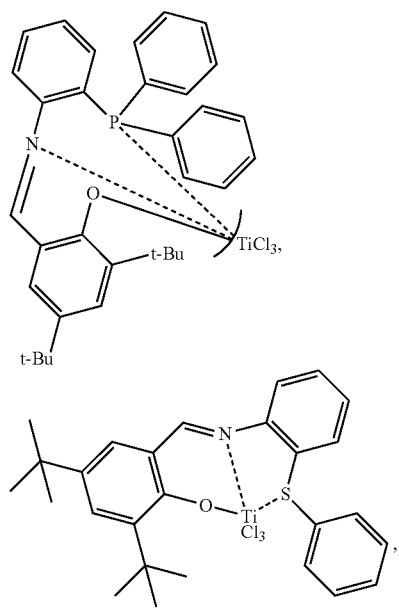

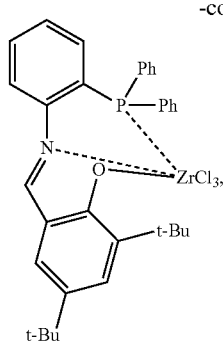

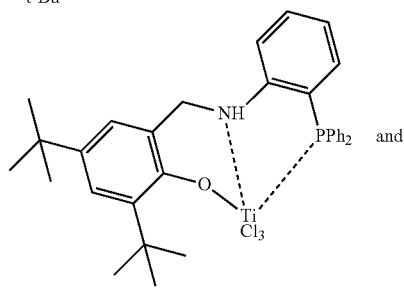

and

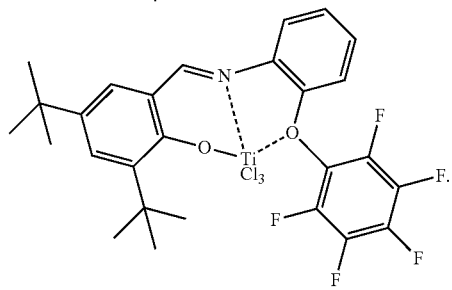

12. The process according to claim 1, wherein molar ratio the at least one magnesium compound (based on Mg) to the at least one nonmetallocene complex is 1:0.01-1, ratio of the at least one magnesium compound to the at least one solvent is 1 mol:75-400 ml, and volume ratio of the at least one precipitating agent to the at least one solvent is 1:0.2-5.

13. The process according to claim 1 or 2, wherein the at least one precipitating agent is chosen from the group consisting of alkanes, cyclic alkanes, halogenated alkanes and halogenated cyclic alkanes.

14. The process according to claim 13, wherein the at least one precipitating agent is chosen from the group consisting of hexane, heptane, decane and cyclohexane.

15. The process according to claim 2, wherein molar ratio the at least one magnesium compound (based on Mg) to the at least one nonmetallocene complex is 1:0.01-1, ratio of the at least one magnesium compound to the at least one solvent is 1 mol:75-400 ml, and volume ratio of the at least one precipitating agent to the at least one solvent is 1:0.2-5, and molar ratio of the at least one magnesium compound (based on Mg) to the at least one chemical treating agent (based on the Group IVB metal) is 1:0.01-1.

16. The process according to claim 2, wherein the Group IVB metal compounds are chosen from the group consisting of Group IVB metal halides, Group IVB metal alkylates, Group IVB metal alkoxylates, Group IVB metal alkyl halides, and Group IVB metal alkoxy halides.

17. The process according to claim 16, wherein the Group IVB metal compounds are chosen from the group consisting of Group IVB metal halides.

18. The process according to claim 3, wherein the aluminoxanes are chosen from the group consisting of methyl aluminoxane, ethyl aluminoxane, isobutyl aluminoxane and n-butyl aluminoxane, and the alkylaluminums are chosen from the group consisting of trimethyl aluminum, triethyl aluminum, tripropyl aluminum and triisobutyl aluminum.

19. The process according to claim 3, wherein molar ratio of the at least one magnesium compound (based on Mg) to the at least one assistant chemical treating agent (based on Al) is 1:0-1.0.

20. A supported nonmetallocene catalyst, produced according to the process of claim 1 or 2.

21. An olefin homopolymerization/copolymerization process comprising
  polymerizing at least one olefin in the presence of the supported nonmetallocene catalyst according to claim 20 with at least one co-catalyst chosen from the group consisting of aluminoxanes, alkylaluminums, halogenated alkyl aluminums, fluoroboranes, alkylborons and alkylboron ammonium salts.

* * * * *

UNITED STATES PATENT AND TRADEMARK OFFICE
CERTIFICATE OF CORRECTION

PATENT NO. : 8,981,023 B2
APPLICATION NO. : 13/504098
DATED : March 17, 2015
INVENTOR(S) : Hongping Ren et al.

It is certified that error appears in the above-identified patent and that said Letters Patent is hereby corrected as shown below:

In the Claims

Claim 1, col. 85, line 1, "wherein;" should read --wherein:--.

Claim 10, col. 90, lines 56-57, "the selenium-containing groups are chosen from the group of" should read --the selenium-containing groups are chosen from the group consisting of--.

Claim 10, col. 91, line 17, "the boron-containing groups are chosen from the group of" should read --the boron-containing groups are chosen from the group consisting of--.

Signed and Sealed this
Eleventh Day of August, 2015

Michelle K. Lee
*Director of the United States Patent and Trademark Office*